US006991693B2

(12) United States Patent
Wylie et al.

(10) Patent No.: US 6,991,693 B2
(45) Date of Patent: Jan. 31, 2006

(54) SCREEN CLOTH INSERTION APPARATUS AND METHOD

(75) Inventors: Douglas H. Wylie, Richmond Hill (CA); John A. Walker, Cambridge (CA); David G. Nelson, Mississauga (CA); Saj Ravindran, Toronto (CA)

(73) Assignee: Saint-Gobain BayForm America, Inc., Cadiz, OH (US)

( * ) Notice: Subject to any disclaimer, the term of this patent is extended or adjusted under 35 U.S.C. 154(b) by 158 days.

(21) Appl. No.: 10/081,357

(22) Filed: Feb. 22, 2002

(65) Prior Publication Data

US 2003/0029546 A1 Feb. 13, 2003

Related U.S. Application Data

(63) Continuation-in-part of application No. PCT/IB00/01716, filed on Aug. 23, 2000, which is a continuation-in-part of application No. 09/379,102, filed on Aug. 23, 1999, now Pat. No. 6,331,223, which is a continuation-in-part of application No. 08/997,737, filed on Dec. 24, 1997, now Pat. No. 6,279,644.

(60) Provisional application No. 60/272,334, filed on Feb. 28, 2001.

(51) Int. Cl.
*B32B 31/00* (2006.01)
*E06B 9/00* (2006.01)

(52) U.S. Cl. .................. 156/160; 160/368.1; 160/369; 160/371; 160/378

(58) Field of Classification Search ................ 160/181, 160/183, 368.1, 369, 371, 378, 391; 156/160, 156/291, 306.6, 309.6, 324.4; 52/204.1, 52/204.5

See application file for complete search history.

(56) References Cited

U.S. PATENT DOCUMENTS

| | | | | |
|---|---|---|---|---|
| 1,058,616 A | | 4/1913 | Maze | |
| 2,791,264 A | | 5/1957 | Couse | 154/41 |
| 3,255,810 A | | 6/1966 | Rowbottam | 160/354 |
| 3,296,056 A | | 1/1967 | Bechtold | 156/461 |
| 3,373,545 A | | 3/1968 | Setnan | 55/501 |
| 3,455,367 A | * | 7/1969 | Le Tarte | 160/371 |
| 3,542,619 A | | 11/1970 | McManus | 156/275 |
| 3,756,881 A | | 9/1973 | Denman | 156/108 |
| 3,871,156 A | | 3/1975 | Birum | 52/624 |
| 4,161,977 A | | 7/1979 | Baslow | 160/381 |
| 4,183,986 A | | 1/1980 | Blaetterlein | 428/160 |
| 4,189,880 A | | 2/1980 | Ballin | 52/202 |
| 4,197,686 A | | 4/1980 | Baslow | 52/273 |
| 4,248,657 A | | 2/1981 | Henry | 156/443 |
| 4,568,455 A | | 2/1986 | Huber et al. | 209/405 |
| 4,635,418 A | | 1/1987 | Hobgood | 52/239 |

(Continued)

FOREIGN PATENT DOCUMENTS

DE 1157765 11/1963

(Continued)

*Primary Examiner*—Jeff H. Aftergut
*Assistant Examiner*—Justin Fischer
(74) *Attorney, Agent, or Firm*—Duane Morris LLP; Steven E. Koffs

(57) ABSTRACT

An apparatus secures ventilation cloth to a screen frame. A screen frame is oriented in an approximately vertical position. The screen frame has a plurality of segments. Each segment has a mounting surface on a face thereof. At least one of said segments has adhesive on the mounting surface thereof. A ventilation cloth is hung across the mounting surface of said one segment. The adhesive in said one of the segments is melted. The ventilation cloth is inserted in the adhesive across a length of said one of the segments.

14 Claims, 46 Drawing Sheets

U.S. PATENT DOCUMENTS

| | | | | |
|---|---|---|---|---|
| 4,675,065 | A | 6/1987 | Gordon | 156/272.8 |
| 4,684,425 | A | 8/1987 | Bannister | 156/216 |
| 4,741,797 | A | 5/1988 | Henderson et al. | 156/479 |
| 4,851,070 | A | 7/1989 | Shimada | 156/293 |
| 4,949,518 | A | 8/1990 | Nagel et al. | 52/239 |
| 4,968,366 | A | 11/1990 | Hukki et al. | 156/153 |
| 5,032,210 | A | 7/1991 | Hukki et al. | 156/359 |
| 5,039,246 | A | 8/1991 | Woodruff et al. | 403/24 |
| 5,090,469 | A | 2/1992 | Boulanger | 160/368.1 |
| 5,137,622 | A | 8/1992 | Souter | 209/403 |
| 5,238,515 | A | 8/1993 | Insalaco et al. | 156/201 |
| 5,258,083 | A | 11/1993 | Monk et al. | 156/64 |
| 5,407,522 | A | 4/1995 | Insalaco et al. | 156/465 |
| 5,615,776 | A | 4/1997 | Björklund et al. | 209/403 |
| 5,662,383 | A | 9/1997 | Hand | 297/440.11 |
| 5,666,773 | A | 9/1997 | Librande et al. | 52/202 |
| 5,676,052 | A | 10/1997 | Wegrzyn et al. | 101/127.1 |
| 5,689,924 | A | 11/1997 | Mason | 52/239 |
| 5,715,638 | A | 2/1998 | Anderson, Sr. | 52/506.08 |
| 5,718,791 | A | 2/1998 | Spengler | 156/212 |
| 5,775,400 | A | 7/1998 | Wilkinson | 160/323.1 |
| 5,783,137 | A | 7/1998 | Alives Porta | 264/510 |
| 5,787,657 | A | 8/1998 | Librande et al. | 52/202 |
| 5,794,528 | A | 8/1998 | Gronig et al. | 101/127.1 |
| 5,797,223 | A | 8/1998 | Shoup et al. | 52/204.1 |
| 5,806,549 | A | 9/1998 | Love | 135/143 |
| 5,816,279 | A | 10/1998 | Zheng | 135/126 |
| 5,816,954 | A | 10/1998 | Zheng | 473/471 |
| 5,819,651 | A | 10/1998 | Zepic et al. | 101/127.1 |
| 6,032,454 | A | 3/2000 | Damour et al. | 57/904 |

FOREIGN PATENT DOCUMENTS

| | | | | |
|---|---|---|---|---|
| DE | 0 073 319 | A2 | | 3/1983 |
| DE | 3446792 | A1 | | 12/1984 |
| DE | 3708640 | | * | 10/1988 |
| DE | 29701908 | U1 | | 4/1997 |
| EP | 0 356 209 | A2 | | 2/1990 |
| FR | 2620486 | | * | 3/1989 |
| FR | 2630037 | | | 10/1989 |
| GB | 711429 | | | 6/1954 |
| JP | 63180519 | | * | 7/1988 |
| JP | 63 137 828 | | | 9/1988 |
| JP | 04 306 392 | | | 10/1992 |
| JP | 04 166 590 | | | 12/1992 |
| JP | 05309821 | | * | 11/1993 |
| WO | WO 99/11165 | | * | 3/1999 |

* cited by examiner

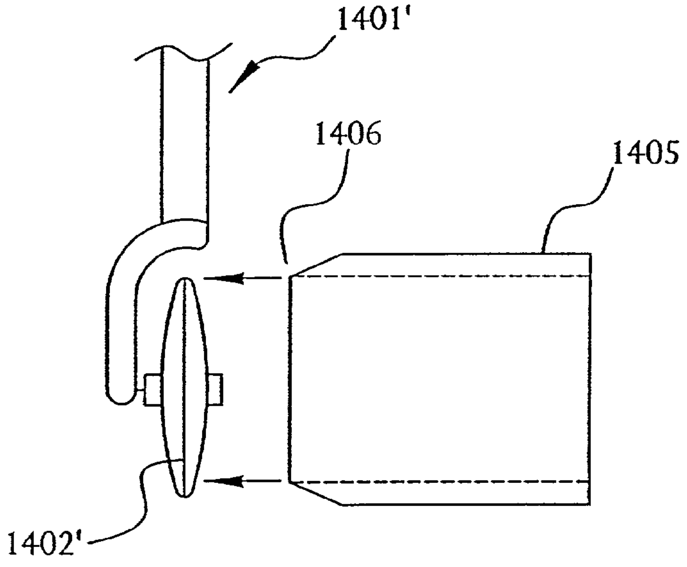
FIG. 14D
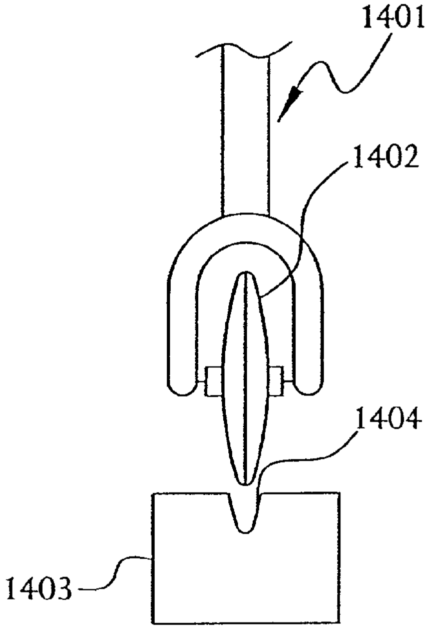
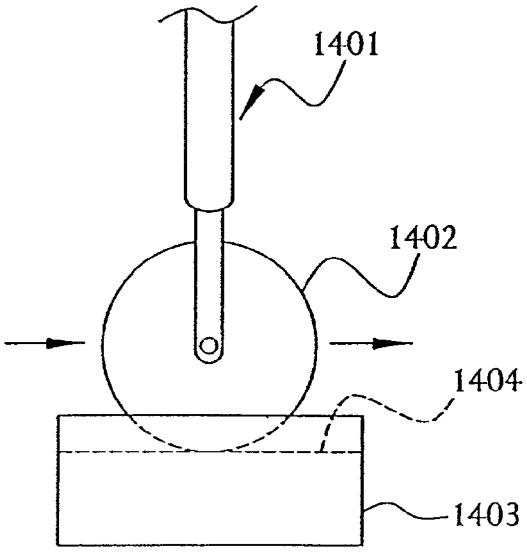
FIG. 14B FIG. 14C

SCREEN CLOTH INSERTION APPARATUS AND METHOD

This application is a continuation-in-part of International Application No. PCT/IB00/01716, filed Aug. 23, 2000, which is a continuation-in-part of U.S. patent application Ser. No. 09/379,102 filed Aug. 23, 1999, now U.S. Pat. No. 6,331,223 B1, which is a continuation-in-part of U.S. patent application Ser. No. 08/997,737 filed Dec. 24, 1997, now U.S. Pat. No. 6,279,644 B1. This application claims the benefit of U.S. Provisional Patent Application No. 60/272,334, filed Feb. 28, 2001.

FIELD OF THE INVENTION

The present invention relates to a screen and frame assembly for windows, doors and the like, and methods and apparatus for fabricating such frame assemblies.

BACKGROUND OF THE INVENTION

The general purpose of screens is to prevent the ingress of insects, while providing ventilation. A typical screen assembly is made up of screen cloth, fabric, or mesh attached to a screen frame in a manner discussed in more detail below. For brevity, the term "screen" is used herein, and includes such screen cloth, fabric, mesh or similar ventilation material.

Screen frames for windows, doors, operable skylights and the like are commonly made of four elongated frame members, called screen bars, of uniform cross section. These bars are typically roll-formed from aluminum or sheet steel, although some may be extruded aluminum. (Plastic and wood are also used, but to a lesser extent.) These screen bars are supplied from the screen bar manufacturer in lineal form and are cut to a final length by the screen assembly manufacturer. Further, these screen bars are held together at the corners with plastic or metal inserts, called corner keys, to form the screen frame.

Different style corner keys are available and are designed to match the particular screen bar used. The most popular corner key allows the screen bar to be cut straight at 90° at the ends. These keys typically are made from injection molded plastic and have a square block body to visibly fill the corner area of the frame. Attached to the body are insertion prongs that are pushed into the hollow screen bar profile to create friction fit connections. Corner keys requiring a 45° miter cut on the ends of the screen bar also can be used. These keys, usually metal, are less expensive and entirely hidden inside the screen bar. These keys also provide a friction fit connection.

Screen is then affixed to the screen frame, in a manner discussed below, to form a screen and frame assembly. These assemblies are then removably secured to windows, doors (e.g., patio screen doors), operable skylights, and the like. Screen and frame assemblies for such openings are very similar, often differing only in size. Accordingly, for brevity, screen and frame assemblies for windows are described herein. Nevertheless, it will be understood that this discussion applies equally to screen and frame assemblies for doors, operable skylights and the like.

It is desirable that the screen be a light-weight fabric or mesh, and stretched taut across the screen frame to avoid unsightly sag and to allow a viewer to see through the screen with minimal visual interference. However, if the screen is tensioned excessively, the screen bars deform inwardly in an hourglass shape. This resultant shape is not only aesthetically undesirable, but also can prevent proper installation in the window opening. Excess screen tension also increases the risk of tearing the screen during manufacture of the screen and frame assembly or while the assembly is in service.

Typically, the screen is fiberglass yarn or roving, which is coated, for example, with polyvinyl chloride (PVC), woven and heat fused. The next most popular form of screen is made by weaving drawn aluminum wire, which is subsequently painted. The PVC coated fiberglass screen is the most popular type, by approximately a 4 to 1 ratio (in area). However, both offer the desired attributes of suitable strength and an open weave.

To compensate for deformation of the screen frame into the hourglass shape discussed above, generally the screen bars are manufactured with an outward bow, in the plane of the screen, before the screen is installed. After the screen is installed into the screen bar by the manufacturer, its final tension straightens the frame members in the final assembly. This "pre-bow" is set into the screen frame during the extrusion or roll forming process to make the screen bar lineal.

Typically, roll-formed bar has approximately 20 millimeters (0.75 inches) of bow over a 3.7 meter (12 feet) length. Additional bow is usually set by hand into the roll-formed bar prior to screen installation when the length of the frame members is greater than 1 meter (approximately 3.5 feet). Pre-bowing is not generally required, however, when the screen bar is sufficiently rigid to resist deformation caused by the resultant screen tension.

It is the current practice, essentially industry-wide, to secure screen in open grooves formed along inside edges of the screen frames using a stuffer strip known as "spline" and its associated fastening techniques. The open grooves are known as "spline grooves." A spline is often a wire-like, extruded rigid plastic or foam material, although some splines are made from metal, especially for use with aluminum screens. A spline is usually round or T-shaped in cross section, but can be U-shaped, for example.

U.S. Pat. No. 5,039,246 (the '246 patent) shows a conventional method of securing screen to a frame member using a spline. Using the reference numerals of the '246 patent, the spline 58 is forced into a spline groove or recess 56 in the screen bar 20, with the screen 22 sandwiched between the spline 58 and the spline groove 56.

The screen 22 is held by friction between the spline 58 and the spline groove 56 with the resulting interference fit. A lip 50 and a ledge 52, part way down one side of the groove wall, are typically included to help trap and improve the strength in retaining the screen 22. The spline 58 and trapped screen 22 are forced into the groove 56, usually by hand, with the use of a roller device 70, including a roller 72. The term, "hand wiring", is used to describe the action of securing the screen 22 with the spline 58 into the spline groove 56. Many attempts have been made to automate the installation of spline by machine. However, this automation has proven to be very difficult and machines of this nature have not been widely accepted as a viable option to hand wiring.

The conventional procedure for manufacturing and hand wiring a screen and frame assembly is discussed in more detail below. First, the screen bars are cut to length:, accounting for the corner key dimensions. Then, the screen frame is assembled using the cut screen bars and corner keys. As discussed above, when light construction screen bars are used, as is normally the case, a balance between pre-bow tension and screen tension is necessary to ensure straight screen bars and desirable tension in the final assembly. When the screen bar has insufficient pre-bow tension, the bars are deformed by hand a sufficient degree after the corner keys have been inserted. As discussed above, the amount of pre-bow is determined based on experience, but is typically a few millimeters of bow per meter length of the screen bar.

The screen frame is then secured to a table using locator (stop) blocks, which prevent shifting and maintain the frame square during screen installation. The table typically has permanent stop blocks for orienting the screen frame. If the screen bar is not constrained, when the spline is inserted into the screen bar, excessive tension may be placed on the frame, causing the frame to hourglass inwards. To avoid hourglassing, removable blocks are located on the inside of the frame segment to limit deflection of the screen bar by the screen tension on assembly. (The spline groove must be facing up and unobstructed by the blocks.) More elaborate tables use removable blocks arranged in grooves cut into the table, with the removable blocks being secured by integral friction clamps. To avoid the need for blocking to prevent hourglassing, some manufacturers use extruded screen bar, instead of roll-formed screen bar, because of the greater strength of a (thicker) extruded section.

After the screen frame is secured to the table, the screen is pulled from a roll and positioned to cover the opening formed by the frame. Ideally, no excess screen is used, but this is difficult to achieve in practice. As a result, most manufacturers cut the screen approximately two inches wider than the frame width, so that the screen is pulled past the end of the frame by approximately one inch to ensure that sufficient amount of screen can be rolled into the spline groove along the frame perimeter. In either technique, the screen is positioned over, with edges parallel to, the secured screen frame.

The screen and spline are installed into the spline groove by starting in one of the frame corners. The screen is then pulled taut at the next corner with one hand, keeping it straight and parallel to the edge of the mating screen bar. The spline is simultaneously held above the groove in the same manner as the screen, with the same hand. With the other hand, the installation roller is pushed along towards the upcoming corner with a firm downward force to push the spline and trap the screen into the spline groove. This action is repeated on the second and third screen bars. On the last screen bar, most of the tension is set into the screen. On this leg, the screen is pushed into the screen bar with the installer's finger, just prior to the insertion of the spline. This pre-insertion technique reduces the final tension in the screen to the desired level. The spline is cut at the final corner with a utility knife.

After the spline and screen are inserted in all screen bars, excess screen around the edge of the frame is cut away with a utility knife. To do this, the point of the blade is pushed against the screen bar, through the screen, immediately adjacent to the spline groove around the outside edge of the screen bar. Care must be taken to cut the screen close to the spline groove without cutting the screen covering the opening formed by the frame. The finished screen and frame assembly is removed from the table, inspected, and any necessary hardware is attached.

The current hand wiring process using spline has several drawbacks, however.

Current standards for screen and frame assemblies are established by associations such as the Screen Manufacturers Association (ANSI-SMA SMT 31-1990) in the United States and the General Standards Board in Canada (CAN-CGSB-79.1-M91). These standards cover particular elements of screen and frame assemblies for windows, patio doors and the like. For example, these standards set forth tolerances in terms of the strength of the screen, the strength required to fasten the screen to the screen bar, the amount of sag in the screen, etc. Although these standards generally can be met by using the spline technology discussed above, very close and consistent dimensional tolerances are required between the spline and the spline groove, respectively, in order to achieve the specified fastening strength. These tolerances require close attention and skill with current screen bar roll-forming and extrusion technology and current spline hand wiring techniques. Any out-of-tolerance spline and screen bar produced costs the manufacturer in wasted time, material and goodwill.

Further, the amount of force required by an installer to secure the screen with the spline in the spline groove may be high enough to cause repetitive strain injury, e.g., carpal tunnel syndrome, to one who routinely performs this job. This is of major importance, since this type of injury is serious and has recently received heightened public awareness. Further, such an injury to an installer is also costly to the manufacturer in terms of compensation and loss of skilled labor.

Also, the hand wiring technique is particularly difficult and time-consuming. Notably, it is difficult to control the wire-like spline material and simultaneously control the screen tension with one hand, while the spline is rolled in with the other hand. This operation requires a high degree of skill and careful attention. This adds to the final manufacturing cost, and, hence, increases the final cost to the consumer. Final product consistency is difficult to maintain.

Quality control also has become an issue with current spline techniques. Specifically, installers have learned ways to make their jobs easier, to the detriment of quality control. This is particularly true when using PVC spline. For example, an installer will stretch the PVC spline just prior to insertion, in order to reduce the diameter of the spline. This, of course, makes it easier to install. However, this also reduces the "pull-out" force or attachment strength of the spline and screen. The result is that the screen can be more easily pulled out from the spline groove, which is undesirable. (This, however, is not an issue with polyethylene spline, which does not stretch in the manner of PVC spline.)

There are other drawbacks associated with conventional spline techniques. In particular, the use of a separate fastening device, such as a spline, requires separate inventory control and associated costs. Screen manufacturers prefer to minimize inventory. Therefore, it is desirable to eliminate the spline as a separate item. Also, the need to have a strong interference fit in securing the spline necessitates stiff walls on the spline groove. Further, the spline technology makes the design of automatic assembly equipment extremely complex.

For the foregoing reasons, a need has arisen to provide a screen and frame assembly that eliminates the requirement of a spline. An additional need has arisen to manufacture screen products more easily.

Some attempts have been made in the art to provide screen and frame assemblies without a traditional spline. For example, in U.S. Pat. No. 3,255,810, a continuous strip of fusible material is fused with the screen material and then inserted into the groove in the frame. In U.S. Pat. No. 4,568,455, the bonding of a screen to a thermoplastic frame is accomplished by resistance heating of the screen using an electrical potential of four volts and a current of approximately, 2,200 amps, which is applied for approximately forty-eight seconds, to fuse the thermoplastic. This method, however, requires external tensioning until the thermoplastic cools and solidifies.

In another aspect, U.S. Pat. No. 4,968,366 teaches a complex method of manufacturing tension screens using an apparatus that includes a screen tensioning frame and a platform positioned adjacent to the tensioned screen. The platform includes heating elements about the periphery of a sheet heater. The heating elements receive a screen frame which can be lifted into contact with the screen in the tensioning frame. The screen cloth is pre-tensioned by an external frame. The screen frame is heated to thermally expand the screen frame. Then the screen cloth is expanded by heating, by an amount substantially equal to the amount of thermal expansion of the screen frame during the step of heating the screen frame. Next, the expanded and pre-tensioned screen cloth is bonded to the heated screen frame. The screen frame is then cooled by blowing air over the screen frame. The heat of the screen cloth is maintained by shielding the bonded screen cloth from the blowing air and heating the bonded screen cloth concurrently, while cooling the screen frame, so that the screen cloth does not cool faster than the screen frame during cooling of the screen frame.

Thus, in the arrangement of U.S. Pat. No. 4,968,366, it is necessary to heat the entire mating surface, while the screen is maintained under high tension, and to match, or compensate for, the different thermal expansions of the frame and screen cloth. This complex technique requires high manufacturing precision, including proper tensioning of the screen and mating of the heating elements and the tensioning frame. Further, this technique is too slow and cumbersome to be considered practical for the manufacture of screen and frame assemblies for windows and the like.

Other techniques, in general, are known to fuse screening material to frames. For example, U.S. Pat. No. 4,675,065 (the '065 patent) shows a method for securing a microsieve to a support member. A laser beam is directed against a point on the upper edge of a well which contains the microsieve to melt fusible material in contact with the laser beam. The laser-melted fusible material travels down the well wall, contacts the edge of the microsieve and solidifies to secure the microsieve. Japanese patent document No. 63-137828 (the '828 document) shows a single step method of ultrasonically welding screening net to the bottom of a small, cylindrical container using resin and a single, vibrating tip, which is identical in size to the container bottom. The exotic techniques for the small parts, as described in the '065 patent and the '828 document, are generally limited to their particular applications.

Accordingly, a need has arisen for a screen and frame assembly for windows, doors and the like in which the screen is secured to the frame quickly, with reduced manual labor.

SUMMARY OF THE INVENTION

One aspect of the invention is a method and apparatus for securing ventilation cloth to a screen frame. A screen frame is oriented in an approximately vertical position. The screen frame has a plurality of segments. Each segment has a mounting surface on a face thereof. At least one of said segments has adhesive on the mounting surface thereof. A ventilation cloth is hung across the mounting surface of said one segment. The adhesive in said one of the segments is melted. The ventilation cloth is inserted in the adhesive across a length of said one of the segments.

Another aspect of the invention is a method and apparatus for securing a ventilation cloth to a screen bar segment. A screen bar segment is provided having a mounting surface on a face thereof. The segment has adhesive on the mounting surface. The ventilation cloth is spread across the mounting surface of the screen bar segment. The adhesive is melted. The ventilation cloth is inserted into the adhesive with an elongated insertion member substantially across a length of the screen bar segment simultaneously.

Still another aspect of the invention is a ventilation cloth insertion apparatus. A fixture clamps a screen frame. The screen frame has a plurality of segments. Each segment has a mounting surface on a face thereof. At least one of the segments have adhesive on the mounting surface thereof. The fixture has a plurality of clamping arms. The clamping arms are positionable so that each clamping arm clamps a respective outside edge of a respective one of the plurality of sides of the screen frame while attaching a ventilation cloth to the screen frame. The outer edges of the screen frame are the edges of the segments that are furthest from a center of the screen frame. Each of the plurality of clamping arms is positioned at a common height with respect to a plane in which the ventilation cloth is positioned. A heater melts the adhesive in the one segment. At least one insertion device inserts a ventilation cloth in the adhesive substantially across a length of said one of the segments.

BRIEF DESCRIPTION OF THE DRAWINGS

FIGS. 14B–14D show exemplary methods for cleaning the cutting tool shown in FIG. 14A.

DETAILED DESCRIPTION

PCT International Application No. PCT/IB00/01716, filed Aug. 23, 2000, U.S. patent application Ser. No. 09/379,102 filed Aug. 23, 1999, and U.S. patent application Ser. No. 08/997,737 filed Dec. 24, 1997 are all expressly incorporated by reference herein in their entireties.

The invention includes a method and apparatus for securing a screen 34 to a frame 30, or to a screen bar segment 30*a* of the frame 30. The invention also includes a frame and screen assembly formed by the method, and a screen bar stock used in the assembly.

Figure 1:
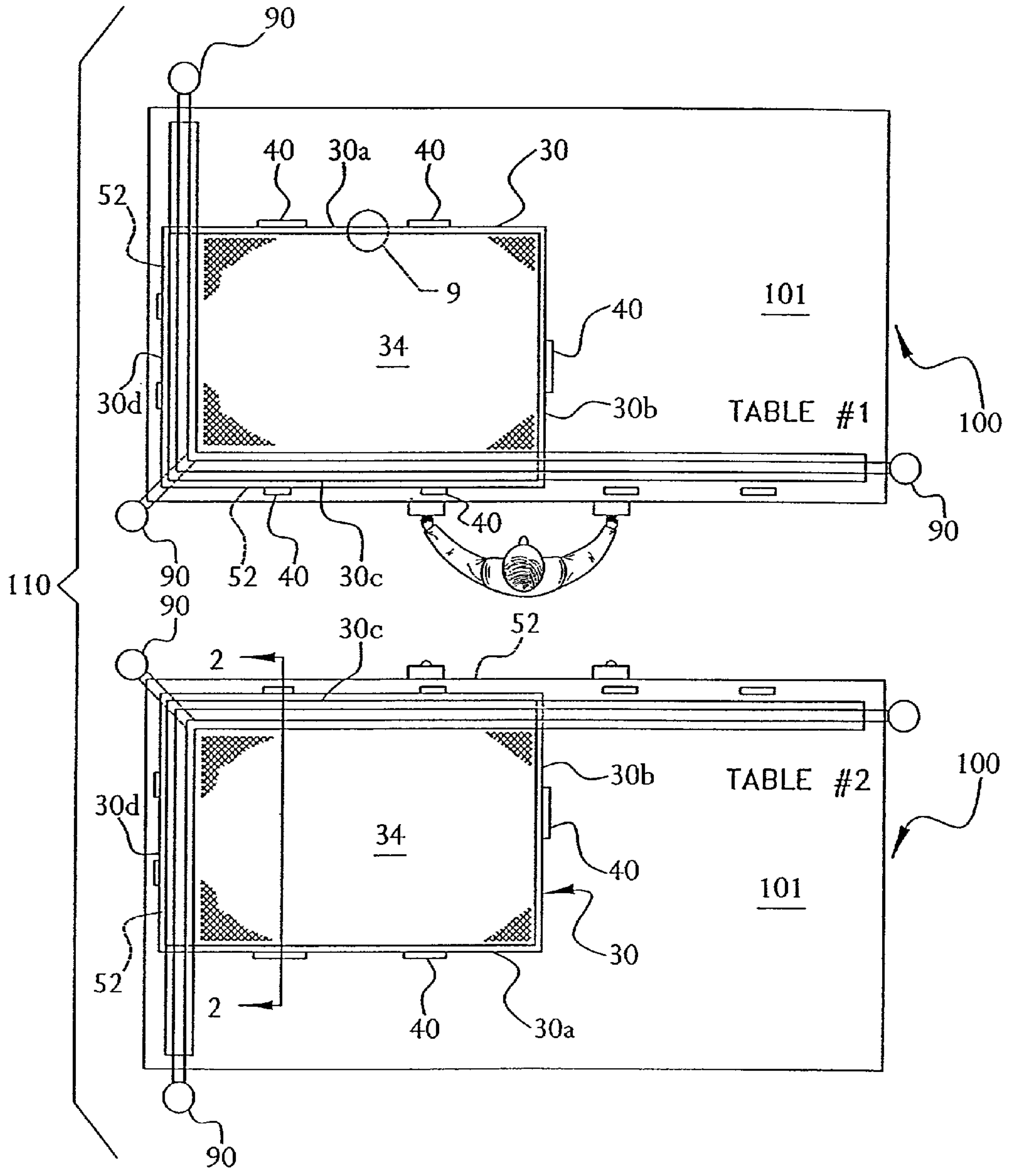
FIG. 1 is a top plan view showing a station including two frame assembly machines according to the present invention.

As shown in FIG. 1, the exemplary frame 30 includes a plurality of screen bar segments 30*a*–30*d*. Each screen bar segment 30*a*–30*d* has a mounting surface 32*a* which may be a bottom of a groove or tensioning step 32 or 32' (best seen in FIGS. 6–11) on a face of the frame 30. The frame 30 may have a flat face, and the mounting surface may be a portion of the flat surface (not shown), but a groove 32 or tensioning step 32' is preferred, because it enhances removal of slack in the screen upon insertion of the pins. The tensioning step 32' has a bottom 32*a*' and at least one side 32*b*' (shown in FIG. 9). Essentially, a groove 32 is a tensioning step that further includes a second side 32*c* (shown in FIG. 7).

These structures and their equivalents are collectively referred to as a "mounting surface" or "tensioning step" herein, for ease of discussion. A mounting surface may be flat or may include a tensioning step. It will be understood that, as used herein the term "tensioning step" encompasses both a tensioning step that is part of a groove, and a step that is not part of a groove. This tensioning step is described in more detail below.

The screen bar segment 30*a* has adhesive 36 at the bottom 32*a* or side 32*b* of the tensioning step 32. The adhesive 36 may be pre-installed in each screen bar segment 30*a*–30*d* before the screen bar segments 30*a*–30*d* are assembled to form the frame 30.

Figure 10:
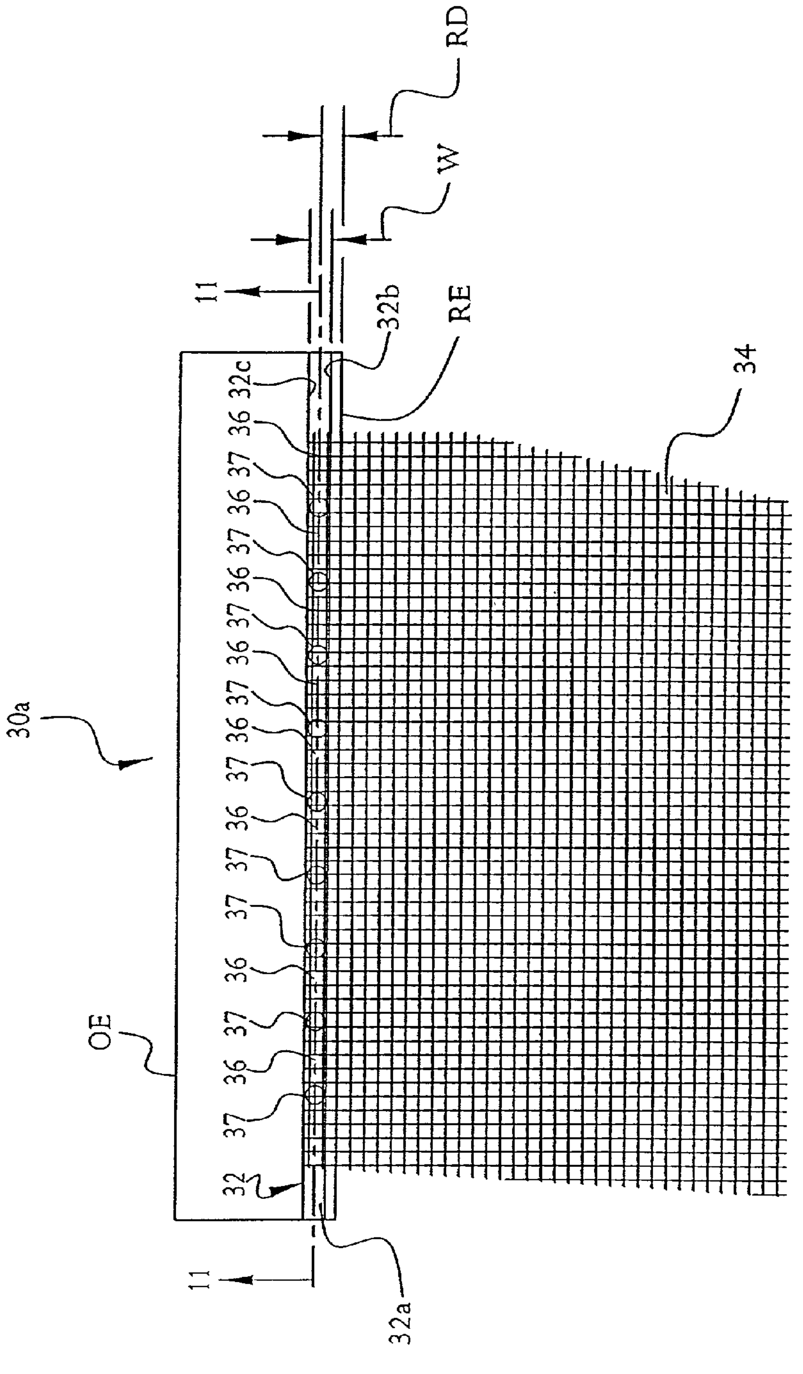
FIG. 10 is an enlarged view of a portion of the screen assembly shown in FIG. 1.

The screen 34 is spread across the frame 30, so that the screen 34 extends over the mounting surface (tensioning step 32) of each screen bar segment 30*a*–30*d* (FIG. 10). The screen 34 is secured to the face of the frame 30 with an adhesive 36 at a plurality of positions 37 across a length of the tensioning step 32 of at least one of the screen bar segments 30*a*–30*d*.

Figure 3:
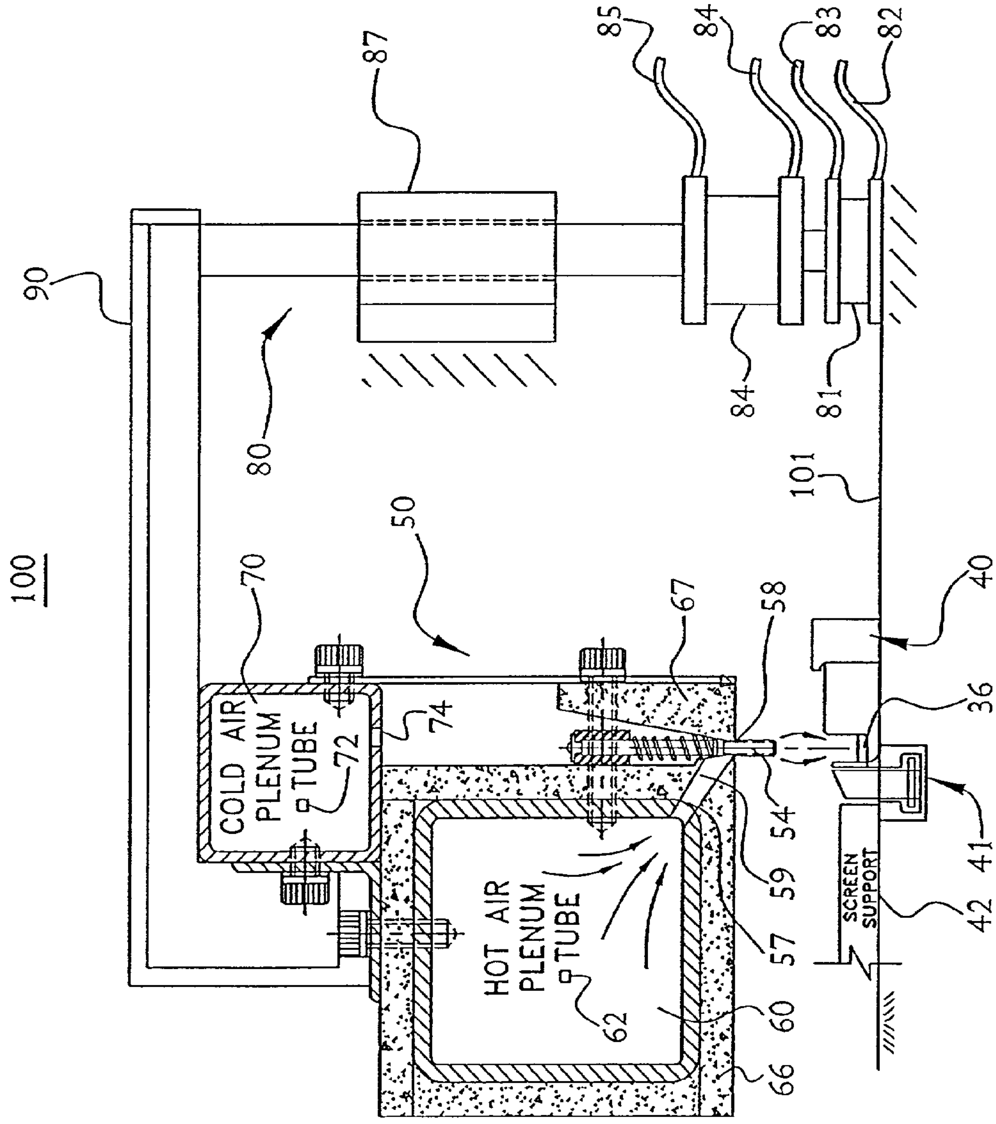
FIG. 3 is a side elevation view of the machine of FIG. 2, in a position for heating the adhesive in the frame bar segment.
Figure 11:
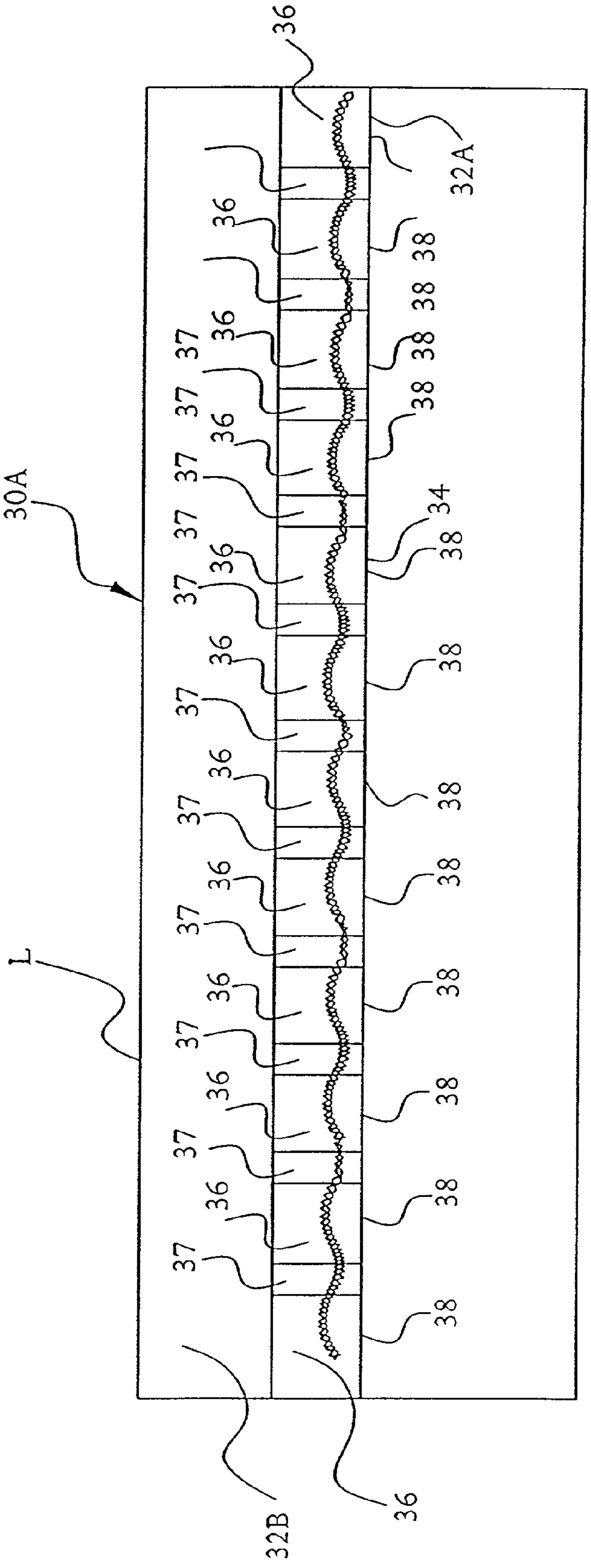
FIG. 11 is a cross sectional view of the screen bar segment shown in FIG. 10, taken along section line 11—11 of FIG. 10.

Preferably, forced convection with a heated gas having a temperature above the melting point of the adhesive is used to heat the adhesive. For example, the heated gas may be air heated to about 175 C, blown directly onto the adhesive 36 (as shown in FIG. 3) to melt the adhesive. The screen 34 is inserted with an inserting apparatus 52, which may include a plurality of pins 54. Pins 54 embed or suspend the screen 34 in the adhesive 36 intermittently across a length of the screen bar segment 30*a,* until portions of the screen beneath the pins 54 ate inserted in and possibly contact the bottom 32*a* of the mounting surface (as shown in FIG. 11). The pins 54 of the inserting apparatus 52 contact the adhesive 36 during the inserting step. Natural or forced convection may be used in combination with conduction to cool the adhesive 36. If convection is used, a cool gas having a temperature below the melting temperature of the adhesive 36 is provided. The cool gas may be ambient temperature air, and is blown onto the adhesive 36, or onto the frame, near the adhesive. Preferably, the plurality of pins are removed after allowing the adhesive to cool below the melting point of the adhesive.

The adhesive may be a hot melt adhesive or a thermoplastic resin having a heat resistance temperature of at least about 35° C., preferably between about 100° C. and about 130° C., and a viscosity that is preferably below 5400 poise at about 200° C. For example, the adhesive may be a hot melt adhesive such as polyester, polyamide, polyolefin, polypropylene, polyurethane, butyl or ethylene vinyl acetate based adhesives.

Referring again to FIGS. 1–5, the apparatus 100 for securing the screen 34 to a screen bar segment 30*a* includes a support surface 101 that holds the screen bar segment. One or more pre-loading blocks 40 (FIGS. 1–5) are provided to hold a pre-bowed frame 30 against the support surface 101, so that the frame 30 is distorted to a desired camber while the screen 34 is secured. The frame 30 may be held substantially straight, or may be given a reverse camber while attaching the screen, if desired. Preferably, the apparatus 100 includes a plurality of pre-loading blocks 40 arranged outside of the frame to engage all of the screen bar segments 30*a*–30*d* of the frame 30 simultaneously. A heat source applies heat directly to the adhesive 36 to melt the adhesive. The heat source may include a plurality of nozzles 58 (shown in FIGS. 2 and 5) that direct a heated gas onto the adhesive 36. The nozzles 58 may be located on a movable body 50. The source of the heated gas may include a hot air plenum 60. In the exemplary embodiment, the plenum 60 may be located on the movable body 50.

According to an aspect of the invention, the pre-loading blocks 40 may be positioned outside of the frame 30, without using any stop-blocks inside the frame. The frame 30 may be deformed inward elastically (hourglassed) slightly, so that when the frame is removed from the pre-loading blocks 40, the frame returns to a substantially straight configuration, with sufficient movement to remove wrinkles from the screen material 34. (The screen material 34 has a high modulus of elasticity (Young's modulus) relative to the frame members, so that the frame members are held straight by the screen material. A pair of inside (backstop) blocks may be used to limit the amount of movement when the frame is pre-loaded by the pre-loading blocks 40. The amount of this pre-bow or pre-tensioning is sufficiently small so that, when the frame 30 is released from the pre-loading blocks 40, the screen material 34 is substantially wrinkle-free, but has a sufficiently small amount of tension so as not to overly distort the screen bar.

A convenient blocking system includes a ferrous table top 101 (e.g., steel) and a plurality of blocks 40 that are strong permanent magnets, such as ceramic-type magnets. A few magnets can provide the desired force to clamp a lightly pre-bowed frame into a straight configuration during screen insertion. For this purpose, a total force on each side of the frame 30 need only be about 9–18 Newtons (2–4 pounds). The magnets can be quickly and easily positioned manually, using a visual inspection to determine when the frame 30 is straight.

Alternatively, the configuration may include pre-loading blocks 40 on all four sides of the frame, with backstop blocks inside of the frame on only two sides; the inside blocks may be used on the two sides of the frame into which the screen material is currently being embedded in the adhesive. The two sides into which the screen is currently being inserted are held straight, whereas the remaining two sides are allowed to deflect inward towards the center of the frame, so as to have a reverse camber.

The plurality of pins 54 (best seen in FIG. 5) are located on the movable body 50, proximate to the nozzles 58. The plurality of pins 54 may be arranged in a straight line segment. An actuator 84 raises and lowers the body 50 (or the table) so that the pins 54 simultaneously push the screen 34 into the adhesive 36. The pins 54 are capable of being actuated to embed the screen 34 in the adhesive 36. A release coating (e.g., tetrafluoroethylene ("TEFLON®") or silicone) may be applied to the plurality of pins 54 before inserting the screen 34 with the pins 54. The plurality of pins 54 may be spring loaded with springs 56 to accommodate corners. Successive pins 54 may be spaced apart from each other by a distance δ (FIG. 5) of between about 0.6 centimeters (cm) and about 2.5 cm. Preferably, the distance 6 between pins is about 1.25 cm.

Figure 4:
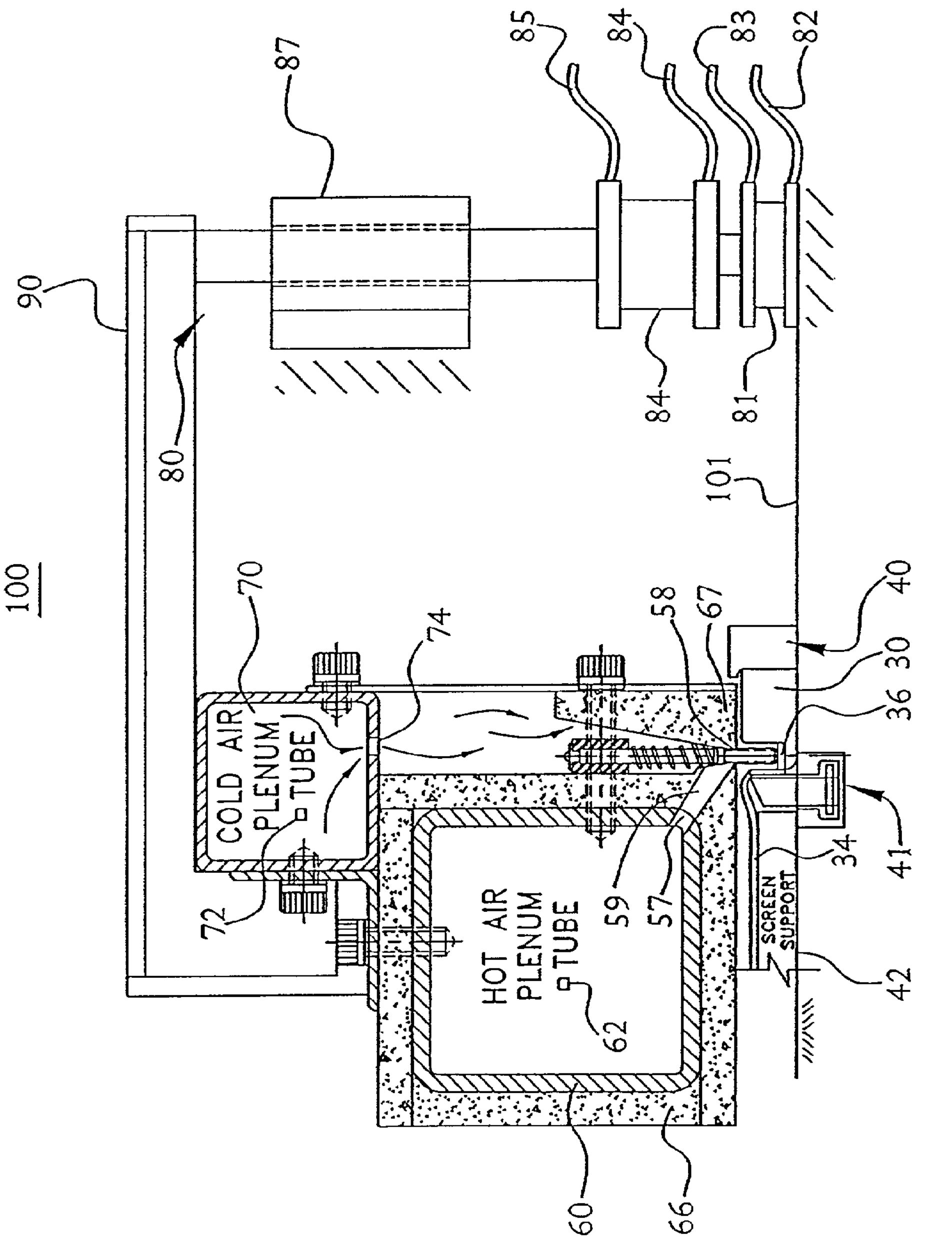
FIG. 4 is a side elevation view of the machine of FIG. 2, in a position for inserting the screen and cooling the adhesive in the frame bar segment.

As shown in FIG. 4, the nozzles 58 may also be configured to direct a cool gas directly onto the adhesive 36 when the nozzles 58 are connected to the source of the cool gas. The source of the cool gas may be plenum 70 and may contain ambient air. In the example shown, the nozzles 58 are connectable to either the source of heated gas (hot air plenum 60) or a source of a cool gas (cold air plenum 70).

The pins 54 may have a diameter P (FIG. 5) that is less than a width W (FIG. 10) of the groove 32 of the screen bar segment 30*a* by between about 0.05 centimeter and about 0.1 centimeter. For example, the tensioning step may be a groove 32 having a width W of about 0.35 centimeter. A preferred set of pins 54 corresponding to this width have a diameter between about 0.15 centimeter and about 0.34 centimeter, preferably between about 0.25 centimeter and about 0.3 centimeter.

Figure 5:
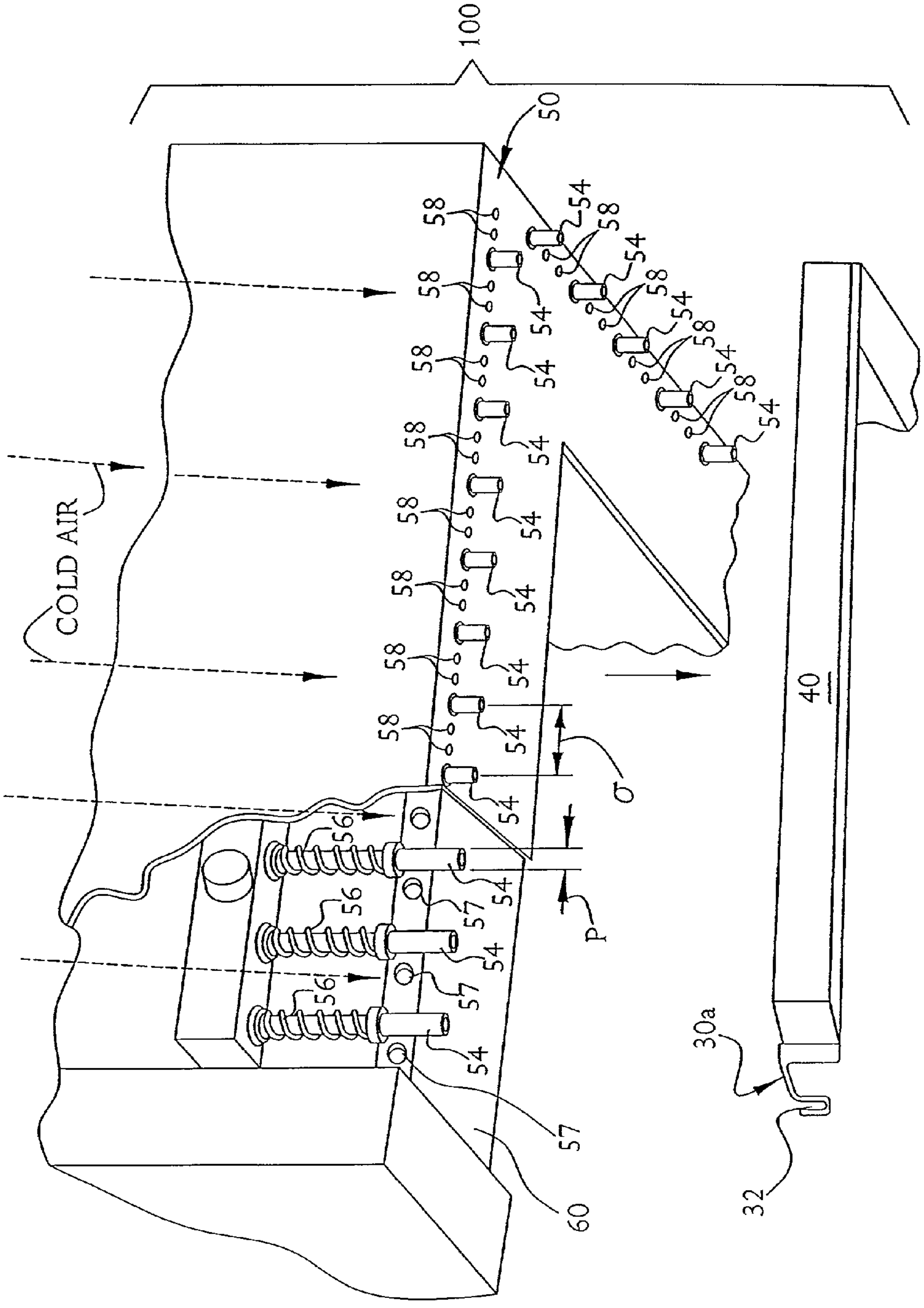
FIG. 5 is an enlarged, partial cutaway perspective view (with the insulation partially removed) of the nozzle section of the machine shown in FIG. 1.

The pins 54 may be arranged to simultaneously insert the fabric into the adhesive on any non-zero number of sides of the frame. Preferably, the fabric is attached to two of the sides at a time. As shown in FIG. 5, in an exemplary embodiment of the apparatus, the plurality of pins 54 include a row and a column of pins aligned in an angle-shaped configuration, for inserting the screen 34 into the adhesive 36 on two screen bar segments 30*a* and 30*b* of the frame 30, simultaneously. The angle may be a right angle as shown in FIG. 5, or another angle for a non-rectangular window. Once the screen 34 is attached to two adjacent sides, the frame is rotated by 180 degrees, and the heating, inserting and cooling steps are repeated to insert the screen 34 into the tensioning steps 32 on a third screen bar segment 30*c* and a fourth screen bar segment 30*d* of the frame 30 simultaneously.

More generally, for any window having an even number of equal sides 2N (where N is an integer greater than one), the pins may be arranged to insert the screen in two of the sides simultaneously. The window can be rotated N-1 times by (360/N) degrees per rotation, to complete installation of the screen 34 in N inserting steps.

Although the apparatus could include pins for all four sides of the frame, such an arrangement would be limited to a specific size of frame (unless at least two of the sides of the apparatus are adjustable, which complicates the apparatus). By including pins on only two sides, a single machine can accommodate a variety of sizes easily, without adjustment. Other arrangements are also contemplated, as described below.

Figure 6:
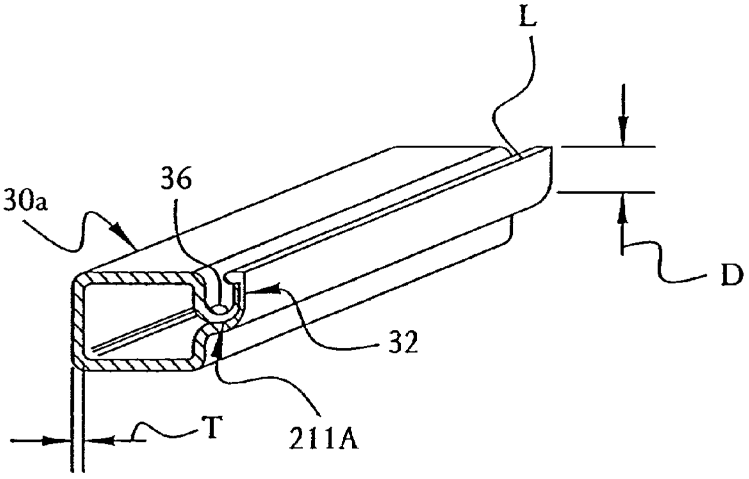
FIG. 6 is an isometric view of a first exemplary screen bar segment suitable for assembly in the machine shown in FIG. 1.
Figure 7:
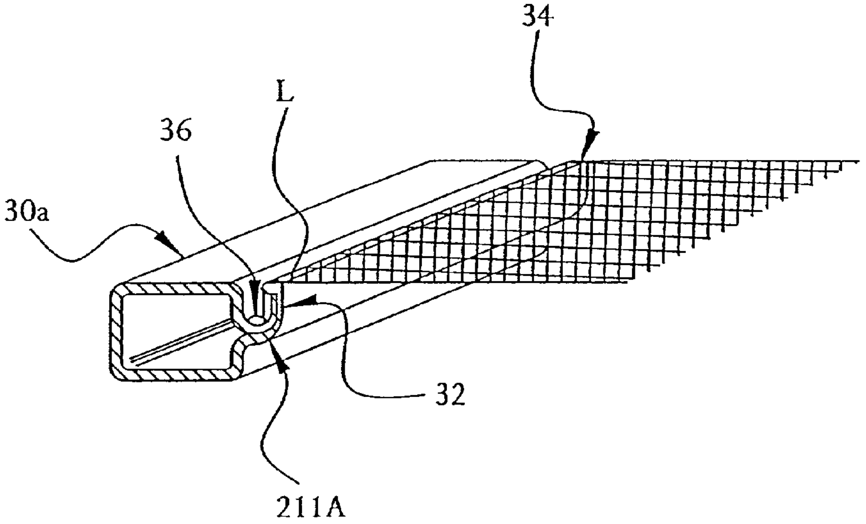
FIG. 7 is an isometric view of the screen bar segment of FIG. 6, with a portion of screen material attached thereto.

FIGS. 6–11 show a segment of a first type of screen bar 30*a* for use in forming a screen and frame assembly. FIG. 6 is an isometric view of the screen bar segment 30*a* before assembly. FIG. 7 is an isometric view of the screen bar segment of FIG. 6, with a portion of screen material 34 attached thereto.

FIG. 10 is a top plan view of the screen bar segment 30*a* and screen material 34 shown in FIG. 7. In FIG. 10, the segment of screen bar 30*a* includes a tensioning step provided by the bottom 32*a* and one side 32*b* of a groove 32. Adhesive 36 is applied along the base 32*a* of the tensioning step, in the groove 32 of the screen bar 30*a*. Therefore, as shown in FIG. 10, the adhesive is secured to the screen bar 30*a* at the base 32*a* of the groove 32. Also shown in FIG. 10 are a plurality of indentations 37 formed in the adhesive 36 by the insertion pins 54, while embedding the screen material 34 into the adhesive.

FIG. 11 is a cross sectional view taken along section line 11—11 of FIG. 10. FIG. 11 is not to scale; vertical dimensions are exaggerated to show features of the exemplary assembly. In particular, the screen material 34 may be pushed substantially all of the way to the bottom 32*a* of the groove 32 by pins 54, forming indentations or openings 37 in the adhesive bead 36 or film, so that the screen substantially contacts the bottom 32*a* (i.e., not more than a microscopically thin film is interposed between the screen material and the bottom of the groove beneath the indentations.) In between the indentations 37, the screen material 34 is intermittently suspended slightly above a thin layer of adhesive. Thus, the screen material 34 acts to strengthen and reinforce the adhesive 36 in the regions between the indentations 37. The resulting structure is very strong.

Optionally, the mounting surface 32*a* of the tensioning step 32 may have a plurality of features 38. The features 38 may be dimples, indentations, holes, slots, striations, or the like. The features 38 are intended to provide a better mechanical bonding surface for the adhesive 36.

Figure 8:
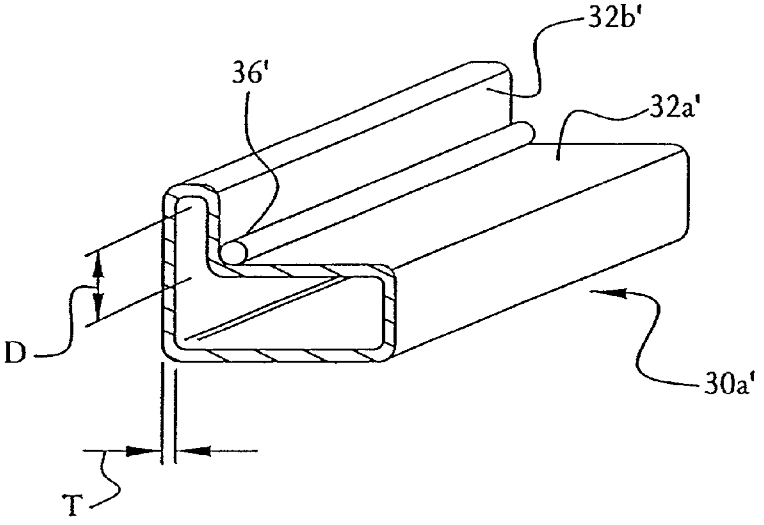
FIG. 8 is an isometric view of a second exemplary screen bar segment suitable for assembly in the machine shown in FIG. 1.
Figure 9:
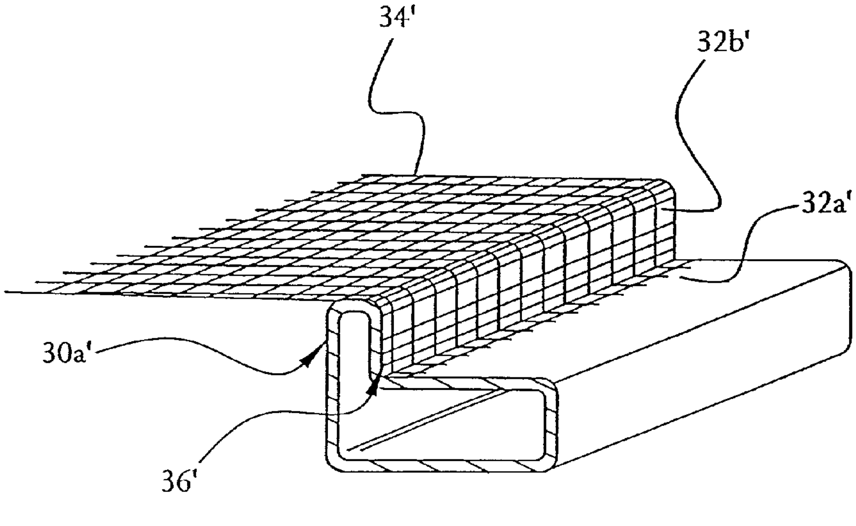
FIG. 9 is an isometric view of the screen bar segment of FIG. 8, with a portion of screen material attached thereto.

FIG. 8 shows a cross-sectional view of a segment of a second type of screen bar 30*a*' for use in forming a screen and frame assembly in which screen can be adhesively secured to the screen bar. FIG. 8 shows that the segment of screen bar 30*a*' includes a step, lip or wall (hereafter, called a “step”) 32' along one side thereof. Adhesive 36' applied along the base of the step 32' of the screen bar 30*a*'. In this embodiment, since the base of the step 32' has a relatively sharp angle, the adhesive may be applied against the base of the step 32'. Therefore, as shown in FIG. 8, the adhesive 36' is secured to the screen bar 30*a*' along and adjacent to the step 32'.

In the embodiments shown in FIG. 6 or 8, a tensioning step can be provided by a conventional spline groove or the like, or by a step, lip, or wall, for example, as desired. A groove (FIGS. 6, 7, 10 and 11) is preferred over a step (FIGS. 8 and 9), lip or wall that is not a groove, because the groove allows the homeowner to install a replacement spline to replace the screen, if necessary, and may be more aesthetically pleasing (The adhesive and the edge of the screen can be hidden from view.) A groove 32 also protects the adhesive bond area from weather and ultraviolet radiation from the sun, to some degree. Also, if a groove is not used, greater pre-tensioning of the screen material may be necessary to achieve tension in the screen fabric 34.

Systems according to the present invention use adhesive 36 in the groove 32 or tensioning step of the screen bar 30*a* (or at the bottom of a tensioning step 32', shown in FIGS. 8 and 9) to secure the screen 34 to the screen bar 30*a*. The present invention solves problems associated with automated installation of screen material 34 on a frame 30. It is a tremendous improvement over manual techniques for attaching a frame using adhesives, and over the current spline technology for at least the following reasons:

The invention eliminates the need for manually inserting the screen in the frame. This elimination results in:

No repetitive strain injury—specifically, a worker is not likely to suffer carpal tunnel syndrome as a result of practicing an assembly technique according to the invention.

Much less effort (physical strength) is required to install screen material using the invention. There is less difficulty and manual work to manufacture screen assemblies.

Little or no skill is required to operate the assembly equipment.

Screen-to-frame retention (bond strength) fabricated by a method according to the invention is three to four times stronger than bonds fabricated using spline technology. Frame and screen assemblies fabricated using apparatus and methods according to the present invention consistently exceed the current standards for pull out strength, whereas spline technology marginally meets these standards.

The strength of the fastening is not dependent upon the gauge of the screen bar metal (as is the case with spline technology), thus allowing reduced metal gauge without loss of retention strength performance Reduced part cost The invention provides a two to three-fold increase in assembly throughput, reducing overall cost significantly.

An apparatus according to the invention can provide low cost, using simple, low-tech machinery. It is far simpler and far better than any automated screen assembly machine currently available commercially.

Can use existing screen bar profiles, connectors, fastening hardware.

A frame-screen assembly fabricated according to the invention still allows screen replacement using traditional spline technology by the homeowner.

Improved consistency of tensioning over manual methods and control of quality independent of the skill of the operator.

Referring again to FIGS. 1 and 2, an exemplary work station 110 including two frame-screen assembly systems 100 is shown. Each machine 100 includes a movable block or body 50 which includes heating, inserting and cooling apparatus 52. The exemplary body 50 has a plurality of spring-loaded pins 54, an insulated hot air plenum 60, a cold air plenum 70, and a plurality of common slot nozzles 58 for heating and cooling. Insulation 66 on the hot air plenum provides a uniform temperature distribution across the plurality of nozzles 58 throughout the heating, inserting and cooling apparatus 52. The hot air plenum 60 receives the hot air supply via a tube 62, and the cold air plenum 60 receives the cold air supply via a tube 72.

The plenums 60 and 70 are vessels or containers for gas. The plenums 60 and 70 may be pressurized. Although the drawings show plenums 60 and 70 as being parallelepipeds (boxes), any convenient shape may be used.

Although the exemplary apparatus 52 includes a plurality of nozzles 58 (FIG. 5), one of ordinary skill recognizes that a single elongated nozzle (not shown) extending along the length of the body 52 may be used. Alternatively, a plurality of elongated nozzles (not shown) may extend along the length of the body 52. Hereinafter, reference is only made to a plurality of nozzles, but the description below also applies to single nozzle configurations.

Figure 2:
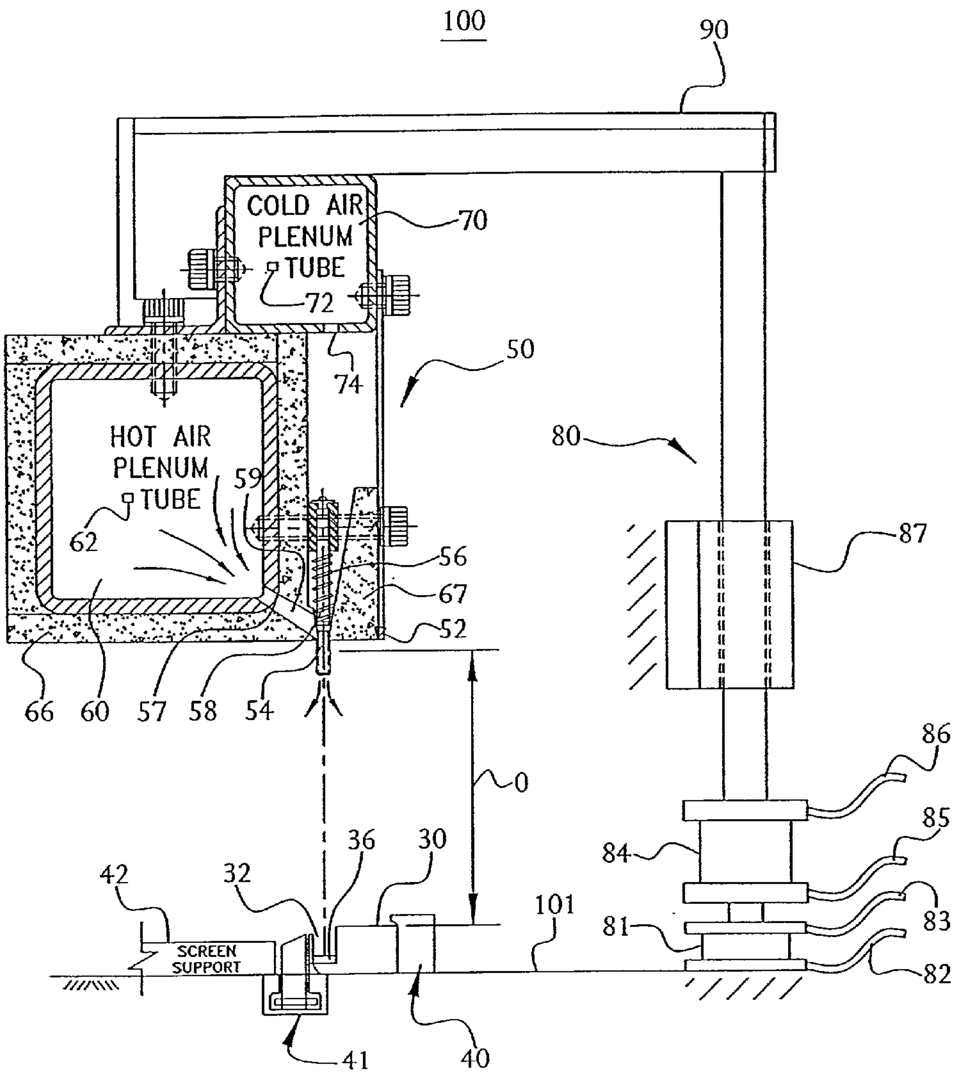
FIG. 2 is a side elevation view of one of the machines of FIG. 1, taken along section line 2—2 of FIG. 1.

FIGS. 2–4 show the nozzles 58 and pins 54 in line with each other within a single row. For example, the nozzles 58 and pins 54 may alternate with each other. In the configuration of FIGS. 2–4, the nozzles are directed downward. In a variation (not shown), the nozzles and pins may be arranged in two parallel lines which are proximate to each other. The nozzles of FIG. 5 may be slightly angled (depending on the relative positions of the nozzles and the adhesive), so the heated gas and cooled gas are obliquely applied to the adhesive or frame members.

Although the exemplary apparatus includes a single set of common nozzles that direct either hot air or cold air onto the adhesive, one of ordinary skill could readily configure an apparatus having a plurality of hot air nozzles and a separate and distinct set of cold air nozzles. For example, there may be a row of hot air nozzles and a separate row of cold air nozzles. Alternatively, hot and cold air nozzles may alternate within a single row.

FIG. 5 is an enlarged, partial cutaway perspective view (with the insulation 67 partially removed) of the nozzle section of the machine 100. Insulation 66 and 67 may be provided to surround the hot air plenum 60 and the interior of the common nozzles 58. The plenum 60 has a plurality of openings 57 which are connected to the common nozzles 58 by respective passages 59. The insulation 66 and 67 reduces the heat retained in the nozzles when the flow of heated air to nozzles 58 is interrupted, thus reducing the time for the temperature to stabilize upon switching from hot air to cold (Similarly, the insulation reduces time to switch from cold air to hot air.). This insulation may be preferred to minimize cycle time but is not required for the apparatus to function. In an alternate embodiment, if separate hot and cold nozzles are used (not shown), the insulation keeps the hot nozzles hot and the cool nozzles cool.

FIGS. 2–4 show the position and orientation of the nozzles 58 and insertion pins 54 in relation to the screen bar 30*a* in the loading/unloading position (FIG. 2), heating position (FIG. 3) and the screen insertion/cooling position (FIG. 4). In the loading/unloading position (FIG. 2), the hot air can be either blowing (preferred for pre-heating the plenum 60) or shut off. It may be preferable to have the cold air blower shut off when the apparatus is in the loading/unloading position of FIG. 2, to reduce wasted energy. In the heating position (FIG. 3) the only blower that is turned on is the hot air blower, providing air via tube 62. In FIG. 3, the nozzles 58 are directly above the groove 32. This position and orientation of nozzles 58 is optimized to direct hot air directly into the groove 32 (in a direction perpendicular to the surface of the adhesive) for focused heating of the adhesive 36, while minimizing the amount of heating applied to the frame substrate 30 which would increase the cooling required.

One of ordinary skill can readily place the nozzles 58 in other positions and orientations to direct the air onto the frame substrate 30 to indirectly heat the adhesive through the frame substrate 30. For example, if the nozzle is not directly over groove 32, the nozzle may be oriented at an oblique angle. Indeed, this may appear advantageous from the perspective of machine design simplicity, because the nozzles 58 can be further away from the pins 54. The nozzles 58 could also be below the frame, blowing on the bottom. Nevertheless, directly heating the adhesive 36 (instead of the frame 30) has a different advantage: less total heat is required to heat the adhesive 36 to its melting point when the heat is directly applied to the adhesive. This reduces both the heating time to melt the adhesive 36, and the subsequent cooling time. Cooling time is especially reduced by applying heat to the adhesive instead of the frame. If the frame were heated, residual heat in the frame would be conducted back to the adhesive during cooling, increasing cooling time and possibly remelting cooled adhesive.

In the insertion/cooling position (FIG. 4) the only blower that is on is the cool gas blower (not shown), providing gas via tube 72. Cool gas (for example, room temperature air) from tube 72 passes through the cold air plenum 70 and out through the same (common) nozzles 58 as the hot air. The pins 54 are positioned proximate to the nozzles 58. The apparatus may be configured with separate hot and cool gas blowers (not shown), or there may be a single blower coupled with appropriate valving to both hot and cool gas plenums for circulating both hot and cool gas.

Optionally, the hot air tube 62 and cold air tube 62 may each have a means to limit reverse flow of air. For example, there may be a means for limiting flow of the cool gas into hot air tube 62, and/or a means for limiting flow of the hot gas into the cool air tube 72. Each of these limiting means may comprise a lightweight flapper valve (not shown).

In another optional variation, a flapper valve (not shown) may be provided in the hot air stream, while allowing a trickle of cold air to flow throughout the heating, inserting, and retracting steps of the fabrication process. This may help reduce heating of the cold gas plenum.

As shown in FIGS. 2–5, the exemplary actuator 80 includes a linear bearing 87 to maintain the alignment of the support arm 90, and a pair of actuating cylinders 81 and 84. In the example, cylinder 84 has a relatively long stroke, and cylinder 81 has a relatively short stroke. Cylinders 81 and 84 may be either hydraulic or pneumatic cylinders. Cylinder 81 has a pressurized input line 82 and an output line 83. Cylinder 84 has a pressurized input line 85 and an output line 86. The pressurized lines 82 and 85 are each coupled to one or more raise valve assemblies (not shown). The raise valve assemblies may include conventional position control valves (e.g., spool valves, not shown), and may include check valves (not shown) to prevent backwards flow.

To maximize safety, the apparatus may be biased (using springs, for example) to the raised position, and only moved to the lowered position when actuated by the hydraulic pneumatic cylinders.

Each raise valve has an input to receive the pressurized gas or fluid from a pump (not shown). Output lines 83 and 86 may be coupled to lower valve assemblies (not shown). The lower valves controllably release the gas or fluid from the cylinders 81 and 84 as desired to lower the support arm 90. If cylinders 81 and 84 are hydraulic cylinders, then the lower valves return the hydraulic fluid to tank.

The pair of cylinders may be operated in at least two optional ways. In a first method, both cylinders are extended in the raised position of FIG. 2. The large cylinder 84 is lowered completely to move the insertion assembly 50 into the heating position of FIG. 3. Once heating is complete (7–10 seconds at 350° F. for the 6107 adhesive), then the short cylinder 81 is lowered to the position of FIG. 4, to perform the actual insertion step.

Although the exemplary embodiment shows actuating cylinders, one of ordinary skill recognizes that other conventional mechanical actuators may be used.

Figure 18:
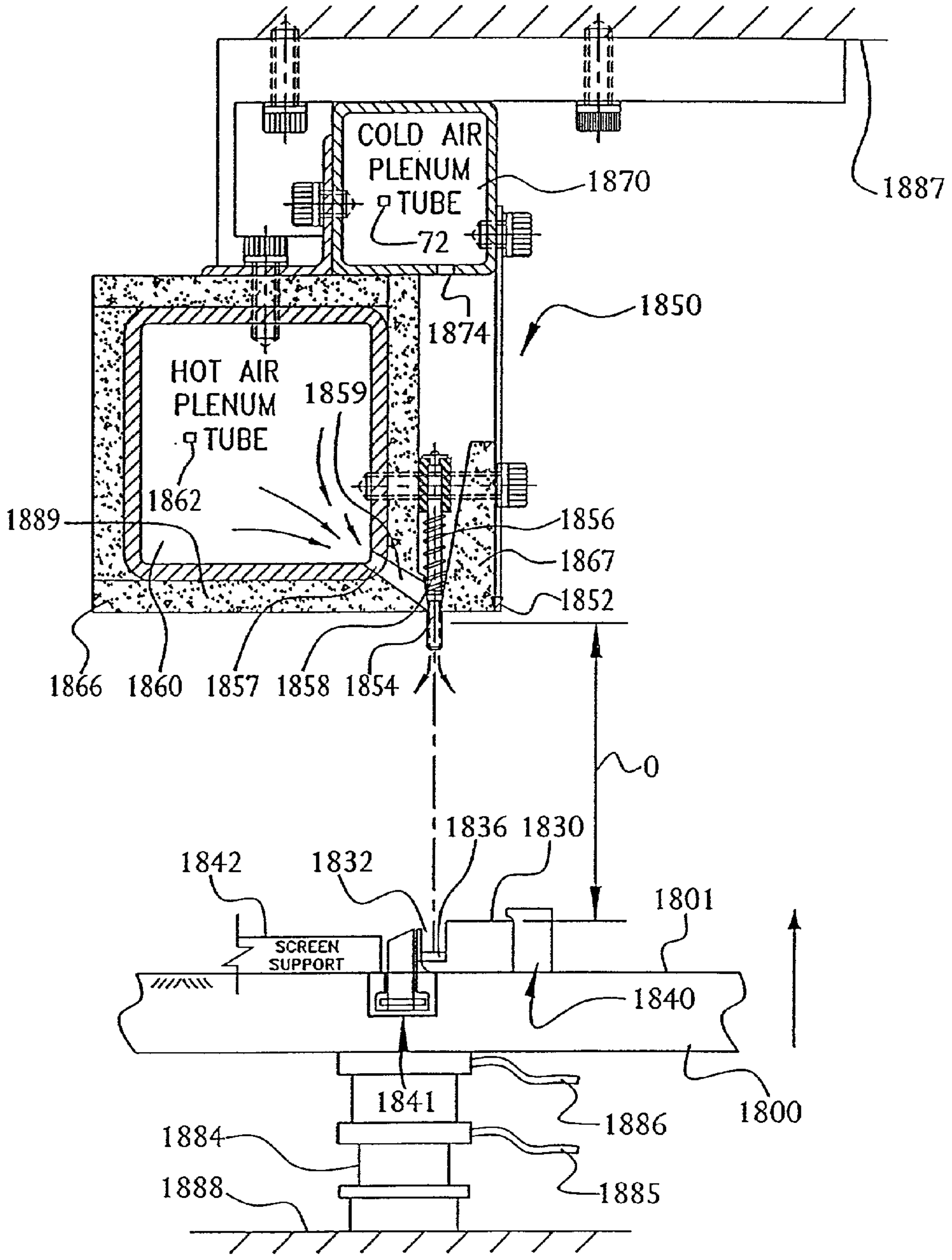
FIG. 18 shows a further variation of the embodiment of FIG. 1.

FIG. 18 shows an alternative design, in which the inserting apparatus is included in a body 1850 that is fixed to the ceiling 1887 or to a rigid overhead support (not shown) fixed to a floor mounted riser (not shown). In this example, the plenums 1860 and 1870, the nozzles 1857 and the inserting pins 1854 are all fixed relative to the ceiling. The working surface 1801 is mounted on a vertically movable platform 1800. Rather than raising or lowering the inserting apparatus, the screen and frame materials are raised to meet the inserting apparatus. This may be a simpler configuration, because the components that are connected by hoses and tubes to the air blower(s) are all fixed (to the ceiling).

Figure 19A:
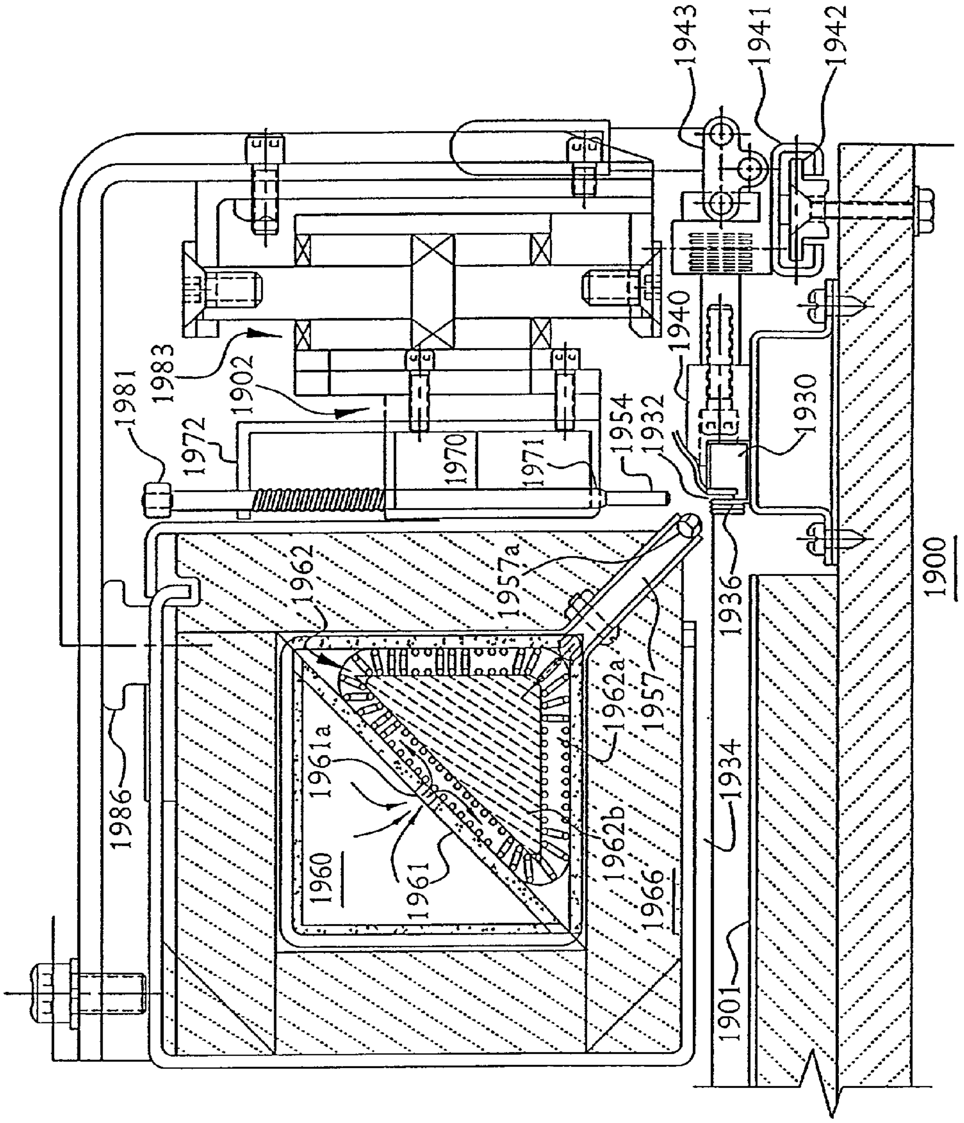
FIGS. 19A–19C show still another variation of the embodiment of FIG. 1.
Figure 19B:
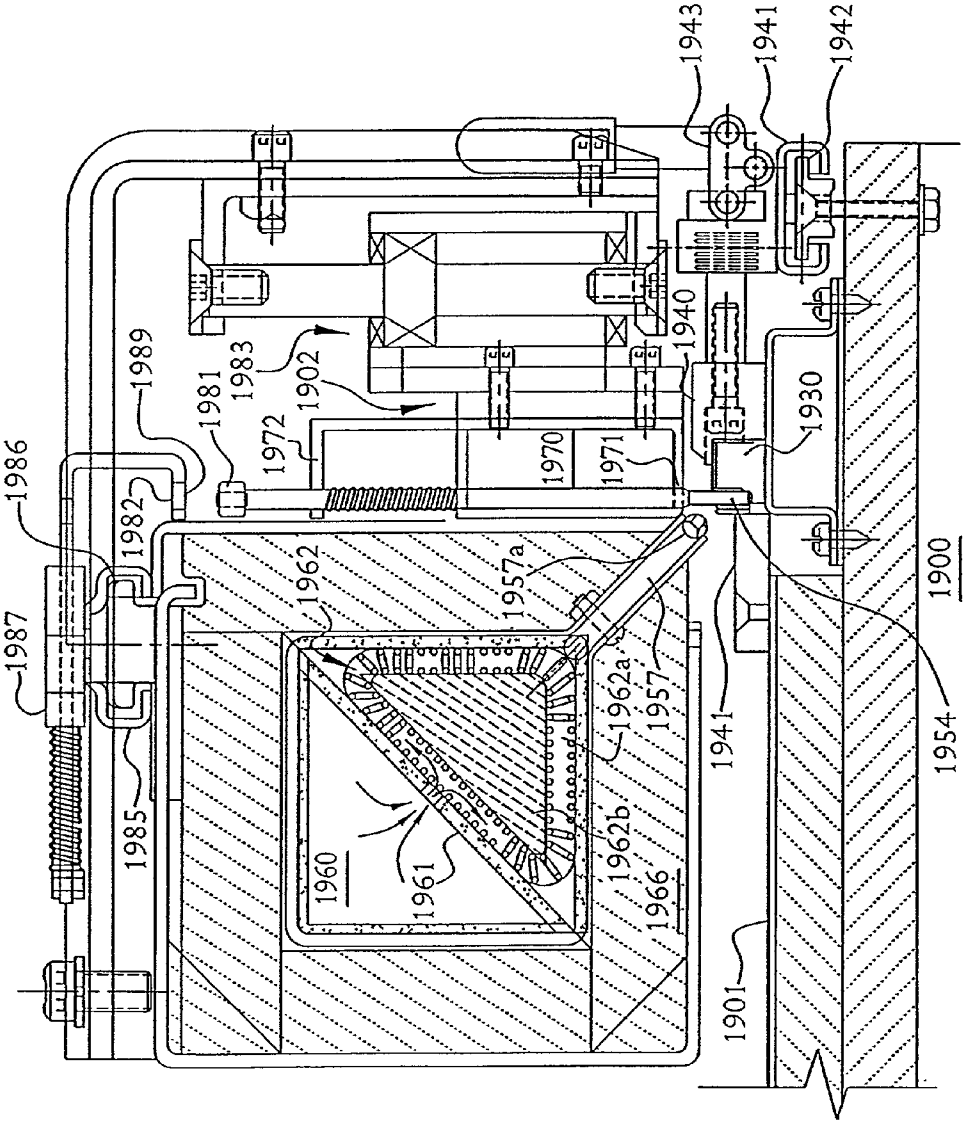
Figure 19C:
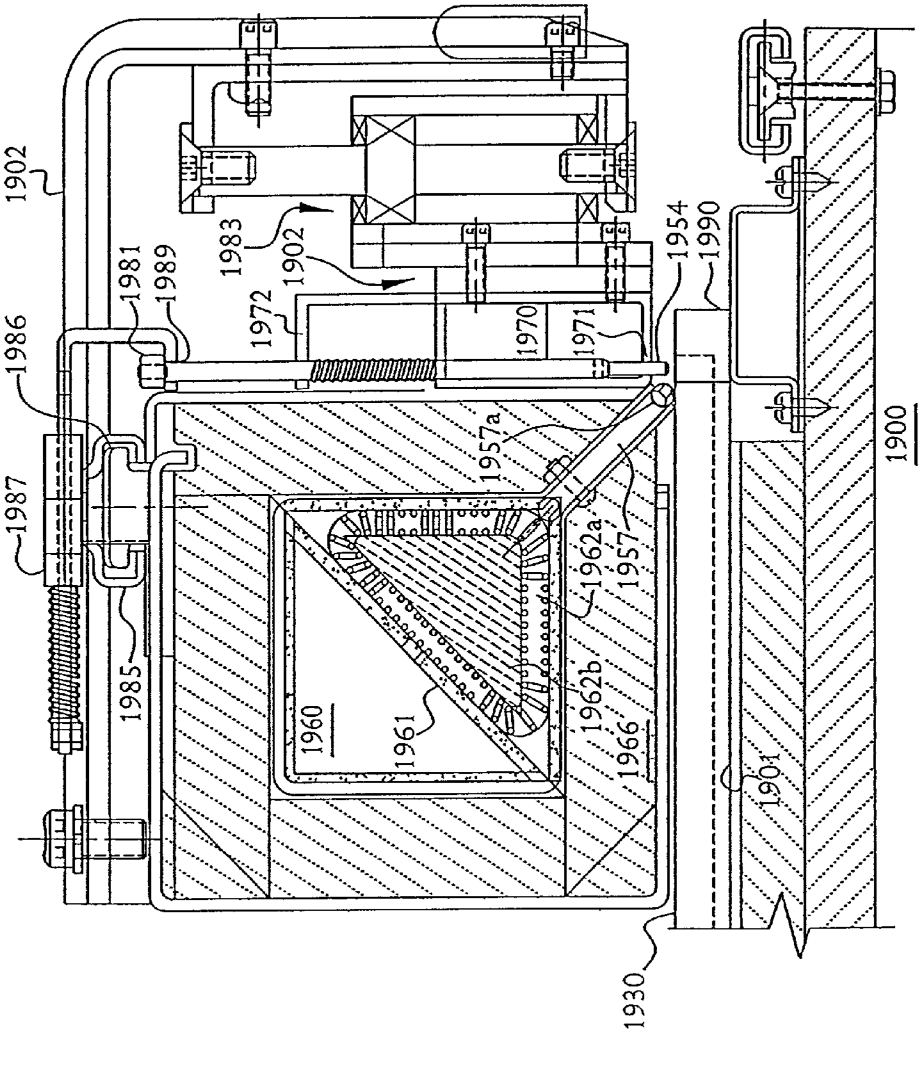

FIGS. 19A–19C show a further alternative method and apparatus for securing a screen to a screen bar segment. A screen bar segment 1930 has a mounting surface 1932 (in this case, a groove) on its face. The segment 1930 has adhesive 1936 on the mounting surface 1932. A screen 1934 is spread across the mounting surface 1932 of the screen bar segment 1930. A plurality of pins 1954 are provided. The adhesive 1936 is heated without heating the pins 1954 (FIG. 19A). When the relatively cool pins 1954 are inserted into the melted adhesive 1936 (FIG. 19B), heat is conducted out of the adhesive into the pins, helping to cool the adhesive adjacent to the pins more rapidly than the adhesive remote from the pins. The relatively cool pins are important for reducing cycle time. Using cool pins 1954, the adhesive 1936 adjacent the pins solidifies sufficiently to allow clean extraction of the pins in about eight seconds. (Extracting pins before the adjacent adhesive solidifies may result in formation of "strings" of adhesive). Applying a release coating onto the pins 1954 may further assist in preventing formation of strings of adhesive upon extraction.

With the pins 1954 in the raised position (FIG. 19A), the adhesive can be melted without heating the pins. This is achieved by blowing a first gas (e.g., heated air) through a nozzle 1957 (having a rotatable orifice 1957*a*) onto either the screen bar segment 1930 or the adhesive 1936, without blowing the first gas onto the pins 1954. In the example of FIGS. 19A–19C, the plurality of pins 1954 are positioned on arms 1902 that are actuable independently of the heated air source. For example, in FIG. 19A, an arm 1902 is attached to an actuating cylinder 1983 (which may be pneumatic or hydraulic). Raising the cylinder 1983 to the position of FIG. 19A raises the plurality of pins 1954 out of the path of the stream of air exiting from the nozzles 1957 while the heated air from plenum 1960 is melting the adhesive. While in the raised position of FIG. 19A, the pins cool off, mainly through convection.

FIG. 19A also shows a slidable clamp 1940. When the operator places the frame 1930 on the table 1901, the operator slides the clamp 1940 to the desired location along the length of the frame. The clamp 1940 is mounted to a slide 1941, that slides along a fixed rail 1942. The exemplary clamp has a toggle 1943 to lock the clamp in place, but any type of clamping mechanism may be used.

After the adhesive 1936 is melted, the hot air is discontinued, and the cylinder 1983 is lowered, to lower the pins 1954 into the adhesive (as shown in FIG. 19B). This operation pushes the screen 1934 with the plurality of pins, so the screen contacts the adhesive across a length of the screen bar segment 1930. The pins 1954 may be mounted on the cool air plenum 1970. The plenum 1970 may have nozzles 1971 that continuously direct a second gas (e.g., cool air having a temperature which is below a melting temperature of the adhesive) at the pins 1954 at all times, except optionally when hot air is blowing, and/or nozzles that only direct cool air onto the adhesive 1936 when the pins are in the lowered position shown in FIG. 19B, blowing cool air onto the screen bar segment or the adhesive.

FIG. 19C shows the configuration in the corner of the apparatus 1900. To ensure proper insertion of the screen cloth 34 into the groove 1932 at the corner of the frame 1930, it is important that none of the pins 1954 in the corner (outside of the groove) clamps the cloth against the corner key 1990 and prevents proper insertion of the screen in the groove. Apparatus 1900 includes another means for restraining the corner pin(s) so they do not interfere with insertion.

The pins 1954 near the corner (or all of the pins 1954) have knobs 1981 at their top ends. A slidable block 1985 has a slot 1989 (FIG. 19B) for receiving the shaft of pin 1954, beneath knob 1981. The slot 1989 is sized larger than the shaft of pins 1954, but smaller than the knobs 1981. The block 1985 slides along a rail 1986. The corner pins 1954 can be easily lifted, and the block 1985 slides along rail 1986 to capture the knobs 1981 of any desired number of pins 1954. For a typical frame profile, one or two pins are sufficient. Once the desired number of pins are captured, a clamp 1987 holds the block 1985 in place during subsequent insertion operations. Any conventional clamp may be used for this purpose. With the cylinder 1983 in the lowered insertion position of FIG. 19C, the corner pin 1954 is secured above the corner key 1990. FIG. 19B shows one of the remaining unconstrained pins 1954 as it appears during insertion at the same time the corner pin of FIG. 19C is being restrained, with the cylinder 1983 in the same position as FIG. 19B.

An alternative means of repositioning the pins near the corner is to insert a block (not shown) between the top of bracket 1972 and the bottom of knob 1981. The block has a slot to receive the shaft of pin 1954. This block can be inserted manually or automatically.

Preferably, a PID controller is used to control the heating of the heating plenum assembly 1960. When the heating begins, the air supply is diverted from cold air manifold 1970 to the hot air plenum 1960. There is a blast of air over a coil 1962*a* that has heated up. If the temperature is too cold, it takes longer to melt the adhesive 1936. If the temperature is too hot, smoking may occur. Thus, it is desirable to control the temperature of the air leaving the nozzle 1957 to plus or minus five degrees C.

Although only one of the arms 1902.is shown in FIGS. 19A–19C, it is understood that the apparatus includes a plurality of arms, each arm having a plurality of pins mounted thereon.

FIGS. 19A and 19B also show modifications to the hot air plenum assembly 1960 to ensure more uniform heating of the air along the entire length of the plenum, so as to more uniformly provide heated air to melt the adhesive along the length of the screen bar segment 1930. The exemplary plenum assembly 1960 may have at least one heating element 1962 along the length of the plenum, to heat the air provided to the entire length of the screen bar segment.

FIGS. 19A and 19B show an alternative modification which may be used in addition to, or in place of, the heating element 1962. A baffle 1961 extends partially along said length of the plenum 1962, so as to transport heated air from a hotter end of the plenum to a cooler end of the plenum. Cool air flows through the baffle 1961 (at a rate of about 50 cubic feet per minute) and passes through openings 1961*a,* where the air is routed around a triangular heating element 1962, which includes a coil 1962*a* wrapped around an insulator 1962*b*. The exemplary heating coil produces about five kilowatts of power. The air is forced to travel through the coil 1962*a,* around the insulator 1962*b*. The heated air flows through the nozzle 1957 and through a rotatable orifice 1957 that can be directed towards relatively cool spots (e.g., near a corner) and away from relatively hot spots.

For example, because the corner of the frame 30 tends to receive less heated air than the rest of the frame, the corner tends to run cooler than the rest of the frame. One way to partially compensate is to direct the nozzle orifices near the corner to divert air from the side towards the corner. By using separate nozzle orifices 1957*a,* the sizes of the orifices can be used to distribute heat more evenly. For example, by putting smaller orifices near the middle of the frame side, and larger orifices near the corner, more flow of hot air is directed towards the corner. Still another way of evening the distribution of heat is to place the nozzles closer together near the cold spots (e.g., near the corner). If necessary, additional heat can be added using an external heater (not shown) near the corner.

In a variation of apparatus 1900 (not shown), it is also possible for the blocking member to be connected to the same arm-mounted sub-assembly 1970 that includes the pins 1954, so that blocking and insertion of the screen material are performed by a single downward motion of the press assembly (or upward motion of the platen assembly). To prevent the block from catching and pulling the screen cloth 1934, the screen cloth must be cut to approximately its final size, so that the screen cloth does not hang over the outside edge of screen bar 1930. In addition, the block has a ramped or curved edge, which prevents the block from crushing or damaging frame 1930. Because the screen bar is formed with a convex camber, the block bends the frame 1930 inward while descending, and the ramped surface employs a cam action to gradually bend the frame.

In this variation, the block travels a longer distance while contacting the screen bar 1930 than the thickness of the adhesive 1936, so that the frame 1930 is straightened and blocked into place before the pins push the screen cloth into the adhesive 1936. This is important to ensure that the pins 1954 are properly aligned with the groove 1932.

In this variation, when the pins 1954 reach the bottom of the groove 1932, the blocking member is in place to block the screen bar segment. When the cylinder 1983 is actuated to raise the cold air plenum 1970 and pins 1954, the blocking member is raised, to allow easy removal of the completed frame. To make sure that the block does not pull the frame 1930 up when the cooling plenum assembly is raised, block 1940 should have a non-stick coating, such as TFE. A spring may also be used on top of the frame, to push the frame away from the block.

Reference is again made to FIG. 1. FIG. 1 shows a preferred configuration of the apparatus 100 in plan view. FIG. 1 shows an "L" shaped assembly, capable of securing two sides 30*c* and 30*d* of a screen assembly simultaneously. A screen bar frame 30 is shown in position along with pre-loading blocks 40. FIGS. 2–4 show an exemplary pneumatic cylinder actuator assembly 80 to position the plenum block 50 in the three different positions as shown in FIGS. 2–4.

The plurality of nozzles 58 may include nozzles proximate to all four frame members 30*a*–30*d* to heat all four members simultaneously for screen insertion. Of course, the apparatus may also be configured to bond one side at a time. It is preferred, however, to heat and insert only two or three sides simultaneously rather than all four sides, as this simplifies the design of the machine and reduces set-up time for different size screen assemblies. It may be most preferred to heat and insert two sides 30*c* and 30*d* using an "L"-shape nozzle and pin insertion assembly. Once two sides are completed (as described herein) the frame 30 is removed from the machine 100, rotated 180 degrees and re-inserted into the machine 100 to complete the other two sides of the screen assembly.

Similarly, for an octagonal window (not shown), it may be preferred to include nozzles 58 and pins 54 for heating and inserting two contiguous sides simultaneously. Instead of the pins being arranged in a right angle, the pins may be arranged in a 135° angle, so that any arbitrarily sized equilateral octagon is accommodated by one machine. The first two sides are bonded. The frame is rotated 90 degrees, and the next two sides are then bonded. This is repeated a total of four times, so that all eight sides are bonded.

Additional configurations for non-rectangular windows may include an "L" shaped apparatus with articulating arms, to accommodate a variety of angles between sides. Alternatively, any polygon can be accommodated by configuring the apparatus to bond only one side at a time.

Further, the apparatus may be configured with pins on two opposite sides (not shown). For example, there may be one fixed row of pins and a movable row of pins parallel to the fixed row of pins. The movable row of pins may be moved closer to (or further from) the fixed row of pins, to accommodate two sides of a rectangular or octagonal window simultaneously.

Only one degree of freedom, namely up and down motion, is used in this example to position the heating, inserting and cooling apparatus 52. Although other arrangements may include additional degrees of freedom to position the inserting and cooling apparatus 52, the single degree of freedom (with three positions) may be preferred to minimize cost and design complexity.

Other exemplary arrangements (not shown) may include having separate hot and cold air nozzles, optionally locating the hot and cold nozzles in separate rows with separate angles to direct the air onto the adhesive. If separate rows of hot and cold air nozzles are included, it may be necessary (depending on the location and angle of the nozzles) to either move the frame, or move the apparatus relative to the frame, when switching between hot and cold air.

FIG. 1 shows a work station including two machines 100 in service orientation with the operator in between the machines. This may be the preferred arrangement as it allows one machine 100 to be loaded and unloaded while the other machine is performing the automated insertion sequence. This approach is believed to maximize throughput for a single operator.

As shown in FIG. 1, the heating, inserting and cooling apparatus 52 is located closer to the outside of the "L" members 90. This arrangement may be more preferred generally, as it is versatile and is preferred for larger screen assemblies where the operator stands between machines 100 as shown in FIG. 1. Having the pins 54 and nozzles 58 to the outside of the "L" facilitates viewing and positioning the screen cloth 34 prior to insertion.

Figure 12:
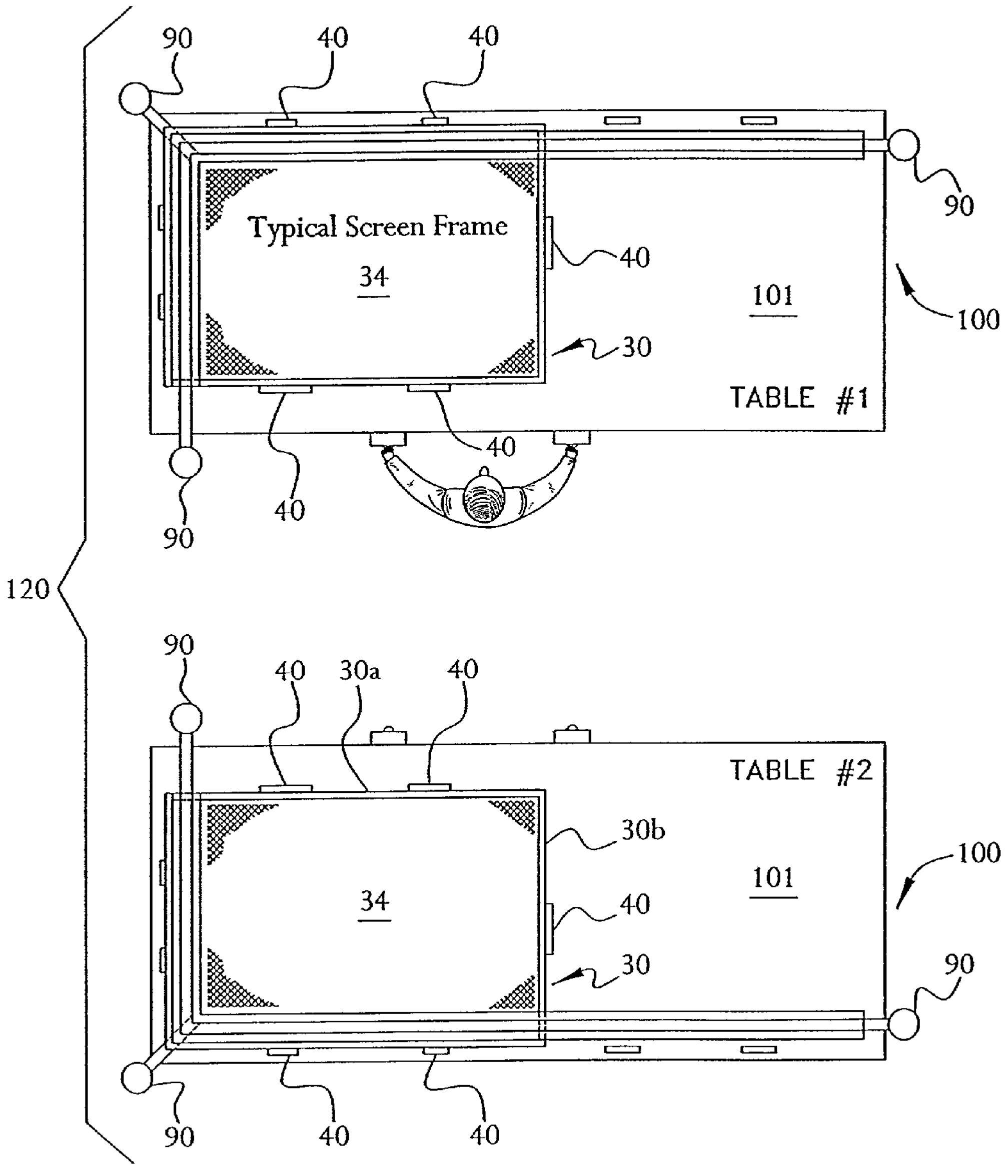
FIG. 12 is a top plan view showing a second exemplary station including two frame assembly machines according to the present invention arranged in an alternative configuration.

FIG. 12 shows an alternative for positioning the two machines 100. The heating, inserting and cooling apparatus 52 may alternatively be located on the outer perimeter of the two-machine configuration, further from the operator. This configuration may be preferred for smaller width machines that are limited to making smaller width screen assemblies. This alternative configuration, being narrow, may be easier for handling (i.e. loading and unloading) smaller screen frames. For larger screens (i.e. greater than approximately 60 cm wide), viewing and positioning the screen cloth 34 becomes difficult with the configuration of FIG. 12.

In both the configurations (FIGS. 1 and 12) the pins 54 and nozzles 58 are preferably arranged along the side of the apparatus closer to the operator.

Insertion Pin Design

The pins 54 are used both to insert the screen cloth 34 and remove the slack from the cloth. Essentially, the action of pushing the screen cloth 34 past the tensioning step 32, (which is preferably a groove), pulls the cloth 34 taut and pulls out small wrinkles. The taut screen 34 thus holds the pre-bowed frame members 30*a*–30*d* straight upon removing the assembly 30 from the pre-loading blocks 40 upon cycle completion. In effect, both the insertion of the pins 54 over the tensioning step 32 and the pre-loading of the frame 30 contribute to consistently setting the desired tension. Thus, it is believed to be most preferred to use both means together. However, tensioning may be achieved by either method, if used alone.

The insertion pins are large enough to push the open mesh screen cloth 34 into the molten adhesive 36 without passing through the mesh and missing the strands. If the tensioning step 32 is in a groove, the pins 54 must be sized to fit into the groove. The exemplary pins 54 have an axis of rotational symmetry; they are generally approximately cylindrical in shape. In experiments conducted by the inventor, the preferred pin diameter was greater than 0.15 cm (0.060") and smaller than 0.34 cm (0.135") to work effectively with common fiberglass window screen and a screen bar groove of 0.140". The most preferred diameter observed was 0.25 cm (0.100") to 0.3 cm (0.120"). Rectangular shaped pins also appear to function well. Rectangular pins may have a cross section with a larger dimension of about 0.3 cm (0.12") to 1.27 cm (0.5"), big enough so that the pins 54 do not enter the holes in the screen material 34 during insertion. A cross-section of 0.6 cm to 1.27 cm is preferred. One of ordinary skill in the art can readily provide alternate pin cross-sections without any undue experimentation. The larger dimension of the pins may be nearly as wide as the center-to-center spacing between successive pins.

The mechanism of insertion using pins 54 is different from the spline insertion mechanism in the prior art. The pins 54 push the screen material 34 into the adhesive substantially without any friction between the screen and the mounting surface. The screen is held in place by the adhesive, not by friction. Because this method does not rely on friction between the screen material and the mounting surface, it is possible to use thinner screen bar material than could be used with conventional spline methods. In contrast, the spline technique relies on friction to hold the screen to the frame; a heavy frame material is needed to absorb the insertion force.

The preferred spacing of the pins is between 0.63 cm (0.25 inch) to 2.54 cm (1.0 inch) to achieve a practical design. Pins spaced further apart than 2.54 cm are not as effective at pushing the screen 34 in the molten adhesive 36 between the pins. Pins closer together than 0.63 cm do not improve the insertion and only add cost. The most preferred spacing is approximately 1.27 cm.

It is important for the pins 54 to extract cleanly from the adhesive 36 (after it has solidified) without undue forces and without strings of adhesive forming as the pins are extracted. Waiting until the adhesive 36 has fully solidified (forced air cooling helps to reduce the cooling time) avoids formation of strings in the adhesive upon extracting the pins 54 from the adhesive 36. Preferably, the pins 54 are smooth (preferably polished), or coated with a release coating such as tetrafluouroethylene (TFE) or the like, to prevent the adhesive 36 from bonding to the pins 54. Exemplary pin materials include aluminum, brass and stainless steel. Stainless steel offer the best durability, corrosion resistance and surface qualities for extraction and is thus believed to be the preferred material. Other materials such as ceramic or high temperature plastic may also be used. Further, pins formed of chrome (or plated with chrome) or TFE are also contemplated. A beryllium material may be preferred for the pins. Beryllium offers high strength and wear resistance and high thermal conductivity for rapid cooling of the adhesive.

Spring loaded pins 54 may travel approximately the depth of the groove 32 and allow the screen 34 to be assembled without interference by the pins 54 at the corner key of the frame 30 being assembled. Essentially, the pins 54 are pushed up, compressing the springs 56, at the corners of the frame 30. Thus, it is unnecessary to remove pins 54 to accommodate different sized screen frames 30. This feature may be used where the screen cloth is cut to size, instead of designs (e.g., FIG. 17) in which the pins are adjusted or removed to accommodate differently sized frames, which increases set up time between fabrication of two screen assemblies having different sizes. In the exemplary embodiment, the springs are intended to be compressed only when there is interference at the corners. Along the sides, the remaining pins inserting the screen typically do not compress their respective springs.

Figure 17:
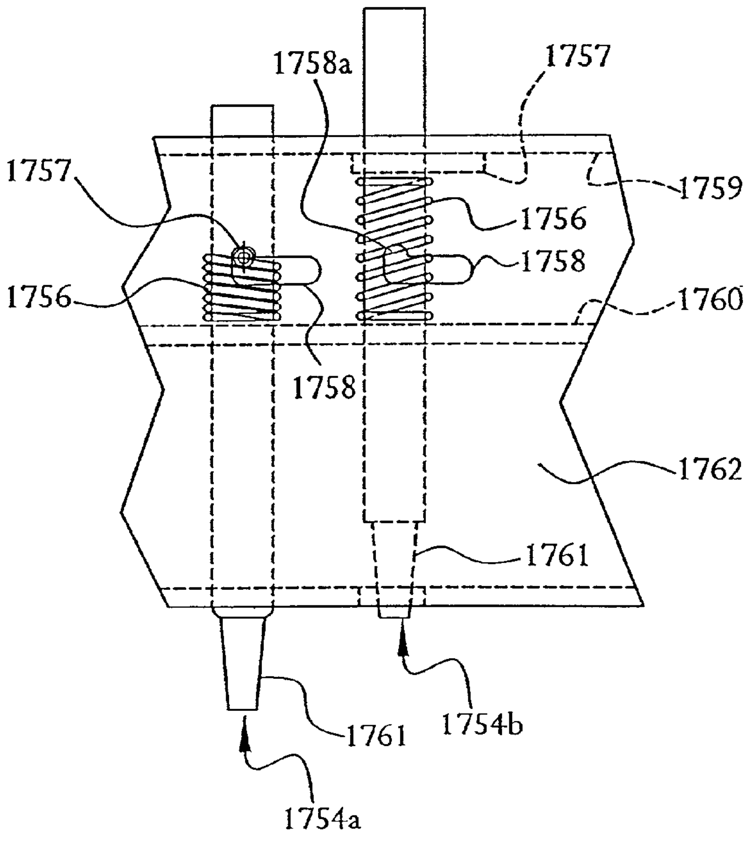
FIG. 17 shows an alternative embodiment of the inserting pin shown in FIG. 5

FIG. 17 shows a variation of the pins. Each bayonet pin 1754*a* and 1754*b* has a roll pin 1757 mounted perpendicular to the axis of the pin. Bayonet pins 1754*a* and 1754*b* may be easily switched (manually) between two different positions, as an alternative to using spring loaded pins. In FIG. 17, the left pin 1754*a* is in the extended position, and the right pin 1754*b* is in the retracted position. A bias spring 1756 biases the bayonet pins 1754 towards the retracted position of the right pin. Spring 1756 is compressed between the roll pin 1757 and a flange 1760, pulling the pin 1754*b* towards its retracted position.

The pins 1754*a* and 1754*b* are sandwiched between a front web 1762 and a rear web (not shown) behind the front web, forming a channel. Roll pins 1757 are longer than the width of this channel, so the pin 1754*b* cannot rotate freely within the channel. The front web 1762 has a horizontal slot 1758 that allows roll pin 1757 to rotate only when the roll pin is positioned at the height of the slot. With roll pin 1757 at the height of the slot 1758, pin 1754*a* can be (manually) rotated until roll pin 1757 reaches the detent 1758*a*. If pin 1754*a* is released with roll pin 1757 projecting through detent 1758*a*, pin 1754*a* is prevented from inadvertent rotation. Thus, pin 1754*a* is locked in the extended position, as shown.

To switch a pin 1754*a* to its retracted position, pin 1754*a* is pulled down, to free roll pin 1757 of detent 1758*a*, and pin 1754 is rotated until the roll pin 1757 is freed from slot 1758. Pin 1754*a* is then released, and spring 1756 retracts pin 1754*a* to the position of pin 1754*b*.

Using the pins shown in FIG. 17, the pins near the center of the row of pins may be held rigidly in the extended position, while pins over the corner keys of the row are retracted so as to avoid interference with the relative movement between the inserting apparatus and the frame being assembled.

Another aspect of the pins 1754*a* and 1754*b* is the use of a tapered end 1761. The tapered ends assist in ensuring that the adhesive does not stick to the pins with the pins are removed. By including only a few degrees of draft angle, the cleanness of the extraction is significantly improved.

Tapered end 1761 also helps assure proper insertion, even if there is a slight misalignment between the pin 1754*a*, 1754*b* and the groove or tensioning step of the frame.

The tapered pin 1761 may even allow the use of a pin size that approaches the width of the groove, whereas a straight pin would be more likely to catch on the edge of the groove in the event of any slight misalignment. If pins are used that approach the size of the groove, then there would be friction between the screen 34 and the sides of the groove during insertion. This friction will cause greater tension in the cloth during insertion, and could result in localized over-tensioning and visible distortion at the pins. To prevent hourglassing if pins that approach the size of the groove are used, stop blocks should also be used inside the frame. Stop block 41 is a backstop to limit the amount of movement to ensure that the screen bar is held straight when the pre-loading block 40 is pushed against the screen bar frame on two sides.

In a further variation of the exemplary embodiments, the pins may be formed of adhesive. Instead of using a pre-installed adhesive, the adhesive pins may be used to insert the cloth. Once the cloth is inserted, the pins may be melted using heated gas or heat from the frame, as described above. The frame and adhesive can then be cooled using cool gas provided from a plenum, as described above. If glue pins are used, the diameter of the pins should be larger than the diameter of the metal pins described above, to insure good contact and wetting between the adhesive and the surfaces of the tensioning step. In this variation, the cloth can optionally be applied to all four sides simultaneously.

Methods of Heating

Although many different methods of heating would be effective for practicing the exemplary method of FIGS. 2–4, forced convection with hot air blowing directly onto the adhesive 36 is believed to be most preferred, because it is simple, fast, consistent and controllable. It is also the most cost-effective approach. Focussing the hot air onto the adhesive 36 (and not onto the surrounding frame substrate 30*a*–30*d*) quickens the melting of the adhesive 36 and avoids warming the substrate excessively. Keeping the frame substrate as cool as possible during the heating cycle reduces the cooling cycle time, because a cooler substrate sinks the heat away from the adhesive 36 more rapidly. Also, increasing the impingement velocity of the air onto the adhesive 36 increases the mass flow rate of air and the convective heat transfer coefficient, and thus increases the rate of heating. The trade-off is increased cost, and increased noise.

Other heated gases may be used, including, for example, nitrogen or an inert gas.

To achieve a 10 second heating time with an exemplary Henkel 6107 polyamide adhesive, air at 350° F. and 2 standard cubic feet per minute (SCFM) per inch is blown directly onto the adhesive 36, through the screen 34. (The 350° F. temperature does not create a hazard). Although faster rates may be achieved by increasing the flow rate, this is a reasonable, effective rate of heating. Increasing the temperature would also increase the heating rate, but may generate undesirable smoke.

A 2"×2" (5 cm×5 cm) plenum having an attached nozzle with an opening of 0.050"(1.27 cm) wide and continuous in length (at least as long as the screen bar) positioned approximately ¼" (0.63 cm) away from the screen frame 30 was found to be effective (see FIG. 3). To achieve the desired 2 SCFM of 350° F. (177° C.) air per inch for a machine that can secure 2 sides of a 6'×3' (182 cm×91 cm) screen simultaneously, approximately 200 SCFM total air volume is used. A minimum temperature for the hot air is greater than the melting temperature of the specific adhesive used.

Many different methods may be used to supply the hot air to the plenum 60. The exemplary method is to pass air from a blower (not shown) through an electric heat exchanger (not shown), which is simpler, or indirect gas fired heat exchanger (less expensive). To deliver the hot air using the electric heat exchanger, a Leister ASO blower, model 9K attached to two Leister 10,000S tools, model 8D7 attached to each end of the "L" shaped plenum (see FIG. 3) may be used. Leister ElektroGeratebau is located at 6056 Kagiswil/Switzerland.

Although the embodiment of FIGS. 1–5 includes insulation around the nozzle, as shown in FIG. 18, the nozzles 1859 may be surrounded with a high thermal conductivity, high thermal diffusivity material 1889, such as copper. This allows heat from the nozzles to be rapidly dissipated between the heating step and the cooling step, so that the nozzle does not heat the cool gas that is used to cool the adhesive.

Referring again to FIGS. 1–5, conductive heating through the aluminum substrate of frame 30, although potentially faster than hot air (convection), may be difficult to achieve for some screen bar profiles, due to the contours of the profile shape of the screen bar. The frame 30 may be pre-heated by a variety of methods. The heated gas nozzles may be directed onto the frame 30 instead of the adhesive 36. Alternatively, the frame may be pre-heated in an oven or heating apparatus. If the frame is pre-heated, the maximum temperature of the oven or heating apparatus must be sufficiently low so as not to damage any plastic components (e.g., corners) of the frame. This would also facilitate insertion of four sides simultaneously.

Using conductive heating through the pins 54 or other elements directly onto the adhesive 36 would not be effective in heating the adhesive between the pins, and wrinkles in the material would result, unless the pins are very close together. Tensioning and cooling may also be more difficult with this approach.

Induction heating may be impractical, if used to heat the entire frame simultaneously and is more costly than hot air (convective) heating. Induction heating is better suited to a continuous feed operation, heating a small area only.

Infrared (radiant) heating is not preferred, as the higher temperatures involved may cause undesirable smoke from the screen if the screen is positioned between the emitter and adhesive during operation. Infrared is typically more expensive than convective heating and more cumbersome to integrate into the design.

Operation

Briefly summarizing, the assembly machine operator loads the machine 100 with screen frames 30, positions the screen cloth 34, initiates the automated assemble sequence by activating a control, and unloads the finished screen assemblies when they are completed.

Preferably, the screen bar has pre-applied hot melt adhesive in the groove 32 (or at the base of the tensioning step). The assembly sequence is as follows:

The pre-assembled screen frame 30 is loaded onto the blocking table 101 where the pre-bow in the screenbar is straightened using blocking on the outside of the frame. Essentially, the pre-bowed screen bar is made into a frame 30, the frame 30 is then mounted onto the surface 101 of a table, and pre-loading blocks 40 are used to straighten or slightly hourglass the frames 30 (or distort the frame into any desired camber for tensioning the screen). This is called "blocking". After the screen cloth 34 is installed and the finished screen assembly is removed from the pre-loading blocks 40, the frame members 30*a*–30*d* attempt to return to their pre-bowed condition due to their inherent elasticity. When this occurs, the screen cloth 34 is put under additional tension beyond that imparted by the tensioning step during the insertion operation, but the frame members 30*a*–30*d* stay straight due to the high modulus of the screen material. Both the tensioning step 32 and pins 54, and blocking 40, contribute to create the desired screen tension, which is sufficient to remove wrinkles.

Figure 16:
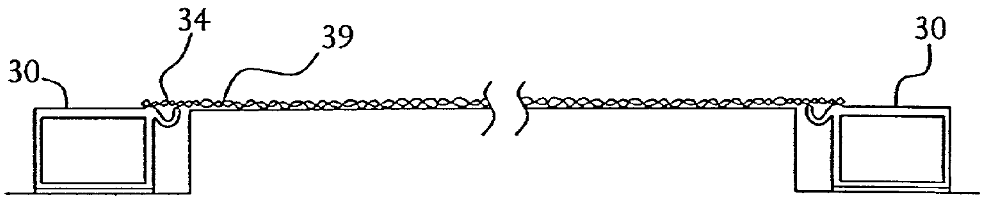
FIG. 16 shows a detail of the apparatus of FIG. 1.

The screen (cloth) 34 is positioned with its edges over the groove 32 or tensioning step, and extends past the groove 32 or tensioning step by a small amount to allow the subsequent insertion into the adhesive 36. As best seen in FIG. 16, screen fabric 34 is preferably supported on a surface 39 during the fabrication operation. Preferably, surface 39 has a height that is substantially the same as the height of the tensioning step. This allows the screen fabric 34 to lay flat during fabrication. Thus, the screen material does not sag, and there is less slack in the screen cloth during assembly, which improves consistency.

The automated sequence is started by activating a control (which may be, for example, a button, toggle, switch, knob, or the like.)

An elongated (tubular plenum) hot air nozzle assembly positioned over the screen bar lowers to blow hot air at approximately 350° F. (177° C.) into the area of the adhesive 36 (i.e. into and/or around the groove 32 or tensioning step where the adhesive 36 is located).

Once the adhesive is melted (approximately 7–10 seconds when the air flow is approximately 2 SCFM per linear inch) the flow of hot air is shut off, and the screen insertion pins 54, positioned in line over the groove 32, push the screen cloth 34 into the molten hot melt adhesive 36. The strands of the screen cloth 54 are thus embedded into either a bead (most preferred) of molten adhesive 36 or pushed in contact with a film of molten adhesive. (Note: this adhesive may have been applied previously, preferably at the time of manufacture of the screen bar 30*a*–30*d*). The screen cloth 34 is held in the molten hot melt adhesive 36 by the pins 54 until the adhesive 36 has solidified by cooling.

During testing, cooling was observed to take 10 to 15 seconds when the adhesive was allowed to cool naturally in the ambient air. Forced air cooling by blowing room temperature or chilled air onto the adhesive and onto the screen bar speeds up the rate of cooling and is thus preferred. By blowing room temperature air at the adhesive at approximately 2 SCFM per linear inch, the cooling time is decreased to approximately 5 seconds.

After the adhesive 36 is solidified, the insertion pins 54 are extracted and the finished screen assembly is removed. Allowing the adhesive to solidify completely before the pins 54 are removed ensures that the pins 54 extract cleanly from the adhesive 36. Extraction is not a problem when smooth pins 54 are used. A release coating such as TFE may be used on the pins to lower the force of extraction and reduce the possibility of adhesive bonding to the pins and is thus preferred (but not necessary.)

Assuming that the apparatus inserts two sides of the screen, and that a four side screen is being inserted, the screen is rotated by 180 degrees, and steps 1–6 are repeated. Then insertion of the screen material is completed.

Apparatus for Simultaneous Insertion of Four Sides

Figure 20:
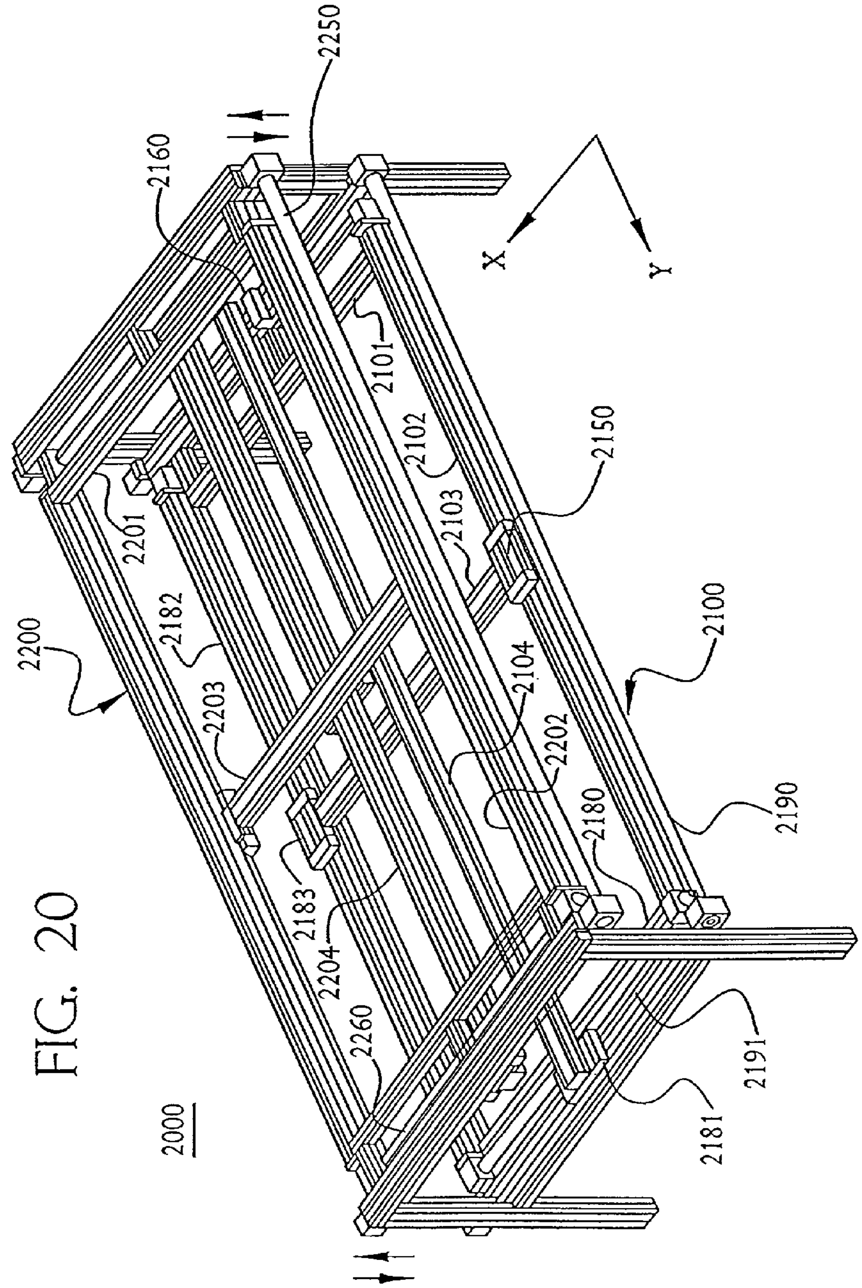
FIG. 20 is an isometric view of another exemplary embodiment of the invention.

FIG. 20 shows a further exemplary apparatus 2000 according to the present invention. Apparatus 2000 is configured for inserting screen fabric 34 into all four sides 30*a*–30*d* of a frame 30 simultaneously. The exemplary apparatus 2000 is also configured to accommodate a variety of frame sizes, and does not require a priori knowledge of the size of each frame 30 loaded on the apparatus. The operation of the exemplary apparatus 2000 is controlled by a programmable logic controller (PLC) 2900 (shown in FIG. 29), using ladder logic, although other control apparatus may be used.

Apparatus 2000 includes three main subassemblies: a clamping subassembly 2100, a press subassembly 2200 positioned directly above clamping subassembly 2100, and a screen support 2800 (FIG. 28) that prevents screen 34 from sagging or falling through the frame members during insertion. Clamping subassembly 2100, press subassembly 2200, and support 2800 are operated by a process controller 2900. A frame 30 is pre-heated in an oven (not shown) to melt its adhesive 36. A pre-cut screen 34 is placed on the frame, and the frame and screen are placed on the clamping subassembly 2100. Clamping subassembly 2100 positions, straightens, and measures frame 30. The measurement information is transmitted to the controller 2900, which configures the press subassembly 2200, based on the measurements, to accommodate the size of frame 30. Press subassembly 2200 has a plurality of insertion pins 2222, 2242 depending from its lower surfaces. When press subassembly 2200 is lowered, the insertion pins 2222, 2242 simultaneously insert the screen 34 into the adhesive 36. The structure of the clamping subassembly 2100 and press subassembly 2200 are explained below, followed by a detailed description of the operation of apparatus 2000.

The pre-loading function of the apparatus of FIG. 20 may be contrasted with the pre-bowing of the apparatus 100 of FIGS. 1–4. In both instances, the screen bar material begins with a convex camber, bowing outward slightly at the center of each side of the frame. In the apparatus 100, two sides are clamped and two sides are free during insertion, so there is relatively little tension placed on the screen cloth. Consequently, in apparatus 100, before inserting the screen, the clamped frame members 30*a*, 30*b* are pre-bowed to a slightly hourglassed camber. In contrast, apparatus 2000 of FIG. 20 inserts the screen cloth all four sides of the frame simultaneously, creating the potential to impart greater tension. Therefore, apparatus 2000 pre-bows the frame to an approximately straight shape before inserting the screen; it is not necessary to pre-bow the frame to an hourglass shape.

Figure 21:
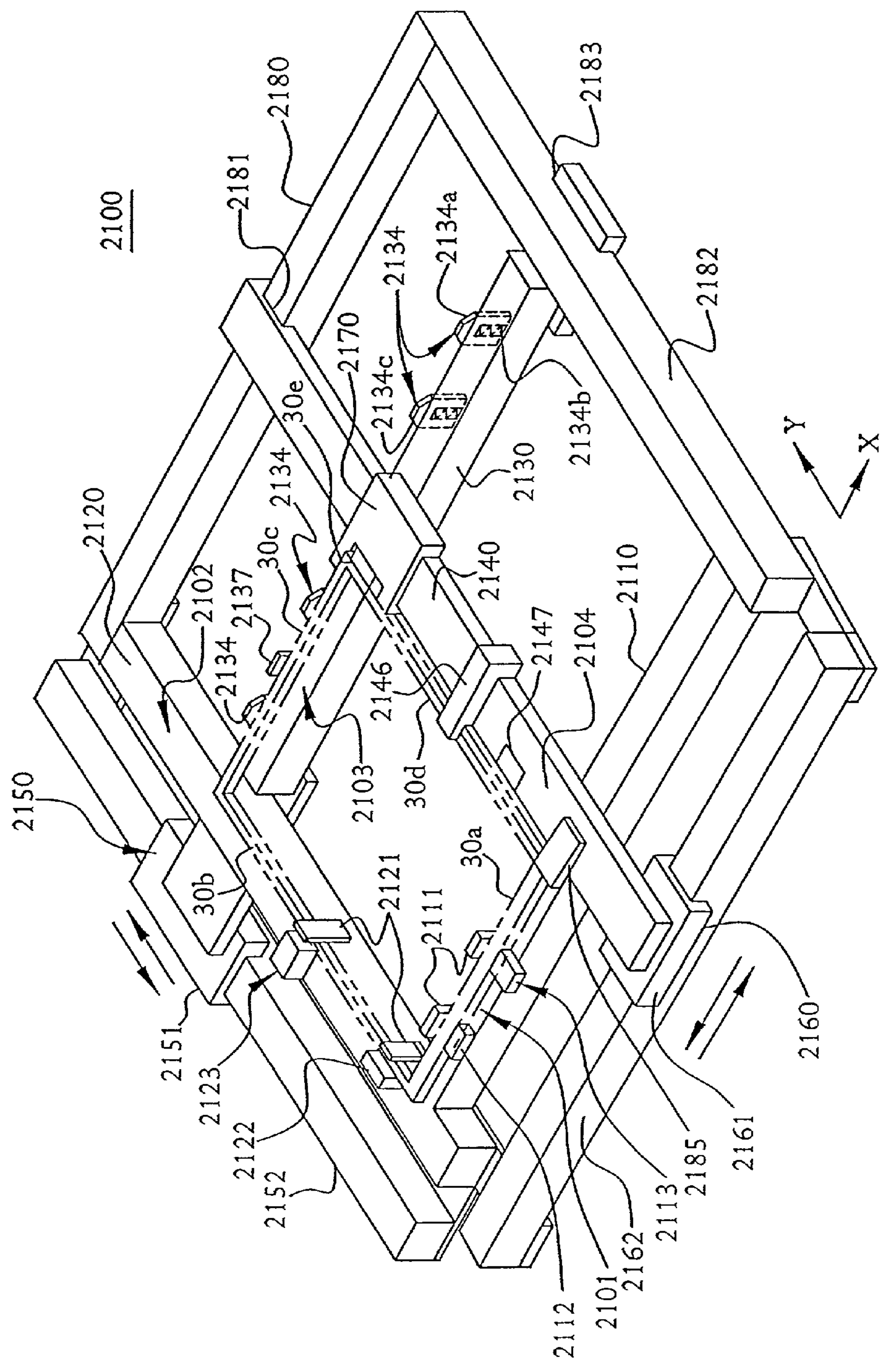
FIG. 21 is an isometric view of the clamping subassembly shown in FIG. 20.

FIG. 21 is an isometric view of clamping subassembly 2100. Clamping subassembly 2100 has a first fixed frame support 2101 and second fixed frame support 2102, on which are placed the first side member 30*a* and second side member 30*b* of the frame 30, respectively. A movable frame support 2103 is automatically slidable under the third side member 30*c* of the frame 30. A movable clamping arm 2104 automatically compresses the fourth side member 30*d* towards the second side member 30*b*. The first fixed frame support 2101, second fixed frame support 2102 and the movable frame support 2103 are coplanar, forming a three-sided support surface on which members 30*a*–30*c* rest during screen insertion. The movable clamping arm 2104 is slidably mounted above the supports 2101–2103, and is immediately adjacent to the fourth frame side member 30*d*. The four arms 2101–2104 together provide a clamping structure for the frame 30.

One of the functions of the subassembly 2100 is to register and properly position the frame 30 for screen insertion. Because apparatus 2000 does not require a priori knowledge of the size of frame 30, a standard positioning convention is used. In most screen frames 30, regardless of the frame dimensions, the registration distance RD (shown in FIG. 10) between the inside edge (lip) of the screen bar segment 30*a* and the centerline of the spline (insertion)

groove 32 is a constant for all screen profiles. The inner edge RE of the screen bar 30*a* (FIG. 10) is used as the reference edge.

As shown in FIG. 21, three screen bar segments 30*a*–30*c* of the frame 30 rest on respective arm assemblies 2101–2103, which are described in detail below. Screen bar segment 30*a* is positioned on arm assembly 2101 and the inner reference edge RE of segment 30*a* is placed against the registration clamp 2111. A profile clamp 2113 is actuated to contact and clamp the outer edge OE (FIG. 10) of the screen bar 30*a*, and the profile of screen bar 30*a* may be measured using an LVDT (linear variable differential transformer), which may be combined in a single unit with clamp 2113. The device measures the distance between the inner and outer edges of the screen bar 30*a*. Device 2113 provides the controller 2900 with the profile of the screen bar, for use in positioning the insertion pins 2222, discussed below.

As an alternative to an LVDT, other high precision measuring devices may be used. For example, it is known to provide an actuating cylinder with an integral linear potentiometer. An exemplary device capable of performing the clamping and profile measuring functions is a position-feedback pneumatic cylinder with an integral linear resistive transducer, part No. PFC-091-X, manufactured by the Bimba Manufacturing Co., Monee, Ill., USA. This device has a linear potentiometer with a probe that measures extension of the cylinder. The exemplary device has a 2.7 cm (1 1/16") bore and a 2.5 cm (1") stroke, and provides an output of 0–10 Volts. The analog output signal is provided to an analog-to-digital converter, which outputs a digital signal to the controller 2900.

The first arm assembly 2101 of the clamping subassembly 2100 includes a frame member 2110, registration clamp stops 2111, one or more outer clamp blocks 2112, and the clamp/position-feedback cylinder 2113. The first arm 2110 is fixed in the horizontal plane to provide a reference position. The frame member 2110 may be formed from an aluminum extrusion, for example a 6105-T5 aluminum material. An air cylinder 2924 (FIG. 29) applies a light clamping pressure to the profile clamps 2112 and 2113, which results in a total clamping force of about 9–13 Newtons (2–3 pounds). A control valve (e.g., a spool valve 2922, FIG. 29) controls the flow of air to the cylinder to close the profile clamps.

Although FIG. 21 only shows two centrally located clamping members 2111, it is desirable to have clamping members 2111 at the ends of frame member 30*a*, as near as possible to the corner key. This provides the clamping force at the ends, so as to avoid excess deformation of the frame members, which could occur if the whole clamping force were applied in the middle of the frame members. Similarly, it is desirable to position clamping members on each of the other three frame members 30*b*–30*d*, as close as possible to the corner keys.

As noted above, clamping subassembly 2100 pre-loads frame 30 to a straight condition. Because the corner keys of frame 30 may project in the "Y" direction beyond the outer edge of screen bar segment 30*a*, a single, monolithic clamping member that would contact the corner keys would not be able to remove all of the convex pre-bow that the frame may have; the center of the frame member 30*a* would be bowed out by an amount approximately equal to the distance by which the corner keys protrude beyond the frame member 30*a*. Therefore, the clamping is only done by direct contact with the frame members 30*a*–30*d*, and not with the corner keys 30*e*. For this purpose, clamping members 2112, 2122 are spaced about every 30–45 cm (12"–18") apart along each arm assembly 2101, 2102.

A second arm assembly 2102 of the clamping subassembly 2100 provides a second registration edge and a second clamping function. The structure and operation of the second arm assembly 2102 is similar to those of the first arm assembly 2101, except that the second arm assembly does not require an LVDT (assuming that all four of the screen bar segments 30*a*–30*d* of the frame 30 have the same profile, as is typical). The first and second arm assemblies 2101 and 2102 meet to form an "L" shaped support beneath segments 30*a* and 30*b* of frame 30. The second arm assembly 2102 includes a frame member 2120, registration clamp stops 2121, and one or more outer profile clamps 2122 and 2123. The second arm assembly 2102 is fixed in the horizontal plane to provide a reference position. The inner edge RE of second frame segment 30*b* is registered against registration clamp stops 2121. An air cylinder 2922 (FIG. 29) applies a light clamping pressure to the profile clamps 2122 and 2123. The profile clamps 2122 and 2123 may be operated and controlled by the same spool valve that controls the profile clamps of the first arm assembly 2101, because the profile clamps of the first and second arm assemblies 2101 and 2102 are closed and opened at the same times.

A third arm assembly 2103 of the clamping subassembly 2100 is movable. Movable frame support 2103 performs several functions including: supporting screen bar segment 30*c*; clamping the frame 30 in the "Y" direction to steady the frame 30 and remove the convex camber (pre-bow) from screen bar segment 30*c*; measuring the "Y" dimension of frame 30; and providing the dimension information to the controller 2900 for positioning a corresponding arm 2203 (FIG. 22) that inserts the screen 34 in the adhesive in screen bar segment 30*c*.

Movable frame support 2103 is actuated using one or two rodless pneumatic cylinders 2150. The rodless cylinder 2150 may be a conventional model no. 40 rodless pneumatic cylinder manufactured by Lanamatic AG, of Lengwil/Oberhofen, Switzerland. Only one rodless cylinder 2150 is shown in FIG. 21; two are shown in FIG. 20. If two rodless cylinders 2150 are used, as shown in FIG. 20, both must be actuated simultaneously in the same direction. If only one rodless cylinder 2150 is used (as shown in FIG. 21), then the end of movable frame support 2103 opposite the rodless cylinder 2150 may be slidably supported on extrusion 2182 by a conventional linear motion flange bearing 2183, such as those manufactured by 80/20 Inc. of Columbia City, Ind., or those described in U.S. Pat. No. 5,429,438.

The arm 2130 is mechanically attached to the yoke 2151 of the rodless cylinder 2150. The rodless cylinder 2150 includes direct power transmission, from a double-acting cylinder (not shown) inside the tube 2152 of the rodless cylinder. The double-acting cylinder is connected through a slot (not shown) in the tube 2152 to the yoke 2151.

Figure 29:
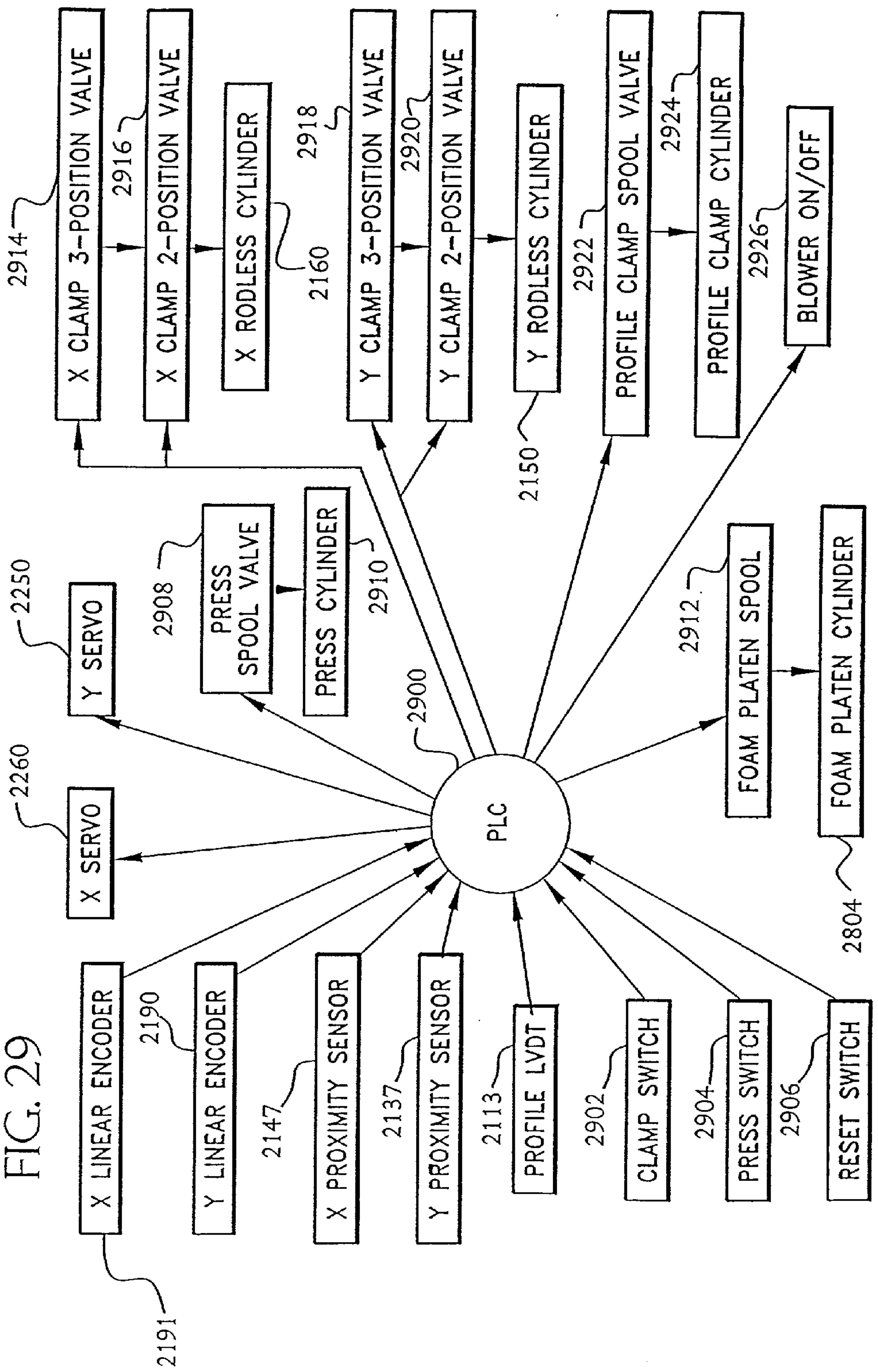
FIG. 29 is a block diagram of the control system for the apparatus of FIG. 20.

The rodless cylinder 2150 is driven by at least one control valve 2914, 2916 (FIG. 29). Preferably, two control valves 2914, 2916 are used, to give the rodless cylinder multiple actuating speeds. For example, direction control can be provided using a five-way, three-position, fast-open/stop/fast-close valve 2914 (FIG. 29); a speed control can be provided by a five-way, two-position, fast/slow valve 2916 (FIG. 29) in series with the three-position, direction-control valve. Alternatively, a single three-position valve may be used, operating only at the slow speed, which may increase the length of the cycle whenever the frame size is changed.

Reference is again made to FIG. 21. One of ordinary skill recognizes that alternative actuating mechanisms may be used. For example, instead of a rodless cylinder, each end of arm 2130 may be connected to a respective timing belt, each timing belt coupled to a timing belt pulley, with the two timing belt pulleys connected to each other to rotate together. A pneumatic or electric drive motor would also be included.

Movable frame support 2103 has a plurality of spring loaded back stops 2134. Back stops 2134 engage the third screen bar segment 30*c,* and clamp the frame in the "Y" direction. Each back stop 2134 has a stop member 2134*a* that is biased by a spring 2134*b* to the raised position shown in FIG. 21. Each stop member 2134*a* has two ramped or chamfered corners 2134*c*. When the movable clamping arm assembly 2104 (described below) slides across the movable frame support 2103, stops 2134 are pushed down by cam action to permit assembly 2104 to pass.

A screen frame proximity sensor 2137 on the third arm 2130 detects when the third arm 2130 approaches within a predetermined distance from the third screen bar segment 30*c*. Before the movable frame support 2103 approaches the screen bar segment 30*c,* the assembly 2103 can be moved towards the frame 30 at the fast speed. The proximity sensor 2137 determines when the spool valves controlling the rodless cylinder 2150 are adjusted to reduce the speed of approach. This ensures that the arm assembly 2103 moves in slowly beneath the screen bar segment 30*c* and does not damage the frame 30. A variety of conventional proximity sensors may be used, such as optical or capacitance type sensors.

When the frame 30 is first placed on the apparatus, only two screen bar segments 30*a* and 30*b* are supported from underneath by arm members 2110 and 2120. Thus, it is possible for the unsupported corner of the frame 30*e* (between segments 30*c* and 30*d*) to sag. Optionally, the third arm 2130 may have a ramp or chamfer on its leading edge (not shown), to scoop up the third screen bar segment 30*c*. By moving the third arm assembly 2103 inward slowly, the third screen bar segment 30*c* is lifted up by the ramped or chamfered surface, using a cam action.

As best seen in FIG. 20, a conventional TTL linear encoder 2190 may be used to accurately measure the "Y" position of the movable frame support 2103, and provide a digital output signal to the controller 2900. The sensor of the linear encoder 2190 may be placed on the yoke 2151 of the rodless cylinder 2150. An exemplary linear encoder suitable for this purpose is model No. LR 005 N D3, Dynapar brand LR/LS inductive linear encoder, manufactured by the Bimba Manufacturing Co., Gurnee, Ill., USA.

The movable clamping arm assembly 2104 accommodates the variable position of the movable frame support 2103. Thus, arm assembly 2104 is positioned above, and parallel to the remaining three arm assemblies 2101–2103. Whereas arm extrusions 2110, 2120 and 2130 provide a support surface beneath respective screen bar segments 30*a*–30*c,* the arm 2140 of arm assembly 2104 moves next to the screen bar segment 30*d*, and clamp 2146 includes a small ledge 2146*a* (FIG. 23) to provide support from underneath.

Arm assembly 2104 performs several functions including: clamping the frame 30 in the "X" direction to steady the frame 30 and remove the convex camber (pre-bow) from screen bar segments 30*b* and 30*d;* measuring the "X" dimension of frame 30; and providing the dimension information to the controller 2900 for positioning a corresponding arm 2204 (FIG. 22) that inserts the screen 34 in the adhesive in screen bar segment 30*d*.

Arm assembly 2104 may be actuated using one or two rodless pneumatic cylinders 2160, in a manner similar to that described above with reference to arm assembly 2103. The arm 2140 is mechanically attached to the yoke 2161 of the rodless cylinder 2160. If one rodless cylinder 2160 is used, then the opposite end of arm 2140 is slidably supported by a bearing, such as a conventional linear motion flange bearing 2181.

Two spool control valves 2922, 2924 (FIG. 29) may be provided for actuating the rodless cylinder 2160, and may be identical to the valves that control rodless cylinder 2150. The spool valves that control rodless cylinder 2160 are separate from the valves that control rodless cylinder 2150, because the arms 2103 and 2104 are actuated independently of each other.

On the movable clamping arm assembly 2104, one or more blocking members 2146 are provided to clamp segment 30*d*, and remove the convex camber (pre-bow) therefrom during insertion. The blocking members 2146 project slightly inward from the inner edge of the arm 2140, at least as far as the distance by which the corner key extends in the "X" direction beyond screen bar segment 30*d.* The "Y" coordinate of blocking members 2146 may be manually adjustable, to ensure that the blocking members clamp against the screen bar segment 30*d*, and not the corner key 30*e*.

A screen frame proximity sensor 2147 on the fourth arm 2140 detects when the fourth arm approaches within a predetermined distance from the fourth screen bar segment 30*d*. The proximity sensor 2147 determines when the spool valves controlling the rodless cylinder 2160 are adjusted to reduce the speed of approach. Sensor 2147 may be similar to sensor 2137 described above.

As best seen in FIG. 20, a conventional TTL linear encoder 2191 may be used to accurately measure the "X" position of the clamping arm assembly 2104, and provide a digital output signal to the controller 2900.

The fourth arm assembly 2104 also has a cooling manifold 2148 described below with reference to FIG. 23.

Figure 23:
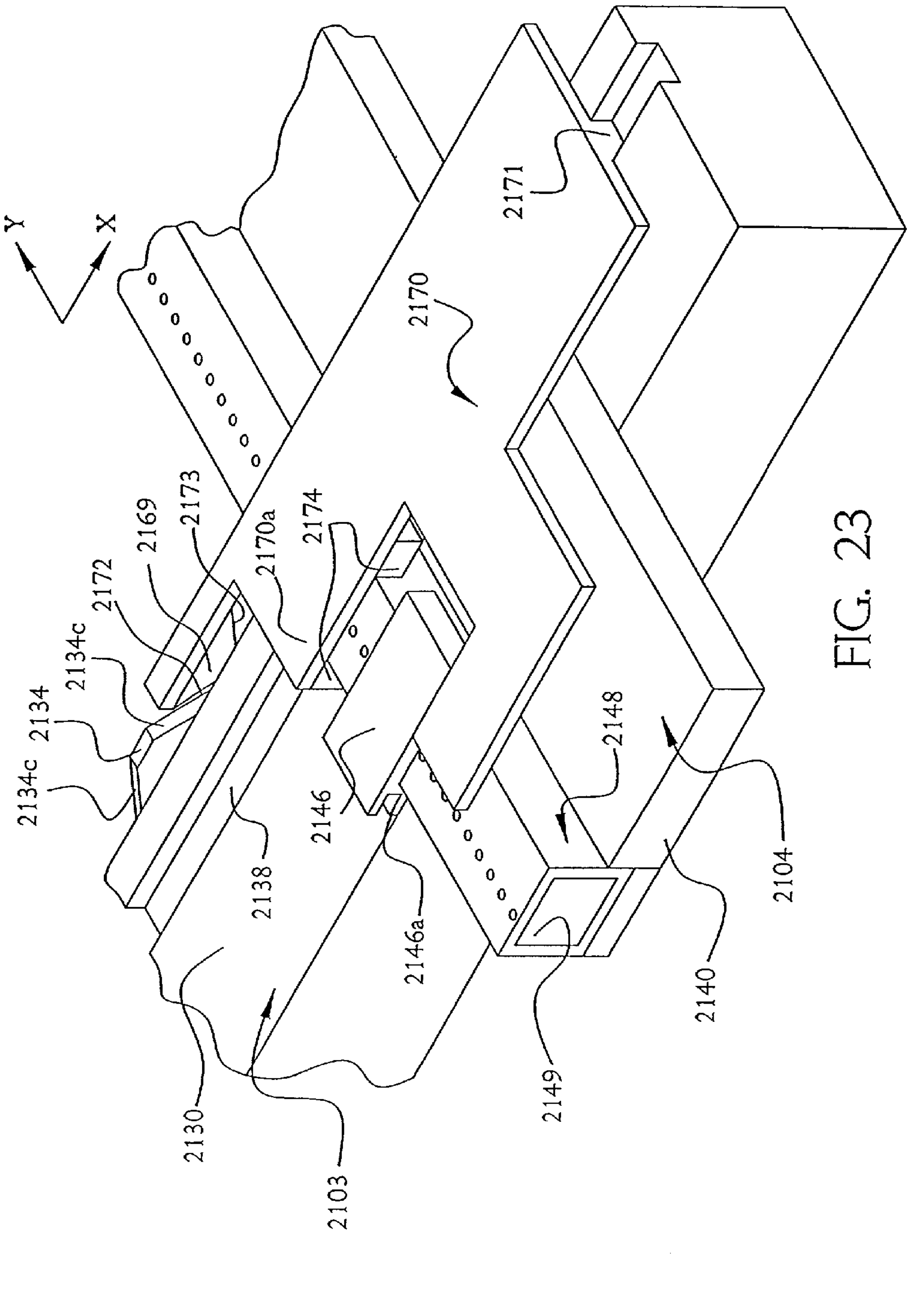
FIG. 23 is an isometric view of the yoke shown in FIG. 21.

FIG. 23 is an enlarged detailed view of the yoke 2170. The yoke 2170 connects the third and fourth arms 2130 and 2140 in such a manner that either arm can move freely in its respective lateral direction. Also shown in FIG. 23 is a manifold 2148 that is attached to the inner end of arm 2140. The manifold 2148 has a plurality of nozzles 2149 that provide cooling air to the screen bar segment 30*d* to solidify the adhesive therein. In the exemplary embodiment, manifold 2148 is advantageously close to screen bar segment 30*d*, and provides a means of introducing cooling air to that portion of the screen-frame assembly.

Yoke 2170 has an elongated tongue 2171 that slides freely in the "X" direction in a groove 2138 of arm 2130, when the fourth arm assembly 2104 moves. Yoke 2170 has a bushing 2174 that includes a pair of downwardly projecting low-friction blocks that straddle the manifold 2148. The bushing 2174 allow yoke 2170 to slide freely in the "Y" direction, when the third arm assembly 2103 moves. The bushing 2174 may be made from nylon, for example.

Yoke 2170 has a backstop 2169 with a pair of cams 2172 and 2173 that engage the cam surfaces 2134*c* of the spring loaded back stops 2134 when the fourth arm assembly 2104 moves. Cam 2172 smoothly lowers back stop 2134 when the fourth arm assembly moves in the minus X direction. Cam 2173 smoothly lowers back stop 2134 when the fourth arm assembly moves in the plus X direction. In addition to the cam function, backstop 2169 provides a clamping force as near as possible to the corner key. If all of the clamping force were applied at the center of the screen bar segment 30*c*, deformation of the segment 30*c* could occur. By applying clamping force near the corner key, the clamping force on segment 30*c* is absorbed as a compressive load on segments 30*b* and 30*d*, reducing the likelihood of deforming segment 30*c*.

Figure 27:
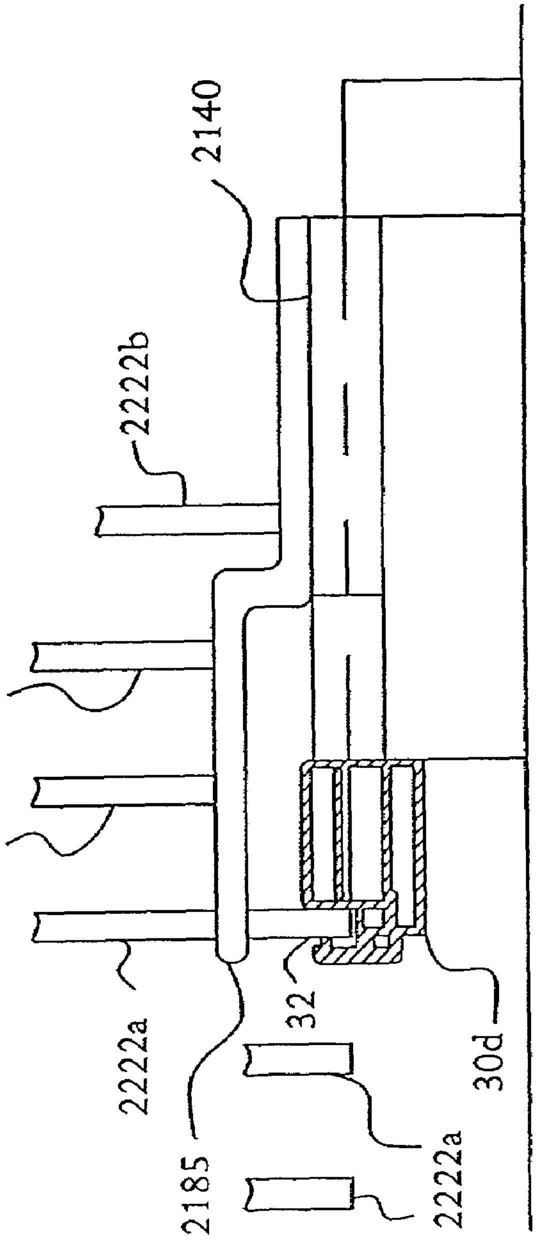
FIG. 27 is a side elevation view of a corner shown in FIG. 21.

FIG. 27 is a cross-sectional view of a shield 2185 shown in FIG. 21. The shield 2185 facilitates insertion of the screen 34 at the corners. As explained further below, a plurality of spring-loaded pins 2222 insert the screen 34 into the groove 32 of each screen bar segment. Using a typical corner key (not shown), pins 2222*b* (which are located above the corner key and beyond the end of the groove 32) could catch and pull the screen cloth 34, and prevent the remaining pins 2222*a* from properly inserting the screen 34 in the screen bar segment 30*a* near the corner. The shield 2185 blocks the spring loaded pins 2222*b* from contacting the screen 34 over the corner key, so the screen in the corner can be freely pulled into the insertion grooves 32 by the pins 2222*a*. The shield 2185 enables use of retractable pins 2222 without the complexity of the bayonet style pins shown in FIG. 17. Similar shields (not shown) cover the corner keys where the first and second screen bar segments 30*a* and 30*b* meet and where second and third screen bar segments 30*b* and 30*c* meet. The yoke shown in FIG. 23 incorporates the shield function in a shield portion 2170*a*, for the corner key where segments 30*c* and 30*d* meet.

Figure 22:
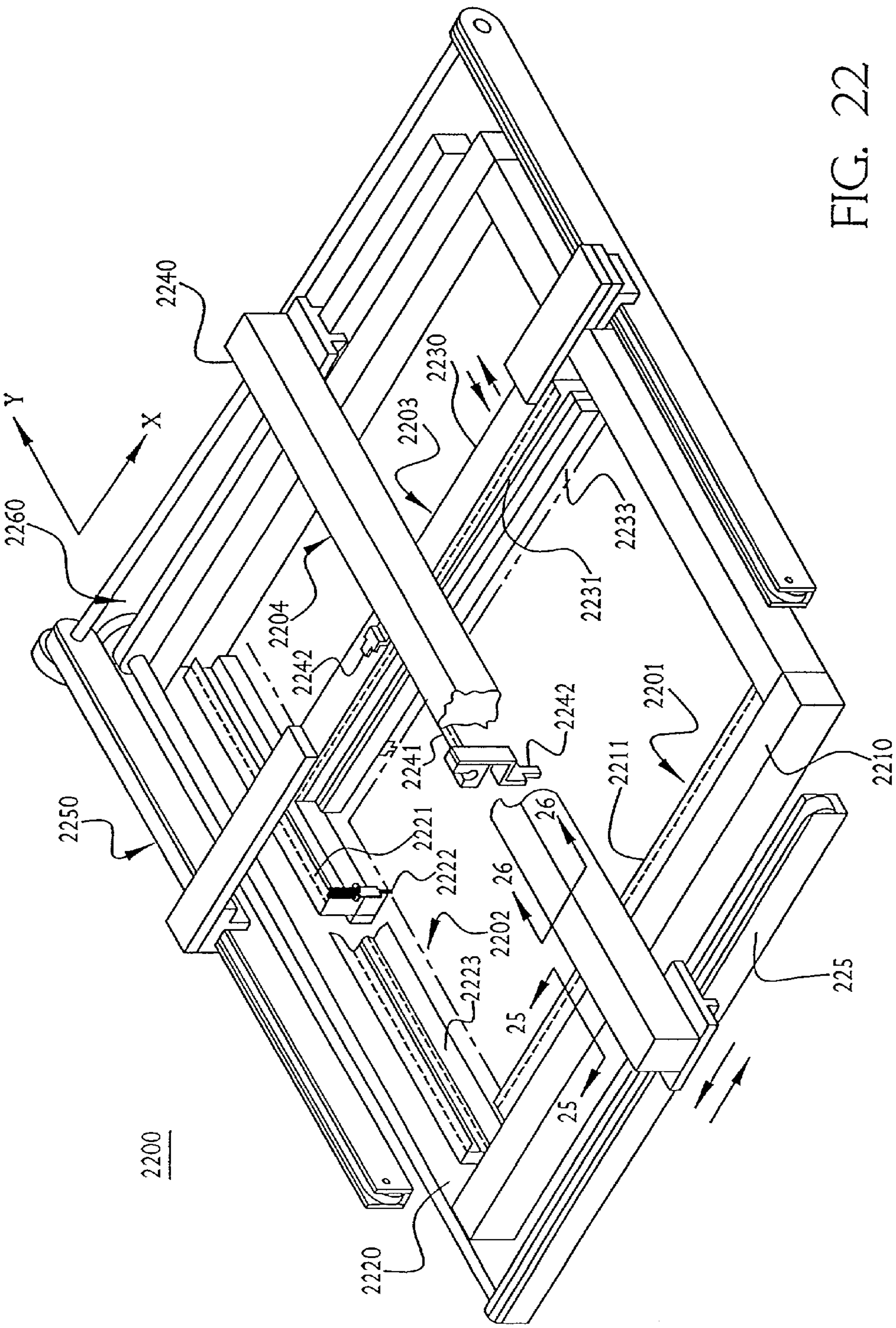
FIG. 22 is an isometric view of the press subassembly shown in FIG. 20.

Reference is now made to FIG. 22, which shows the press subassembly 2200. The main functions of press subassembly 2200 are: to position the movable arms 2230 and 2240 so that the pins 2222, 2242 thereon are properly aligned with the grooves 32 of screen bar segments 30*c* and 30*d*; to simultaneously insert all four sides of the screen 34 into the adhesive 36 with the plurality of pins 2222 and 2242; and to provide cooling gas (air) to cool the adhesive on at least some of the screen bar segments 30*a*–30*c*. Several items, which are described further below and appear in other figures, are omitted from FIG. 22, merely to simplify the drawing.

Press subassembly 2200 includes a plurality of frame members that are located above respective frame members in the clamp subassembly 2100. Specifically, press subassembly 2200 has four arm assemblies, 2201–2204 corresponding to assemblies 2101–2104. Arm assemblies 2201 and 2202 are fixed arms, located above fixed arm assemblies 2101 and 2102. Arms 2201 and 2202 have pins 2222 that are fixedly positioned above the grooves 32 of respective screen bar segments 30*a* and 30*b*. The third arm assembly 2203 is movable in the "Y" direction, and is coplanar with arm assemblies 2201 and 2202. The fourth arm subassembly 2204 is movable in the "X" direction. Arm assembly 2204 is positioned above and parallel to assemblies 2201–2203, to accommodate the various positions in which the third arm assembly 2203 may be positioned.

The movable third arm assembly 2203 requires accurate positioning, so that the pins 2222 are aligned with the groove of the third screen bar segment 30*c*. A standard servo linear actuator 2250 has sufficient precision to locate the pins 2222 on arm assembly 2230 within 0.025 centimeters of the centerline of the groove 32 in screen bar segment 30*c*, which is adequate for this purpose. Actuator 2250 is commanded to move to a position defined by the process controller 2900, based on the location of arm assembly 2103 of clamp subassembly 2130.

Similarly, the movable fourth arm assembly 2204 has a servo linear actuator 2260 to locate the pins 2242 on arm assembly 2204 within 0.025 centimeters of the centerline of the groove 32 in screen bar segment 30*d*.

The exemplary pins 2222 and 2242 are all rectangular in cross section. The larger dimension of the cross section is preferably between about 0.3 centimeters and about 1.27 centimeters. Pins 2222 and 2242 may have an elongated rectangular cross section with a larger dimension of 2 centimeters or more, up to nearly the center-to-center distance between pins, but a dimension of 1.27 cm or less is preferred. The smaller dimension of the cross section need only be large enough to ensure that the pins 2222, 2242 do not bend upon insertion, for example, between about 0.08 cm (0.03") and about 0.36 cm (0.14"), to accommodate the width of the groove 32.

Figure 25:
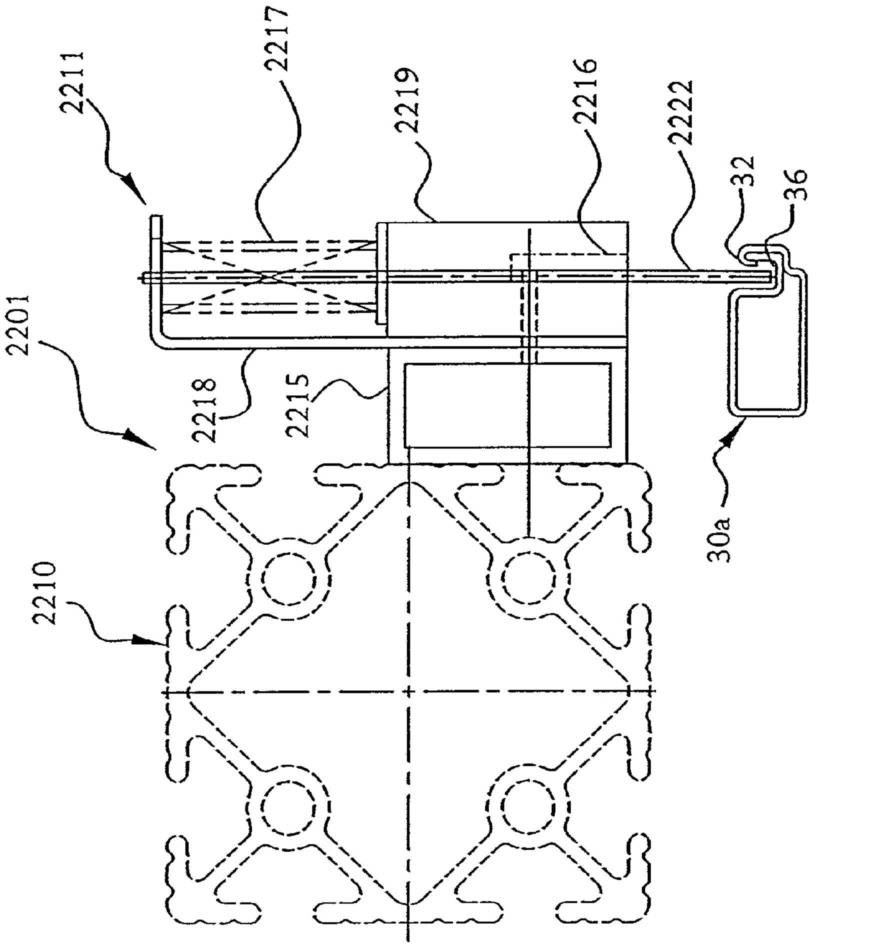
FIG. 25 is a cross sectional view taken along section line 25—25 of FIG. 22.

FIG. 25 is a cross sectional view of arm assembly 2201, taken along section line 25—25 of FIG. 22. The exemplary arm 2210 is an aluminum extrusion, such as a 6105-T5 aluminum. This configuration provides a low weight with a relatively high area moment of inertia. A cool air manifold 2215 is attached to arm 2210. The pin assembly 2211 is attached to the manifold 2215. The pin assembly includes a plurality of pins 2222. The exemplary pins 2222 are spring loaded, with a spring 2217. A respective nozzle 2216 is provided near each of the pins. The nozzles 2216 are connected to manifold 2215 for directing cool air onto the adhesive 36, near each pin 2222. Because there is a small distance between the nozzles 2216 and the screen bar segments 30*a*, it is effective to provide cooling for the screen bar segments 30*a*–30*c* by blowing air out of the nozzles 2216 in arm assemblies 2201–2203.

Figure 26:
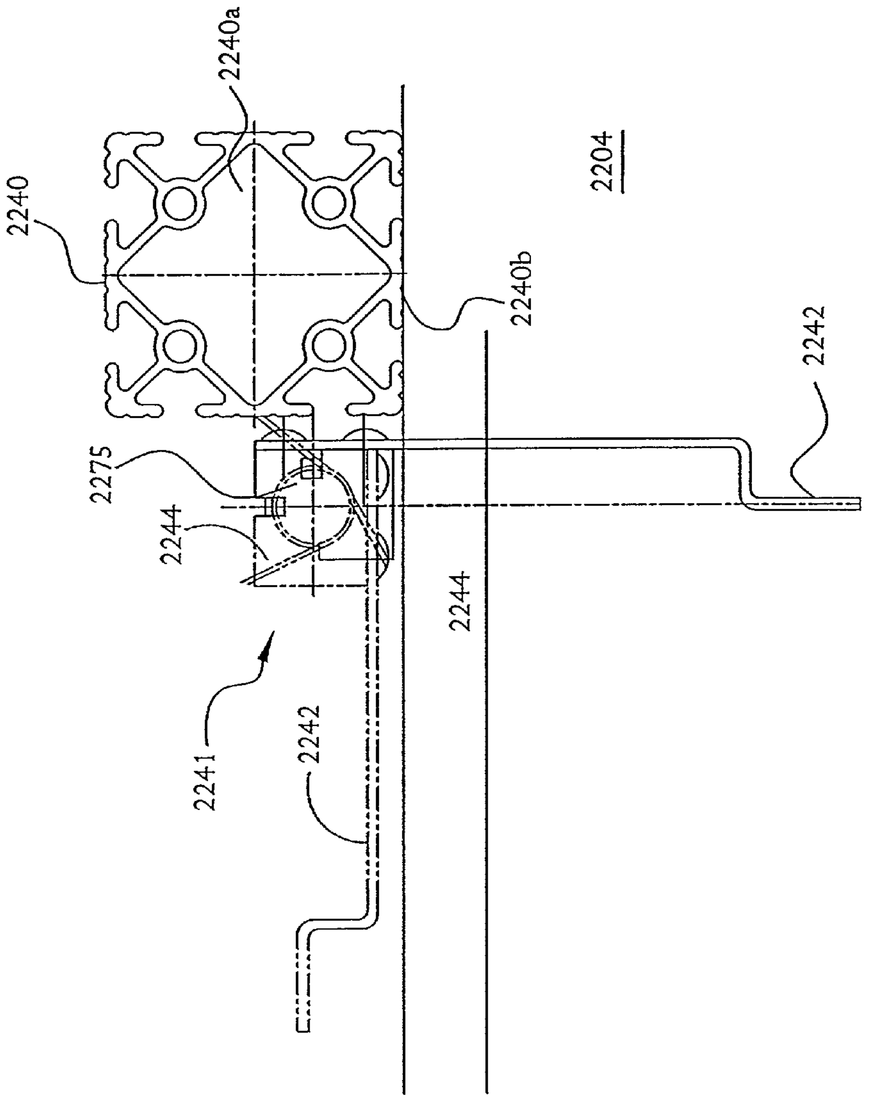
FIG. 26 is a cross sectional view taken along section line 26—26 of FIG. 22.

FIG. 26 is a cross sectional view of arm assembly 2204, taken along section line 26—26 of FIG. 22. The exemplary arm 2240 is an aluminum extrusion, such as a 6105-T5 aluminum. The exemplary arm assembly 2204 may not have a separate air manifold for blowing air onto the screen bar segment 30*d*. The hollow section 2240*a* of the extrusion 2240 can be used as an air manifold, with a nozzle 2240*b*. Because arm assembly 2204 is positioned above assemblies 2201–2203, it is farther from screen bar segment 30*d*, and does not provide an optimal source of cooling air. For this reason, the primary air manifold for screen bar segment is located on the clamping arm assembly 2104, as described above, with reference to FIG. 21.

The pin assembly 2241 may be pivotally attached to the extrusion 2240, for example. The pin assembly 2241 includes a plurality of pins 2242. The pins 2242 are substantially longer than the pins 2222, so as to insert screen 34 in the screen bar segment 30*d* simultaneously while the pins 2222 of arm assemblies 2201–2203 are inserted in respective screen bar segments 30*a*–30*c*.

As shown in FIG. 26, the fourth arm assembly 2204 has an actuating shaft 2275. The shaft has bearings (not shown) on both ends and may be driven by an air cylinder and a crank mechanism (not shown). The pins 2242 are all attached to the shaft 2275. The shaft 2275 can be rotated, to rotate the pins 2242. Each pin 2242 has a respective torsion spring 2244 that biases the pin to rotate in the counterclockwise direction relative to shaft 2275. When the shaft 2275 is rotated clockwise ninety degrees, the torsion springs 2244 bias the pins 2242 toward the horizontal position (shown in phantom in FIG. 26). When the shaft 2275 is rotated counter-clockwise ninety degrees, the torsion springs 2244 bias the pins 2242 toward the vertical position, (shown by the solid lines in FIG. 26). Preferably, a stop limits the rotation of the pins 2242, so they do not rotate past the horizontal position when the shaft 2275 is rotated clockwise, or past the vertical position when the rod is rotated counterclockwise. Each pin 2242 has its own spring block. When the actuating shaft 2275 is positioned so that the pins 2242 are biased to the vertical position, any one of the pins can be independently pushed to the horizontal position by application of a force sufficient to overcome the bias of its torsion spring 2244.

Prior to moving the third arm assembly 2203, the shaft 2275 is rotated clockwise, to raise the pins 2242 to the horizontal position so they do not interfere with movement of the arms 2230, 2240. After the third and fourth arm assemblies 2203 and 2204 are positioned for screen insertion, the actuating shaft 2275 is rotated counter-clockwise ninety degrees, to position the pins vertically. For the pins 2242 that are directly above the third arm 2230, when the pins contact the arm 2230, the pins over the arm 2230 are pushed back up into the horizontal position, overcoming their respective torsion springs.

Other means are contemplated for repositioning the pins, so that the pins do not interfere with any of the other arms. For example, the pins may be provided with a linear up-and-down motion, using an actuator or the like. Alternatively, a chain and sprocket arrangement may be provided, with the pins attached to the chain. Advancing the chain can move the pins out of the way of the moving arm.

Figure 24:
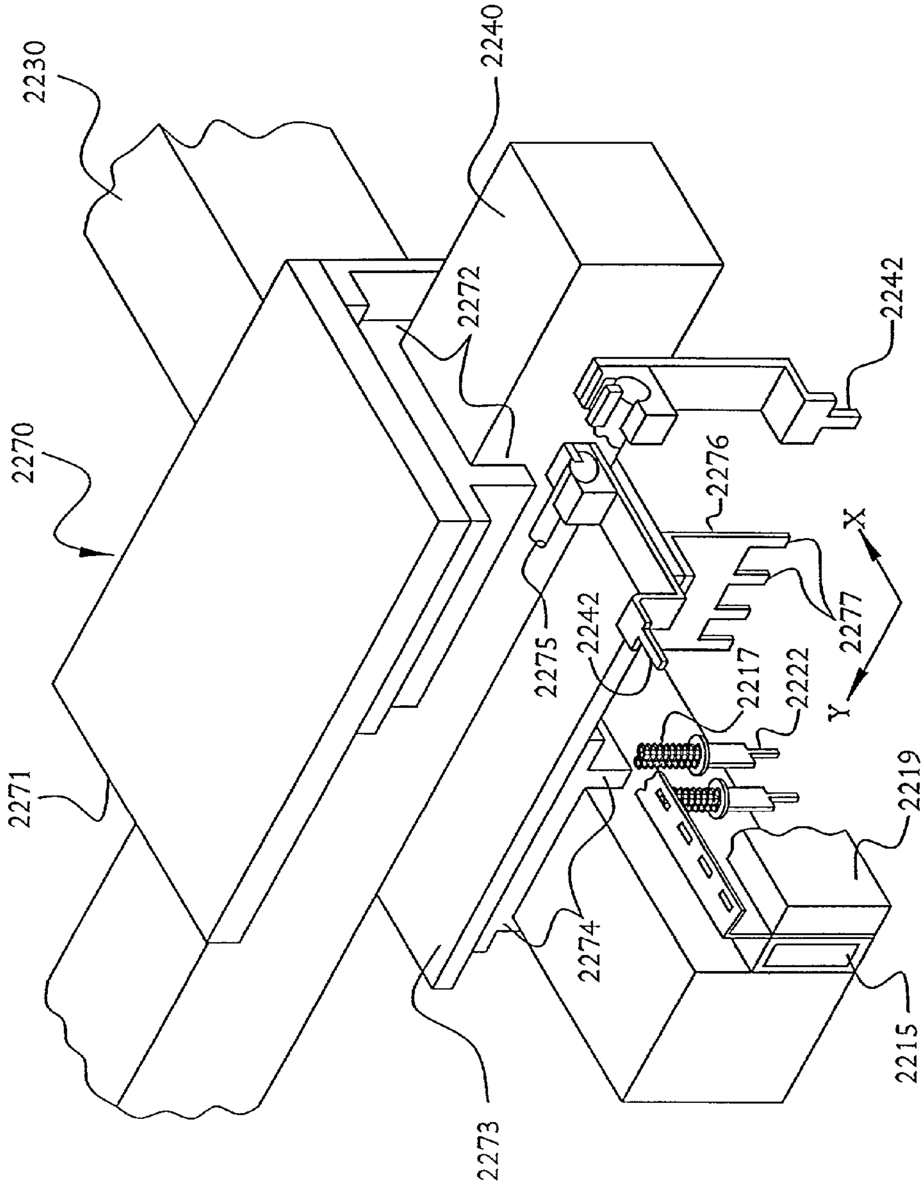
FIG. 24 is an isometric view of a yoke for use on the subassembly shown in FIG. 22.

Reference is now made to FIG. 24. Press subassembly 2200 also includes a yoke (not shown in FIG. 22) connecting arms 2230 and 2240. FIG. 24 is an enlarged detail of the yoke assembly 2270 that connects arms 2230 and 2240. The yoke 2270 allows the arm members 2230 and 2240 to move freely in the "Y" and "X" directions, respectively. The yoke 2270 has a channel-shaped main body 2271 and a bushing 2272 including two low friction blocks 2274. Bushing 2272 may be made of nylon, for example. Blocks 2274 slide over arms 2230 and 2240.

Yoke 2270 includes a pin assembly 2276 depending from the bottom of the channel member 2271. The pin assembly 2276 has a row of corner pins 2277. As shown in FIG. 24, pins 2242 that are within the boundary of yoke 2270 are prevented from rotating to the vertical position by the bottom flange 2273 of the yoke, even when the actuating shaft 2275 is rotated counter-clockwise. Because it is important to have the screen 34 inserted in the adhesive at the corner of the frame 30, the pin assembly 2276 is provided. Pin assembly 2276 ensures screen insertion all the way to the corner of the frame 30.

To ensure that the screen 34 of the completed assembly does not sag or fall through the opening of the frame 30, it is important to support the screen cloth from beneath while the screen is being inserted in the frame 30. A variety of supports may be designed. For example, a flat supporting surface (not shown) may be formed using straps, hoses, tubes, cords or the like. The flat supporting surface may be raised and lowered using a system of pulleys and idler arms (not shown), controlled by a pneumatic cylinder. The flat supporting surface is lowered while the movable arm assemblies 2103, 2104 of the clamping subassembly 2100 are moved into the clamping positions. Then, the flat supporting surface is raised up to the height of the lip L (FIGS. 6 and 7) of the screen bar grooves 32 in the frame 30. In this position, the flat supporting surface would support the screen 34 without sag in the correct position, even if the screen 34 were completely free of attachment to the frame 30. The flat supporting surface remains in place for the duration of the insertion operation. The flat supporting surface is lowered at the completion of cooling, before the movable arm assemblies 2103, 2104 are moved from the clamping position to the open position. Thus, the supporting surface does not interfere with movement of the arms 2130 and 2140.

Figure 28A:
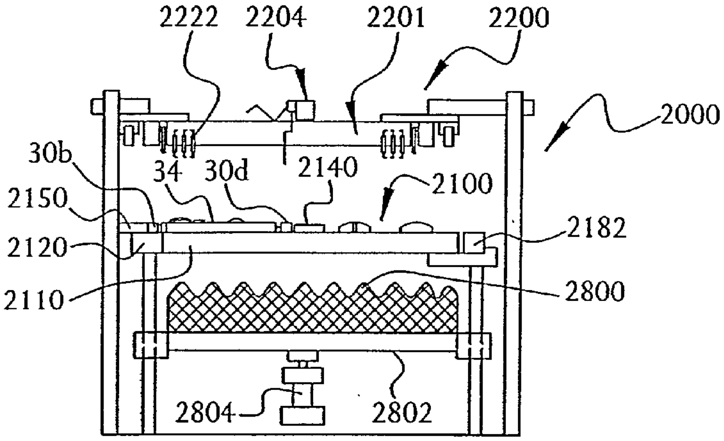
FIG. 28A is a side elevation view of the apparatus of FIG. 20, with the press subassembly raised and the foam platen lowered.
Figure 28B:
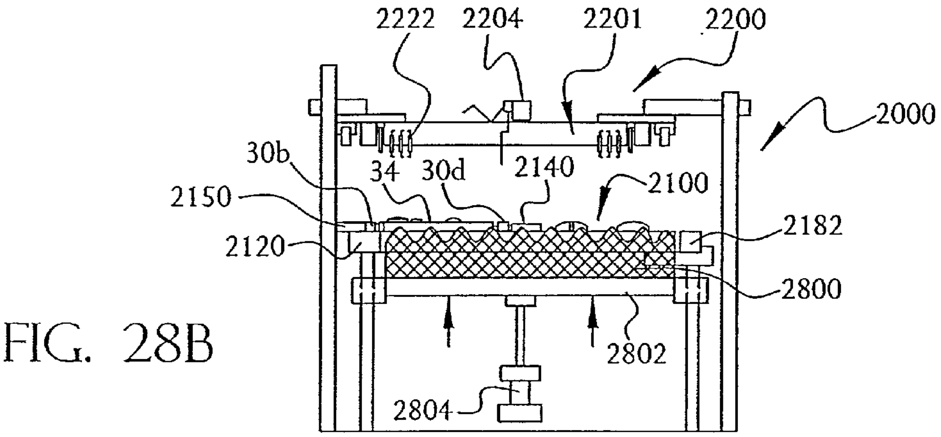
FIG. 28B is a side elevation view of the apparatus of FIG. 20, with the press subassembly raised and the foam platen raised.
Figure 28C:
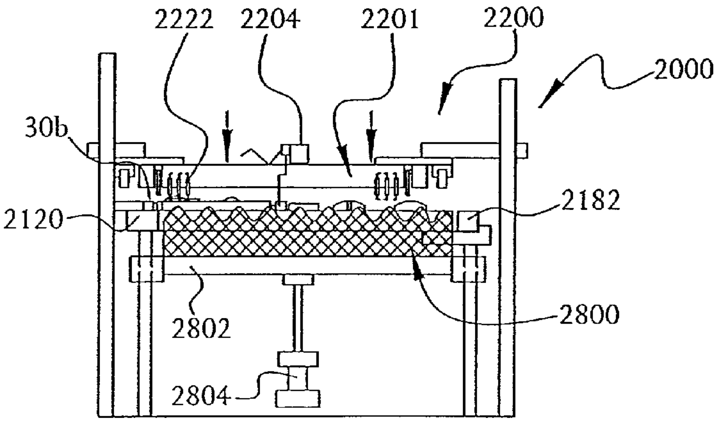
FIG. 28C is a side elevation view of the apparatus of FIG. 20, with the press subassembly lowered and the foam platen raised.

FIGS. 28A–28C show an exemplary structure and method for supporting the screen cloth 34 during insertion. In this example, a planar platen 2802 is positioned beneath the clamping subassembly 2100. The top surface of the platen is covered with a layer 2800 of low density foam, such as a conventional convoluted foam construction, 5 centimeter thick "raised rib" foam commonly referred to as "egg crate." The tops of the foam ribs 2800 form a flat support surface for supporting the screen 34. The platen 2802 and egg crate foam 2800 are sized to completely support the largest size frame for which the system 2000 is used, having an "X" dimension that is approximately the distance between arm 2110 and member 2182, and a "Y" dimension that is approximately the distance between arm 2120 and member 2180.

The platen has a lowered position (FIG. 28A) and a raised position (FIGS. 28B and 28C), and moves under control of an actuator 2804. The height at the raised position is selected so that the tops of the foam ribs are at the desired height at which the screen cloth 34 lies on the frame 30 with no sag. This is the height of the top of the lip L (FIGS. 6 and 7) of the screen bar 30*a*.

The low density foam 2800 provides a simple structure for accommodating multiple frame sizes. Regardless of the positions of arm assemblies 2103 and 2104, when the platen 2802 is raised, the foam 2800 is compressed beneath the arms 2110, 2120 and 2130, and fills in the space around the arms, without using complex pulley and idler arm systems. Because the arms 2110, 2120 and 2130 lie beneath frame members 30*a*–30*c*, respectively, the foam 2800 applies little pressure on these frame members. No arm lies beneath screen bar segment 30*d*, but it is easy to prevent upward deformation of segment 30*d* by having clamp 2146 (FIG. 21) extend over the top of segment 30*d*. Alternatively, a hinged ramp (not shown) with a limited range of rotation or a rigid ramp (not shown) may be attached to arm 2240, to keep the foam 2800 from contacting the underside of the fourth screen bar segment 30*d* of frame 30.

FIG. 29 is a block diagram of the control system for operating the apparatus 2000. The system is operated by the programmable logic controller 2900 (PLC). PLC 2900 receives three operator control inputs from the clamp switch 2902 (which is preferably foot operated), the press switch (which is preferably an anti-tie-down switch, and a reset switch 2906, that is activated when a frame having a new frame size is to be fabricated.

PLC 2900 receives several data inputs, including: the X-position of the movable clamp arm assembly 2104 from linear encoder 2191; the Y-position of the movable frame support assembly 2103 from linear encoder 2190; the detection signal sent from the X proximity sensor 2147 when arm 2140 approaches the frame; the detection signal sent from the Y proximity sensor 2137 when arm 2130 approaches the frame; and the frame profile from position feedback cylinder 2113.

PLC 2900 provides control signals to several devices to operate the apparatus 2000, including: signals to control when the blower 2926 is turned on and off; signals to control when the profile clamp spool valve 2922 provides air to the profile clamp cylinder 2924; signals to operate the X clamp three-position (forward/stop/reverse) spool valve 2914; signals to operate the X-clamp two-position (fast/slow) valve 2916; signals to operate the Y clamp three-position (forward/stop/reverse) spool valve 2922; signals to operate the Y-clamp two-position (fast/slow) valve 2924; signals to command the foam platen spool valve 2912 to control air flow the foam platen cylinder 2804; signals to control the X servo 2260 for positioning arm 2240, signals to control the Y servo 2250 for positioning arm 2230; and signal for commanding the spool valve 2908 for controlling the press cylinder 2910 to raise and lower the press subassembly 2200.

Other cushioning supports may be used instead of foam. Alternatives include air bags, a helical spring, and the like.

Operation

Figure 30:
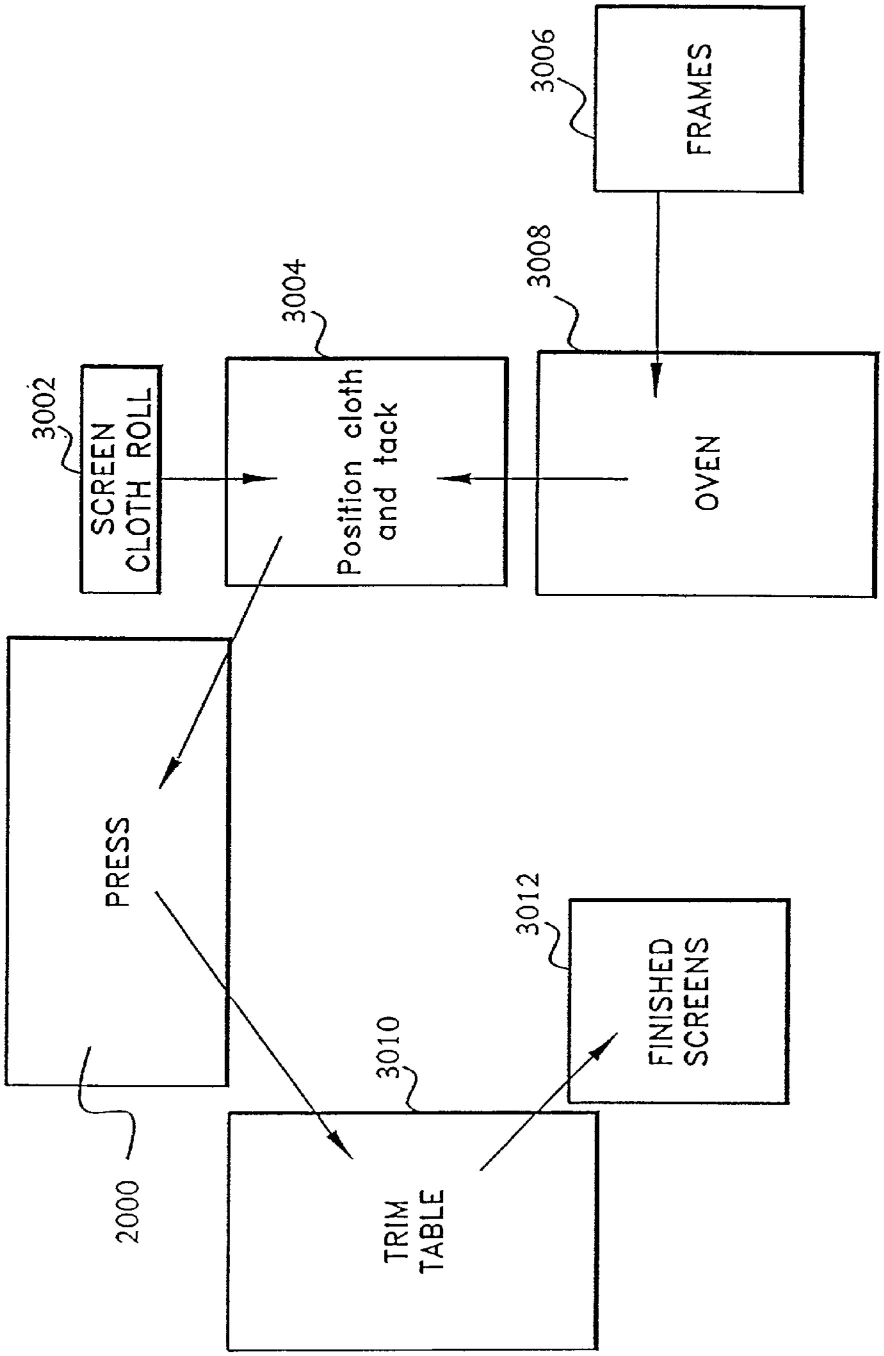
FIG. 30 is a plan view of a work cell including the apparatus of FIG. 20.

FIG. 30 is a plan view of an exemplary work cell including the apparatus 2000. Frames 30 are assembled on a table 3006 and loaded into an oven 3008. Once heated, the frames are placed on a table 3004. A portion of screen cloth 34 is cut from a roll 3002 (or a pre-cut portion of screen cloth may be taken from a table (not shown). The screen 34 is positioned and tacked on the frame 30. The frame 30 and screen 34 are placed in the press for insertion. After the insertion operation is completed, the screen-frame assembly is moved to a trim table 3010 where excess cloth is cut from around the frame grooves 32. Finished screen-frame assemblies are stacked on a table or palette 3012.

The operator begins the fabrication procedure by obtaining a heated frame 30 from the oven 3008. The frames 30 may be manually placed in an oven. Optionally, the frames may pass through an elongated heated enclosure on a conveyer. Alternatively, the frames may be removed from the oven by a pick-and-place robot. The operator places the heated frame 30 on a work surface 3004. The operator places a pre-cut piece of screen cloth 34 on the frame. Preferably, a small amount of a tacky, pressure-sensitive adhesive is placed on the screen bar segment furthest from the operator, to keep that side of the screen cloth in place. The operator can hold the two nearest corners of the screen cloth 34 in place on the frame 30 with his or her hands.

FIGS. 28A–28C show the operation of the press. The clamping subassembly 2100 is put in an open position. In the exemplary embodiment, the press subassembly 2200 is in its raised position, and the foam platen 2802 is in its lowered position, as shown in FIG. 28A. The blower is turned off.

If this is the first frame or if this frame is of a size different than the last frame, then the movable arm assemblies 2103 and 2104 are spread out as far as possible from respective arm assemblies 2101 and 2102 prior to clamping. If this is not the first frame, and this frame is the same size as the immediately preceding frame, then the movable arm assemblies 2103 and 2104 may open to a ready position about 1.27–2.54 centimeters from the clamped position for this size frame.

The operator places the frame 30 and screen 34 on the two fixed arms 2101 and 2102 of the clamping subassembly 2100, with screen bar segments 30*a* and 30*b* engaging respective clamping blocks 2111 and 2121. The operator can continue holding the screen 34 in place at the near corners of the frame at this time to prevent sagging. Because the clamps 2112 and 2113 are operated at low pressure, there is no danger to the operator's safety, even if a hand were placed in the clamp.

The operator actuates a control, preferably a foot operated switch 2902 (FIG. 29). In response to activation of the switch, the clamping blocks 2112, 2113 clamp screen bar segment 30*a*, and blocks 2122 and 2123 clamp segment 30*b*. The position feedback cylinder 2113 determines the screen bar profile of frame 30 and sends this information to the process controller 2900. The valves controlling rodless cylinder 2150 starts the movable frame support 2103 moving at the fast speed. When the proximity sensor 2137 detects that it is approaching frame member 30*c*, the valves operating the rodless cylinder 2150 are switched to the slow speed. The movable frame support 2103 moves inward, till spring-loaded back stops 2134 clamp screen bar segment 30*c*. The valves controlling rodless cylinder 2160 starts the movable clamping arm assembly 2104 moving at the fast speed. When the proximity sensor 2147 detects frame member 30*d*, the valves operating the rodless cylinder 2160 are switched to the slow speed. The clamping arm assembly 2104 moves inward, till stop blocks 2146 clamp screen bar segment 30*d*. The operator can visually detect that the arms 2130 and 2140 are in the fully clamped positions. The linear encoders 2190 and 2191 determine the "Y" and "X" coordinates of the arm assemblies 2103, 2014, and send this information to the process controller 2900.

Once the operator determines by visual inspection that the frame 30 is clamped, the operator can release the switch. Upon release of the switch, the screen cloth support surface 2800 rises into position supporting the screen cloth 34 (shown in FIG. 28B). The operator can now release his or her hands from the screen cloth without the screen sagging. The blower is started.

The process controller 2900 uses the screen bar profile data and the arm position data, and determines the corresponding positions for the arms 2230, 2240 of the press subassembly 2200. For example, look-up tables may be used to determine the positions of arms 2230 and 2240. The process controller 2900 commands the servo-controlled positioning systems 2250 and 2260 to accurately position the press arms 2230, 2240 for screen cloth insertion in frame 30. The insertion arm assemblies 2203 and 2204 may be continuously repositioned while the clamping arm assemblies 2103 and 2104 are positioning themselves. Alternatively, the arm assemblies 2203 and 2204 may remain in a standby position until the operator releases the switch (signifying that the correct clamping position is reached), and move directly to the final position for insertion when the switch is released. The former approach may decrease cycle time.

A separate control is used to either lower the press subassembly 2200 or raise the clamping subassembly 2100 for insertion of the screen 34 into the grooves 32 of the frame 30. As shown in FIG. 28C, the exemplary system lowers the clamping subassembly 2200 to insert the screen 34 in the frame 30. Preferably, a conventional anti-tie-down type dual-control switch is used. Such a switch requires the operator to actuate two separate controls simultaneously, or within a predetermined short period of time from each other, before lowering the press subassembly 2200. This mechanism ensures that the operator's hands are safely out of the way of the press.

Once the anti-tie-down switch is activated, the cooling air begins to blow through the manifolds 2215 of the three press arm assemblies 2201–2203 and the manifold 2148 of the clamping arm assembly 2104. (Alternatively, the blowing air may begin as soon as the operator releases the foot-activated switch). The press subassembly 2200 is lowered, and remains in the lowered position for the required amount of cooling time (e.g., about 5 to 10 seconds).

While the frame 30 is cooling, the operator is free to perform another operation. For example, if a previously fabricated screen-frame assembly is awaiting final trimming, the operator can trim any excess screen cloth from the frame during this time. Alternatively, the operator can fetch the next heated frame 30 from the oven, and place a screen on the next frame.

Depending on the length and width of the frame 30 and the width of the groove 32, thermal expansion may have a significant affect on the ability of the system to maintain the pins 2222, 2242 centered within the grooves 32 for the duration of the cooling period. For a relatively long window, the thermal expansion may be of the same order of magnitude as the width of the groove 32. Thus, to maintain the pins 2222, 2242 approximately centered within the grooves, it is desirable to continually sample the positions of arm assemblies 2103 and 2104. As the frame 30 cools down, the frame shrinks, and application of clamping pressure keeps the frame 30 straight (i.e., removes the bow). The linear encoders 2190, 2191 measure the positions of arms 2130 and 2140, and sends these data to the process controller 2900. The process controller 2900 commands the servo positioning systems 2250, 2260 to move the arm assemblies 2203 and 2204 to the appropriate offsets, to keep the pins 2222 and 2242 centered in the grooves. The greater the sampling and adjustment frequency, the more accurate the positioning of the pins 2222 and 2242.

When the cooling time is completed, the press subassembly 2200 returns to the raised position, the blower stops, and the support foam 2800 drops to its lowered position, as shown in FIG. 28A. In a typical production run, a plurality of frames of the same size are made in a batch. The bottom clamps 2112, 2113, 2122, 2123, 2103 and 2104 jog open slightly—between about 1.27 and 2.54 centimeters. This provides sufficient clearance for the operator to remove the screen and frame assembly. The operator can place the next frame 30 and screen 34 on the clamping subassembly 2100. The clamping steps for the second and subsequent screen and frame assemblies proceed more quickly, because the clamps have shorter distances to travel. Also, the corner of the frame 30 connecting the third and fourth screen bar segments 30*c* and 30*d* does not droop. If a different size screen frame is to be loaded next, the operator pushes a reset button, and the movable arms 2130, 2140, 2230 and 2240 return to their completely opened positions.

Other variations of the operating method are contemplated. For example, the frame dimensions may be manually input, in which case the process controller 2900 can either: (1) move the clamps to the exact dimensions corresponding to the size that is input; or (2) calculate "rough" clamping locations that correspond to the size that is input, and use the slow clamping speed to perform the final approach between the clamping members and the frame 30. Further, if a bar code is placed on each frame, indicating the frame size, then the operator can scan the bar code instead of inputting the dimensions manually. Because variations in frame sizes as large as 0.3 centimeters are not uncommon, it is believed that the fully automated method described above provides better placement of the insertion pins 2222, 2242 in the grooves 32 than either manually inputting the frame size or scanning in the frame size.

Further, the clamping may be done manually, by manually moving the clamping blocks and arms 2112, 2113, 2122, 2123, 2130, 2140 until the frame 30 is clamped, and the screen bar segments 30*a*–30*d* appear straight by visual inspection. The clamping blocks and members 2112, 2113, 2122, 2123, 2130, 2140 are locked in place, and the linear encoders 2190, 2191 perform position determination for automated placement of the press subassembly arms 2230 and 2240, as described above.

In another variation of the exemplary embodiment, apparatus 2000 may include automatic means for cutting the excess screen cloth from the assembled screen and frame assembly, either during cooling or after it is cooled, but before the press is opened. Essentially, a separate "L"-shaped blade is jammed into each corner to sever any screen cloth that extends beyond the groove 32 on each side of the frame 30, and a blade is run across each side of the frame.

According to this method, four steps are added to the process, after the adhesive has cooled sufficiently to firmly hold the screen 34. In the first step, the "L" shaped blades are added to each of the four corners of the frame 30, on the exterior portion of the grooves. In the second step, the screen cloth 34 is pulled out and upward from the frame 30 to tear the corner of the screen cloth outside of the "L" shaped blade. Conventional pneumatic grippers may be used to grip the screen; the grippers may be placed on a pneumatic slide to apply tension. The screen cloth is pulled in a direction that is about 45 degrees from the horizontal. In the third step, the "L" shaped blades are removed from each corner. In the fourth step, a straight blade is run across each side of the screen cloth, along the horizontal surface of the screen bar segment immediately outside of the groove 32.

The operator can manually insert the "L" shaped blades, and manually run the straight blade along the edge of frame to sever the excess cloth. Optionally, the "L" shaped blades can hang down from the bottom of the press subassembly 2200, and be automatically inserted by an air cylinder when assembly 2200 is lowered. A further option is to mount four straight blades on runners, each of which may be controlled by a pneumatic cylinder, a rodless cylinder, a gear and chain drive, or other linear actuating device.

If the trimming is performed while the screen and frame assembly is still on the apparatus 2000, then there is no need for the trim table 3010, and the assembly can be moved directly from the apparatus 2000 to the finished screen table or palette 3012.

Vertical Assembly Apparatus

Figure 31C:
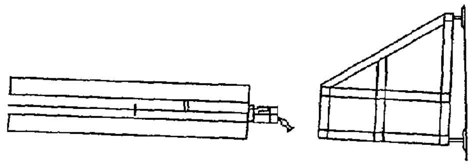
FIGS. 31A–31C show another exemplary apparatus for automatic insertion of screen cloth into screen frames, wherein the frame is held in a vertical position during insertion.
Figure 31B:
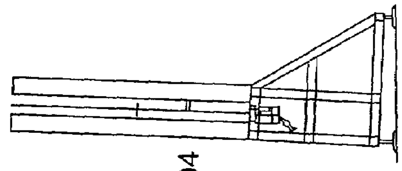
Figure 31A:
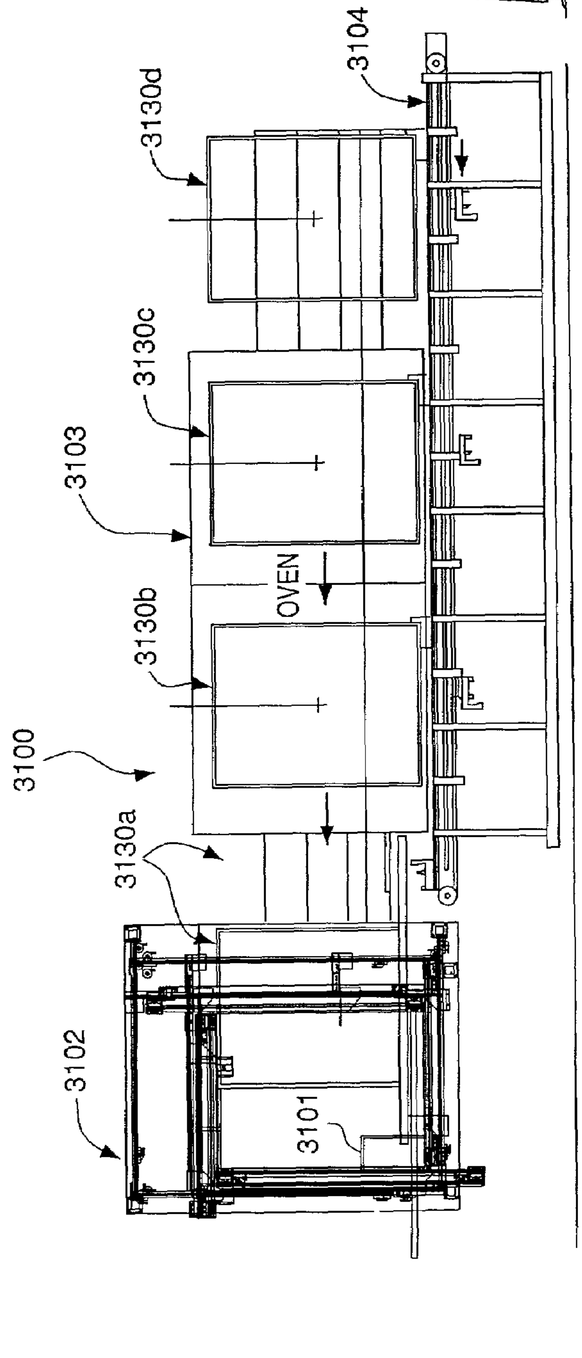
Figure 34:
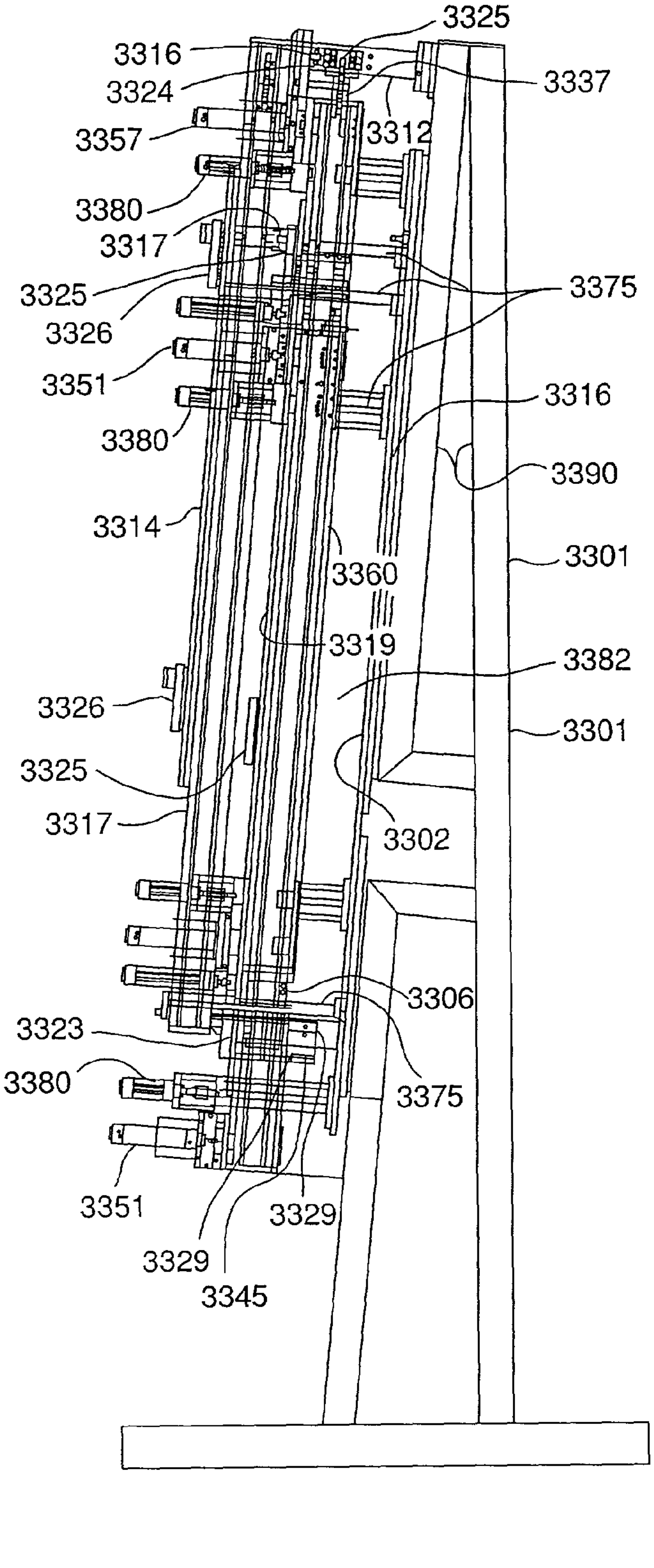
FIG. 34 is a side elevation view of the apparatus shown in FIG. 33A.

FIGS. 31A–31C show another exemplary apparatus 3100 for fabricating screen assemblies 3101 according to the present invention. Apparatus 3100 includes some of the general concepts of the apparatus of FIGS. 20–30. The ventilation cloth insertion apparatus 3100 comprises a fixture 3102 that orients a screen frame 3130*a*–3130*d* in an approximately vertical position, as best seen in the side elevation view of FIG. 34. As shown in FIG. 34, the slope 3390 of the exemplary machine is about 5°. Preferably, the angle 3390 is between 5 and 10 degrees or slightly less.

Preferably, the slope is nearly vertical. The more vertical the machine is, the less likely that the screen cloth 34 will become caught on the frame 30 or a portion of the apparatus 3102 while the cloth is being draped down into position for insertion into the screen cloth. The cloth 34 passes down through a gap 3382 (FIG. 34) between the frame 30 and the arms 3306–3309 (FIG. 33A) on which the insertion device is mounted. Preferably, the cloth can be draped down into position for insertion in the frame 30 without the cloth touching the frame or the machine while the cloth is moving into position. The closer the apparatus is to vertical, the less floor space is required. Also, the more vertical the apparatus, the easier the cloth handling becomes. And the more vertical the machine is, the easier it is to transfer the frame from the oven to the insertion station 3102. A small angle allows the frame to be supported from behind, for example by backplate 3302. Similarly, with a small angle, the frame can be supported by rails while being transported. A perfectly vertical frame would require more support from the transports 4010 and 4040 (FIGS. 41 and 45) that move the frames.

Alternatively, a perfectly vertical frame could be used, and the conveyor may have a hook or extension to prevent the frame from falling over. If the frame is stabilized, a completely vertical screen provides the best screen cloth drape. An angle between 0 degrees and about 30 degrees may be used, so long at the angle is sufficiently small so that there is no significant interference with the ability to drape the cloth 34 down over the frame.

The apparatus 3100 also provides for automated feeding of the frames 30 through the oven to the insertion apparatus, and automated feed of the screen cloth 34 to a position for insertion in the screen frames 30.

The apparatus includes an insertion fixture 3102 and a heater 3103, which may be a separate oven 3103, as shown in FIG. 31A, or an integrated heating mechanism on the insertion fixture 3102. Preferably, a conveyor 3104 delivers the screen frames 3130*d* to the oven 3103, conveys one or more frames being heated through the oven, and delivers heated frames 3130*a* to the insertion apparatus 3102. The conveyor 3104 is optional. In configurations having the heater (not shown) mounted on the insertion fixture, the conveyor may be significantly shorter (e.g., to accommodate only one frame), or may be omitted.

The apparatus 3100 can accommodate a variety of screen frames that may have different sizes. For example, a completed frame-screen assembly 3101 exiting the apparatus (on the left) has a size that is much smaller than the size of the frame 3130*a* entering the screen insertion apparatus 3102. The mechanisms for accommodating different screen sizes are explained in detail below. Each screen frame 3130*a*–3130*d* has a plurality of segments. Each segment has a mounting surface on a face thereof. At least one (or, preferably, each) of the segments has adhesive on the mounting surface thereof.

A hanger hangs a ventilation cloth across the mounting surface of the at least one segment having the mounting surface. Preferably, the hanger hangs the ventilation cloth so that the cloth hangs over each of the mounting surfaces simultaneously.

The heater melts the adhesive in said one of the segments. As noted above, this may be accomplished using an oven 3103, a hot air blower, electric heaters or other heating mechanism (not shown) on the insertion apparatus 3102.

Figure 32:
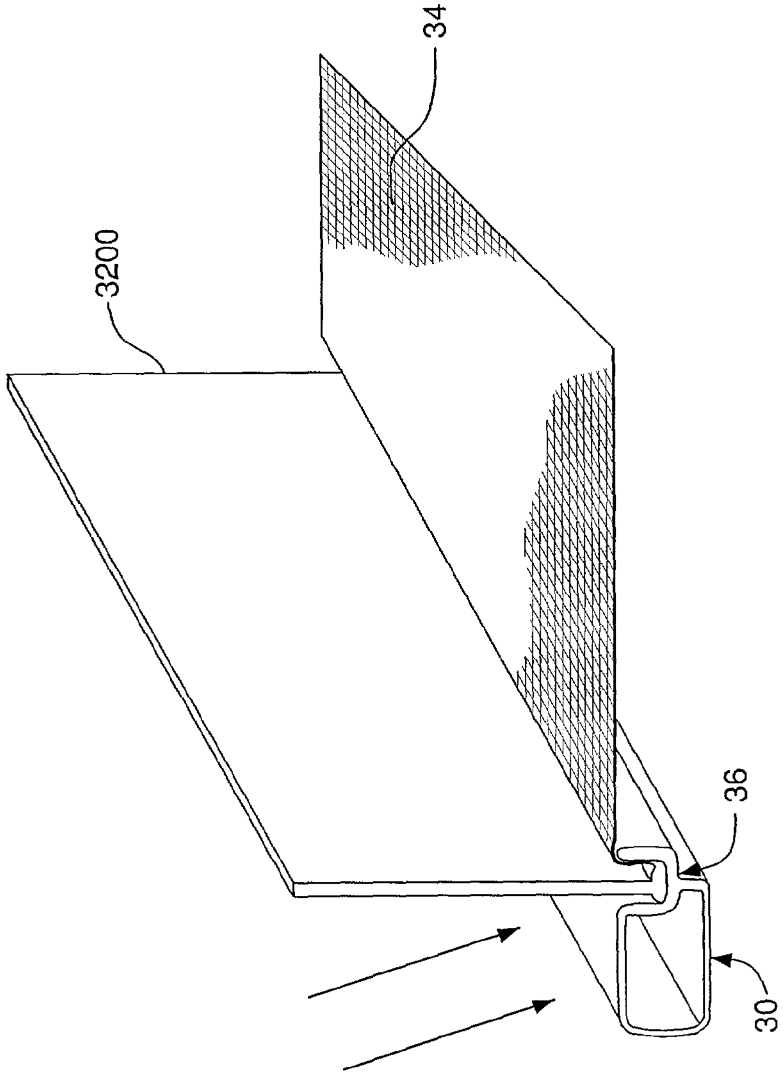
FIG. 32 shows an alternate insertion device suitable for use in any of the insertion apparatus described herein.

At least one insertion device inserts the ventilation cloth in the adhesive substantially across a length of said one of the segments. A variety of insertion devices may be used. For example, the insertion device may include a plurality of pins 2222 (shown in FIG. 22), or an elongated insertion blade or band 3200 as shown in FIG. 32. The insertion blade or band 3200 may extend for all or substantially all of the length of the screen bar segment 30*a*–30*d*, so that a respective single blade or band performs the insertion of screen cloth 34 for substantially the whole length of each respective side of the frame, excluding the corner keys.

FIGS. 33A–35 are detailed views of the insertion apparatus 3102. The assembly 3302 has four clamping arms, 3306–3309. The clamping arms 3306–3309 are positionable so that each clamping arm clamps a respective outside edge of a respective one of the plurality of sides of the screen frame 30 while attaching a ventilation cloth 34 to the screen frame. (The outer edges of the screen frame 30 are the edges of each frame segment 30*a*–30*d* that are furthest from a center of the screen frame.) The four arms 3306–3309 are coplanar. That is, each of the plurality of clamping arms 3306–3309 is positioned at a common height with respect to a plane in which the ventilation cloth 34 is positioned.

Figure 33A:
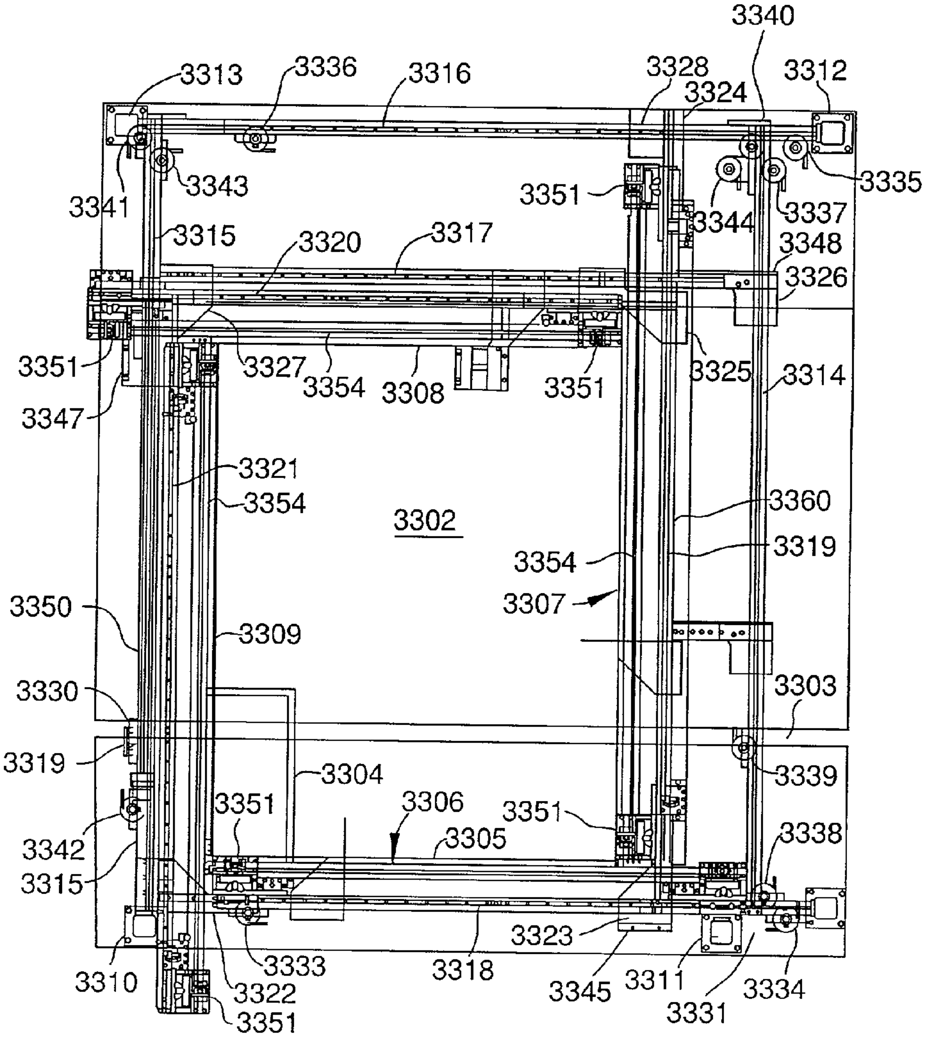
FIG. 33A is a plan view of the clamping and insertion apparatus of FIG. 31A, with the arms positioned for clamping a large screen frame.

Referring now to FIG. 33A, in the exemplary fixture 3102, three of the clamping arms 3307–3309 are movable with respect to the remaining arm 3306. Arm 3307 is slidably mounted to translate in the left-right direction in FIG. 33. One end of arm 3307 slides along stationary arm 3306 in a pair of yolks 3323 and 3324. Each yolk 3323 and 3324 is slidably mounted on a respective rail 3318 and 3316.

Arm 3308 moves both vertically and horizontally. The right end of arm 3308 moves from left to right and right to left along with arm 3307. In addition, arm 3308 moves up and down with respect to arm 3307.

Arm 3309 only moves up and down, in a direction parallel to its length. Thus, arm 3309 always is positioned at the left end of arm 3306.

Figure 33B:
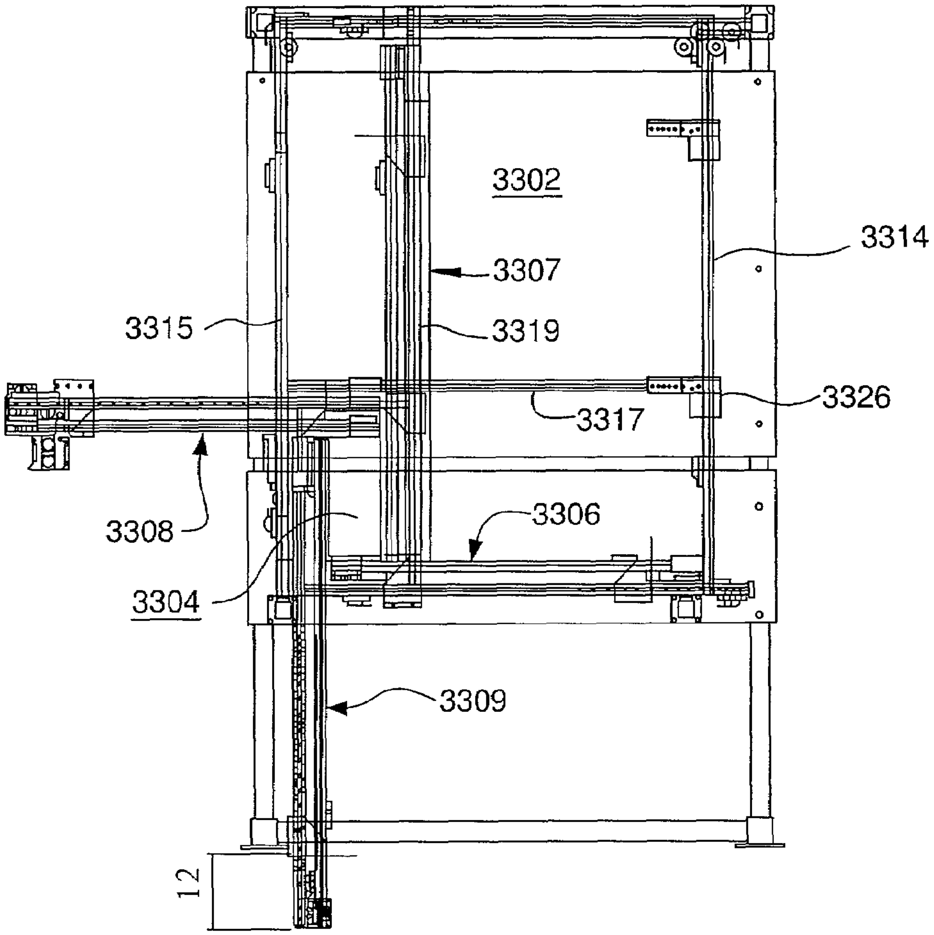
FIG. 33B is a plan view of the apparatus of FIG. 33A, with the arms configured for clamping a small screen frame.

As a result, when the apparatus is reconfigured to accommodate a smaller frame, arms 3307–3309 move as shown in FIG. 33B. Arm 3307 moves leftward to clamp the rightmost edge of frame segment 30*b*. Arm 3308 moves downward to clamp the topmost edge of frame segment 30*c*, and moves leftward by the same distance as arm 3307, so that the right end of arm 3308 meets arm 3307. Arm 3309 moves downward by the same distance as arm 3308, so that the top end of arm 3309 meets arm 3308. Arm 3306 continues to clamp the bottommost edge of frame member 30*a*, and arm 3309 continues to clamp the leftmost edge of frame member 30*d*.

The basic orientation of the apparatus 3103 is vertical, with a slight incline to allow for the frame members 30*a*–30*d* to be supported by the back plate, 3302, so as the frame 30 comes in from the right hand side of the FIG. 33A, the frame comes in under arm assembly 3307. Clamp Arm assembly 3307 lifts (in a direction away from the backplate 3302 shown in FIG. 34) and allows the frame to travel along the back plate 3302. As gravity pulls the frame down to Arm 3306 the frame 30 rests along the fixed clamp plate 3373 as shown on FIG. 37. There is a slot 3303 that is shown on the back plate 3302.

Depending on if it's a new size or the same size as the one that was just finished, the arms 3307–3309 may either open fully in the case of a new screen size to a home position as shown in FIG. 33A, or it will just open slightly, just enough to be ready for the next frame 30 without opening up more than it needs to.

Optionally, a bar code reader or keypad may be used to scan or type in an indication of the frame size. Linear encoders attached to the rodless cylinders that move the arms 3307–3309 (or other measuring means) may be used provide a means for determining the location of the arms, and the current opening size at any time. By identifying the destination size to the system, and measuring the current size, it is possible to avoid opening the arms fully to their home positions (shown in FIG. 33A), even when changing frame sizes.

The next frame is then pushed into the machine 3102 and the clamp gate opens allowing the frame 30 to pass under Arm 3307. Arm 3309 of the gate will have already shut and the little conveyor through that slot 3382 slides the screen frame assembly over to the gate of clamp Arm 3309. It will be a hard stop. An air cylinder pushes the gate up to its final position. Arm 3307 moves over to the left just until it touches the screen bar 30*b*, thus clamping and/or straightening out the pre-bow from screen bar 30*b*. The air cylinder 3329 at the bottom of the apparatus actuate Arm 3307 and clamps the vertical members 30*b* and 30*d* of the screen frame. Arm 3308 also comes down and clamps or touches the top frame member 30*c* and clamps the two (optionally pre-bowed) horizontal frame members 30*a* and 30*c* straight, thus clamping and straightening the frame 30 on all four sides. Arm 3308 is actuated by an air cylinder 3330 along the left side.

Although the exemplary system moves the frame 30 into place in the insertion apparatus 3102 by inserting the frame through the gap 3382 (FIG. 34) on the side of the apparatus, alternative embodiments are contemplated in which the frame is loaded from the front. To front-load the frame into the apparatus, the arms 3307–3309 are either open to their home positions (FIG. 33A), or if the frame size is identified to the system (e.g., via bar code or keypad entry), the arms can be opened by a small amount beyond the size of the frame, the frame moved into position, and the arms repositioned to clamp the frame.

Loading the frame 30 into the insertion apparatus 3102 from the right side is only an example. One of ordinary skill can readily configure the apparatus so that it is possible to load the frames from above or below, or from left or right.

Note that the movement of the arms 3307–3309, as described above, may either be sequential or simultaneous.

The frame remains clamped between arms 3306–3309 while the ventilation cloth 34 is being inserted in the screen bar grooves. The cloth 34 is inserted into the groove, and then pushed out to the left under arm 3309. After that, the clamp gate assembly lifts up (away from the backplate 3302, in a direction normal to the loaded frame) and allows the finished screen frame assembly to pass through.

Understanding of the details of FIGS. 33A–39 will be facilitated by the brief parts list immediately following this paragraph. This is only a partial list; conventional fasteners, finishing coatings and the like are omitted, for brevity.

Figure 35:
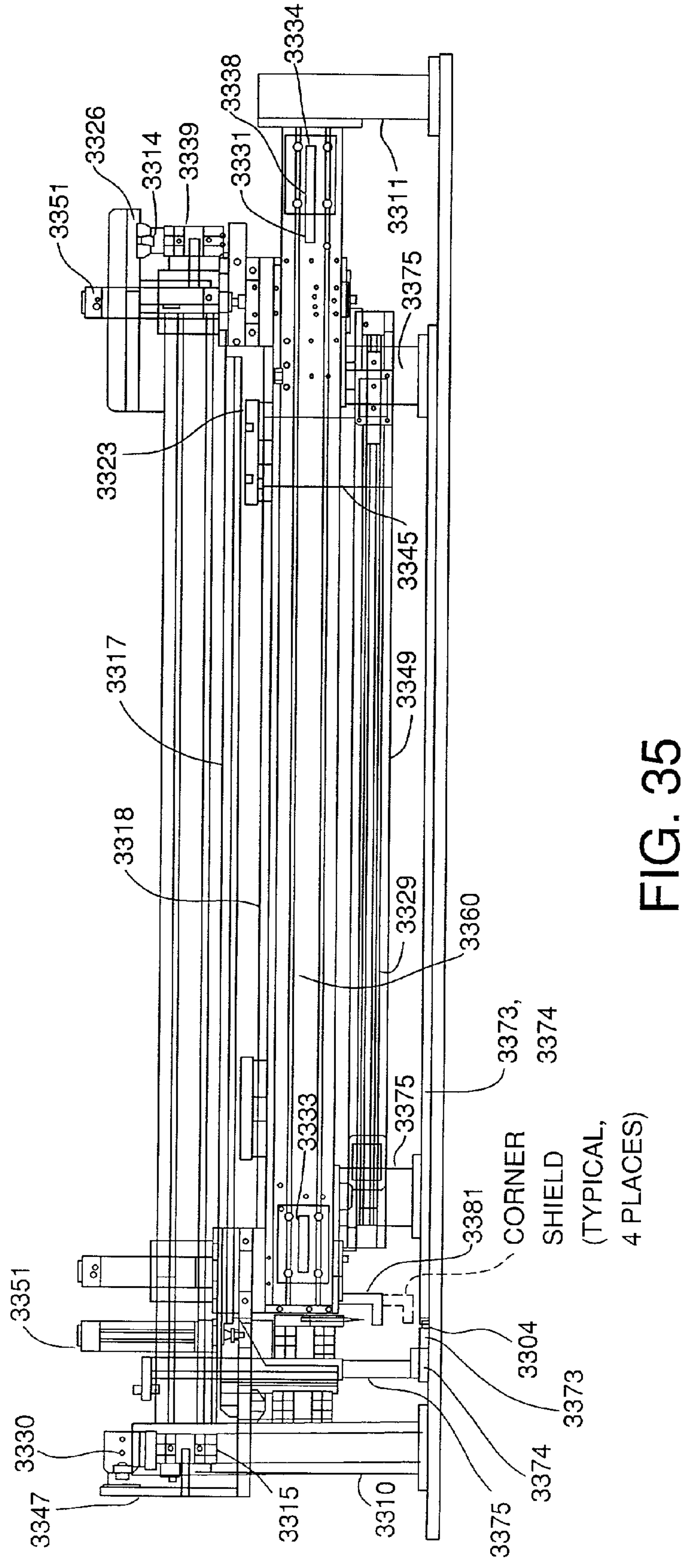
FIG. 35 is a bottom elevation view of the apparatus shown in FIG. 33A.

Parts list for FIGS. 33–35: General Arrangement of arm assemblies

3301 SUPPORT FRAME
3302 BACK PLATE
3303 LOAD/UNLOAD SLOT
3304 SMALL SCREEN (IN POSITION)
3305 LARGEST SCREEN (IN POSITION)
3306 LOWER HORIZONTAL ARM ASSEMBLY (ARM 1)
3307 RIGHT AND VERTICAL ARM ASSEMBLY (ARM 2)
3308 UPPER HORIZONTAL ARM ASSEMBLY (ARM 3)
3309 LEFT HAND VERTICAL ARM ASSEMBLY (ARM 4)
3310 SUPPORT 1
3311 SUPPORT 2
3312 SUPPORT 3
3313 SUPPORT 4
3314 RIGHT HAND VERTICAL GUIDE RAIL
3315 LEFT HAND VERTICAL GUIDE RAIL
3316 UPPER HORIZONTAL (STATIONARY) GUIDE RAIL
3317 ARM 3 HORIZONTAL GUIDE RAIL
3318 ARM 1 RAIL
3319 ARM 2 RAIL
3320 ARM 3 RAIL
3321 ARM 4 RAIL
3322 ARM 1 CORNER YOKE
3323 ARM 2A CORNER YOKE
3324 ARM 2B CORNER YOKE
3325 ARM 3A CORNER YOKE
3326 ARM 3B CORNER YOKE
3327 ARM 4 CORNER YOKE
3328 YOKE LINEAR BEARING BLOCK (TYPICAL)
3329 HORIZONTAL RODLESS CYLINDER
3330 VERTICAL RODLESS CYLINDER
3331 ARM 2 STABILATION CABLE ASSEMBLY
3332 ARM 3 STABILIZATION CABLE ASSEMBLY
3333 ARM 2 PULLEY #1
3334 ARM 2 PULLEY #2
3335 ARM 2 PULLEY #3
3336 ARM 2 PULLEY #4
3337 ARM 2 PULLEY #5
3338 ARM 2 PULLEY #6
3339 ARM 3 PULLEY #1
3340 ARM 3 PULLEY #2
3341 ARM 3 PULLEY #3
3342 ARM 3 PULLEY #4
3343 ARM 3 PULLEY #5
3344 ARM 4 PULLEY #6
3345 ARM 2 LOWER CABLE CLAMP/RODLESS CYLINDER ATTACHMENT
3346 ARM 2 UPPER CABLE CLAMP
3347 ARM 3 LEFT HAND CABLE CLAMP/RODLESS CYLINDER ATTACHMENT
3348 ARM 3 RIGHT HAND CABLE CLAMP
3349 HORIZONTAL LINEAR ENCODER
3350 VERTICAL LINEAR ENCODER
3351 PRESS CYLINDER SUBASSEMBLY
3354 ARM MEMBER
3375 CLAMP BAR SUPPORT COLUMN

Figure 36:
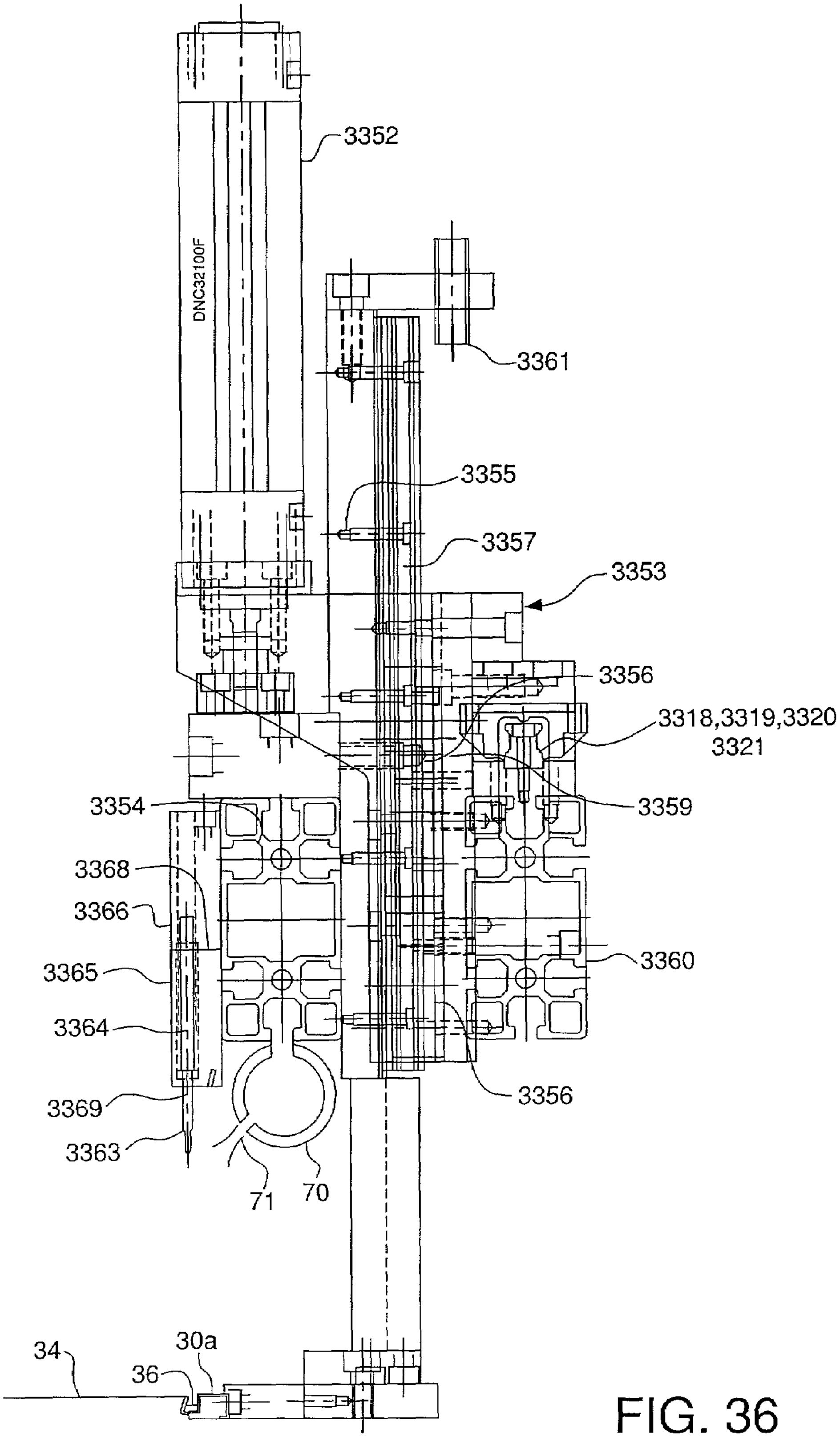
FIGS. 36–39 are detailed elevation views of the clamping and insertion devices of FIGS. 34 and 35.

Parts list, FIG. 36 TYPICAL PRESS CYLINDER ASSEMBLY (ONE AT EACH END OF EACH ARM ASS'Y)

3351 PRESS CYLINDER SUBASSEMBLY
3352 PRESS CYLINDER
3353 ADAPTER BLOCK
3354 PRESS ARM MEMBER
3355 CARRIAGE
3356 LINEAR BEARING BLOCKS
3357 LINEAR RAIL
3358 CYLINDER SUPPORT ARMS (2 PER CYLINDER)
3359 MAIN SUPPORT PLATE
3360 SUPPORT ARM MEMBER
3361 PRESS TRAVEL STOP (ADJUSTABLE)
3362 PIN ASSEMBLY
3363 PIN (TYPICAL EVERY ⅝ INCH)
3364 PIN SPRING
3365 PIN BLOCK
3366 PIN BLOCK MOUNT
3367 COOLING AIR MANIFOLD
3368 AIR DELIVERY PORTING
3369 AIR NOZZLE
3370 SUPPLIMENTAL AIR MANIFOLD
3371 SUPPLIMENTAL AIR NOZZLE

Figure 37:
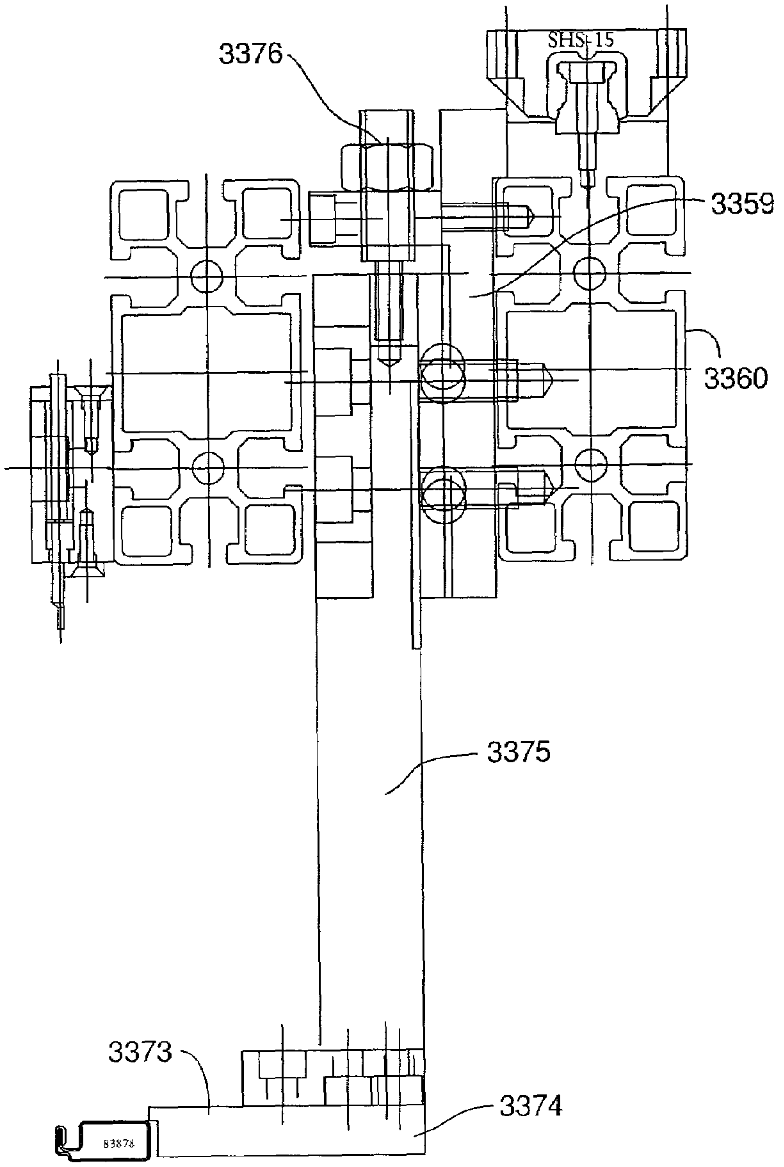

Parts List, FIG. 37 STATIONARY CLAMP PLATE ASSEMBLY

3372 SCREEN BAR
3373 REPLACEABLE CLAMP BAR
3374 CLAMP BAR MOUNT
3375 CLAMP BAR SUPPORT COLUMN (2 PER ARM)
3376 CLAMP BAR HEIGHT FINE ADJUST MECHANISM

Figure 38:
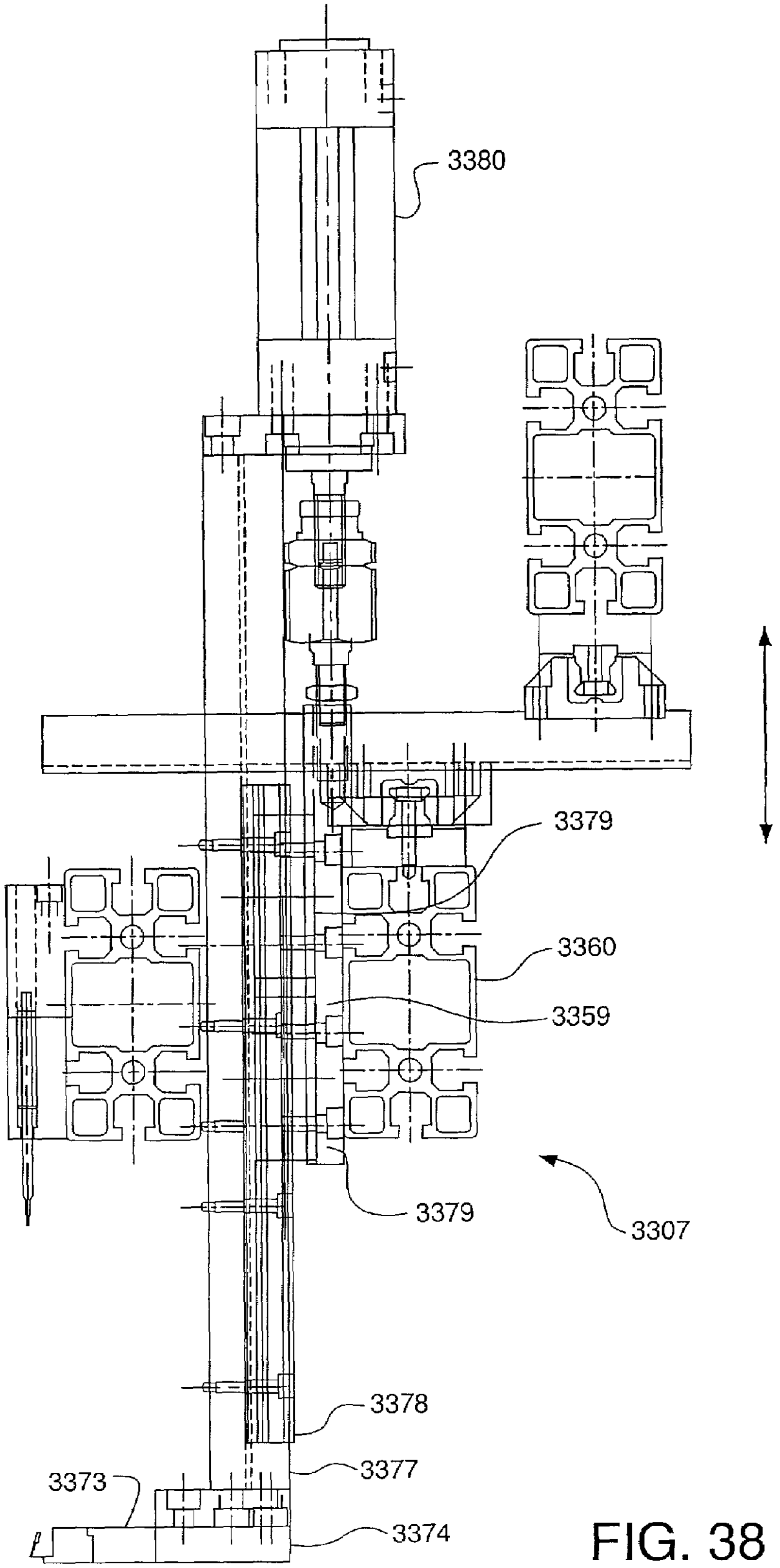

Parts List, FIG. 38 MOVING (GATE) CLAMP PLATE ASSEMBLY

3377 MOVING CLAMP BAR SUPPORT COLUMN (2 PER ARM)
3378 MOVING CLAMP BAR SUPPORT COLUMN RAIL
3379 MOVING CLAMP BAR SUPPORT COLUMN BEARING BLOCK
3380 MOVING CLAMP CYLINDER
3381 CORNER SHIELDS
3382 SPACE

Arm 3307 of the screen clamp assembly 3102 is a movable assembly that moves up and down (i.e., normal to the plane of the loaded frame 30). It's actuated by 2 different cylinders as shown on FIG. 38, and this allows the screen to be loaded and slid along the main plate 3302. All of the Arms 3306–3309 and supporting superstructure, is supported on four posts that are approximately in the 4 corners of the machine so these are Item numbers 3310, 3311, 3312, and 3313. One of these support columns (Item 3312) can be seen in FIG. 34.

So Arm assembly 3306 includes a rail 3318 and a support arm member 3360. This is a stationary rail member, and at the top of the apparatus is another stationary rail member 3316. Arm assembly 3307 slides and includes rail 3319. Assembly 3307 slides to the left and right on rail 3316 at the top and rail 3318 at the bottom. Arm 3307 is connected to each of these with the yolks at the bottom. At the bottom is yolk 3323 which has slide bearing blocks in the bearing rails. At the top arm 3307 is connected with another yolk which 3324. Yolks 3323 and 3324 give Arm 3307 the horizontal action. This horizontal motion is accomplished with an air cylinder 3329 at the bottom of the machine. Cylinder 3329 is a rodless air cylinder that is connected to yolk 3323 via an Arm-3307-lower-cable-clamp/rodless-cylinder attachment 3345. There's also another cable clamp 3346 at the other end of Arm 3307.

This cable system performs the function of keeping Arm 3307 vertical; i.e., to make it perfectly perpendicular to Arm 3306 and Arm 3308 and parallel to Arm 3309. The cable system ties the top yolk 3324 and the bottom yolks 3323 together, so arm 3307 doesn't have a tendency to tilt or twist. The exemplary mechanism includes cables and pulleys; alternatively, timing belts, or drive shafts with a rack and pinion, a spline shaft assembly, or air cylinders, or one of many different mechanisms could be used.

In the exemplary system, as the Arm 3307 moves to the left, the cable is fed down to the left and goes, or proceeds around pulley 3333. The cable then travels back inside of Arm support member 3360 which is a hollow tube, and goes back and travels around pulley 3338. From pulley 3338, the cable travels up the machine to pulley 3337. The cable travels around pulley 3337 and ends at the cable clamp 3346 on the right side of the cable clamp. Each end of the cable, is attached to this cable clamp, with a threaded adjustment for fine tuning of the alignment of the Arm 3307.

When the air cylinder moves to the right then the tension on that cable pulls the top of Arm 3307 to the right. If Arm 3307 moves to the left, then another cable which goes from attachment 3345 in the other direction (which is to the right) and proceeds around pulley 3334. Then the cable goes up to pulley 3335 which takes it inside of the supporting member 3316 and goes around pulley 3336. And from pulley 36 it returns back to the cable clamp 3346 for Arm 3307. When arm 3307 moves to the left, the air cylinder which is down at the bottom pulls the bottom of Arm 3307 to the left and pulls the cable which then pulls the top to the left. These two cables in conjunction with each other keep Arm 3307 perpendicular to Arm 3306 and keep the squareness of the machine.

In a similar manner, Arm 3308 moves in two directions. It moves horizontally back and forth and also vertically up and down (within a plane parallel to the loaded frame 30). To keep Arm 3308 square in a vertical motion, another Arm 3317 serves as horizontal guide rail for Arm 3308; Arm 3317 is a guide rail which moves only vertically up and down (in a plane parallel to the loaded frame). It does not move horizontally back and forth but it provides the horizontal alignment for Arm 3308. It is supported by a corner yolk 3326 on the right hand side and corner yolk 3326 travels on a vertical rail 3314. Rails 3314 and 3317 are positioned further from the base plate 3302 than the arm assemblies 3306–3309.

Arm 3308 has a horizontal guide rail 3317 that supports it on the right hand side. On the left hand side it is supported through a corner yolk 3327 which is also the corner yolk for Arm 3309. The corner yolk 3327 travels in a vertical direction up and down a left hand vertical guide rail 3315. Comer yolk 3327 also supports Arm 3309 and allows Arm 3308 to pass underneath the corner yolk so that smaller screen frames can be accommodated.

Also, the vertical travel is controlled through guide rail 3317. Arm 3308 is supported on each end by the corner yolks 3326 and 3327. On the left side of the machine (in FIG. 33A) is a vertical air cylinder 3330 which is attached to the vertical cable clamp 3347, and this is shown in FIG. 35. The air cylinder 3330 moves this whole mechanism up and down (relative to the backplate 3302, normal to a plane of the loaded frame). A counter weight mechanism is also provided. This air cylinder 3330 may be only strong enough to move the mechanism but is not required to support the weight of the mechanism in a neutral position. Thus, there is a counter weight (not shown) to the system, which just equals the weight of the vertical travelling members.

The counter weight assembly (not shown) may include a cable attached to corner yolk assembly 3327. The cable passes up the machine, over the top of the machine, and then back down and either attaches to a spring or a counter weight, a physical weight, or an air cylinder that just will counter the weight of the clamping arm assemblies.

Arm 3308 is clamping the screens so it must remain parallel to Arm 3306 (for a screen frame that is rectangular). A cable arrangement similar to that described above is provided. This cable arrangement starts with cable clamp 3347 on the left side of the machine (FIG. 33A). A cable comes out the bottom of clamp attachment 3347 and proceeds down to pulley 3342. The cable returns up through the inside of the supporting member for guide rail 3315. The cable travels up to pulley 3343 then it travels to the right hand side and joins up with and goes around pulley 3344. The cable then travels down to the cable clamp 3348 on the other end of Arm 3308. This cable provides the tension to hold up the right hand side of Arm 3308 when there's nothing in the system. When the screen is clamped, to keep this right hand of Arm 3308 down, another cable comes out the bottom of cable clamp 3348. The cable comes down around pulley 3339, the cable passes back up around pulley 3340 and travels over to the left to pulley 3341. From pulley 3341 it travels to cable clamp 3347. These two cables in conjunction with each other keep the horizontal guide rail 3317 for Arm 3308 horizontal.

On the left side of the screen (FIG. 33A) there is a vertical Arm assembly 3309. Arm 3309 is guided vertically on the left hand vertical guide rail 3315. Arm 3309 is connected with yolk 3327 at one end. At the bottom end Arm 3309 is attached with the corner yolk 3322 for Arm 3306. Yolk 3322 holds some bearing blocks on it and allows the Arm 3309 to travel vertically up and down (the up and down directions in FIG. 35, towards or away from the backplate 3302) and maintain a vertical orientation. The vertical member 3315 is attached at the top of the machine to support Arm 3316 via a little corner plate 3313.

There are stationary rails on the outer periphery of the machine on the right side, supporting stationary supporting Arm 3308 and the top rail which is right at the very top of the machine is supporting Arm 3307, the bearing block for Arm 3307 at the one end and at the other end its at the post end at 3313 supports member 3315. In turn, rail 3315 is supported at the other end. Rail 3315 supports Arms 3308 and 3309 through yolk 3327. Arm 3306 at the bottom of the machine is supported by the support post 3310 at the bottom left corner of the machine 3102.

Also shown in FIG. 35 is a corner shield 3381. The corner shield 3381 can be pneumatically actuated into, or out of place, to prevent the pins from trapping the screen cloth at the corners, which can result in the cloth fully entering or being inserted into the groove 32 of the screen bar.

Figure 39:
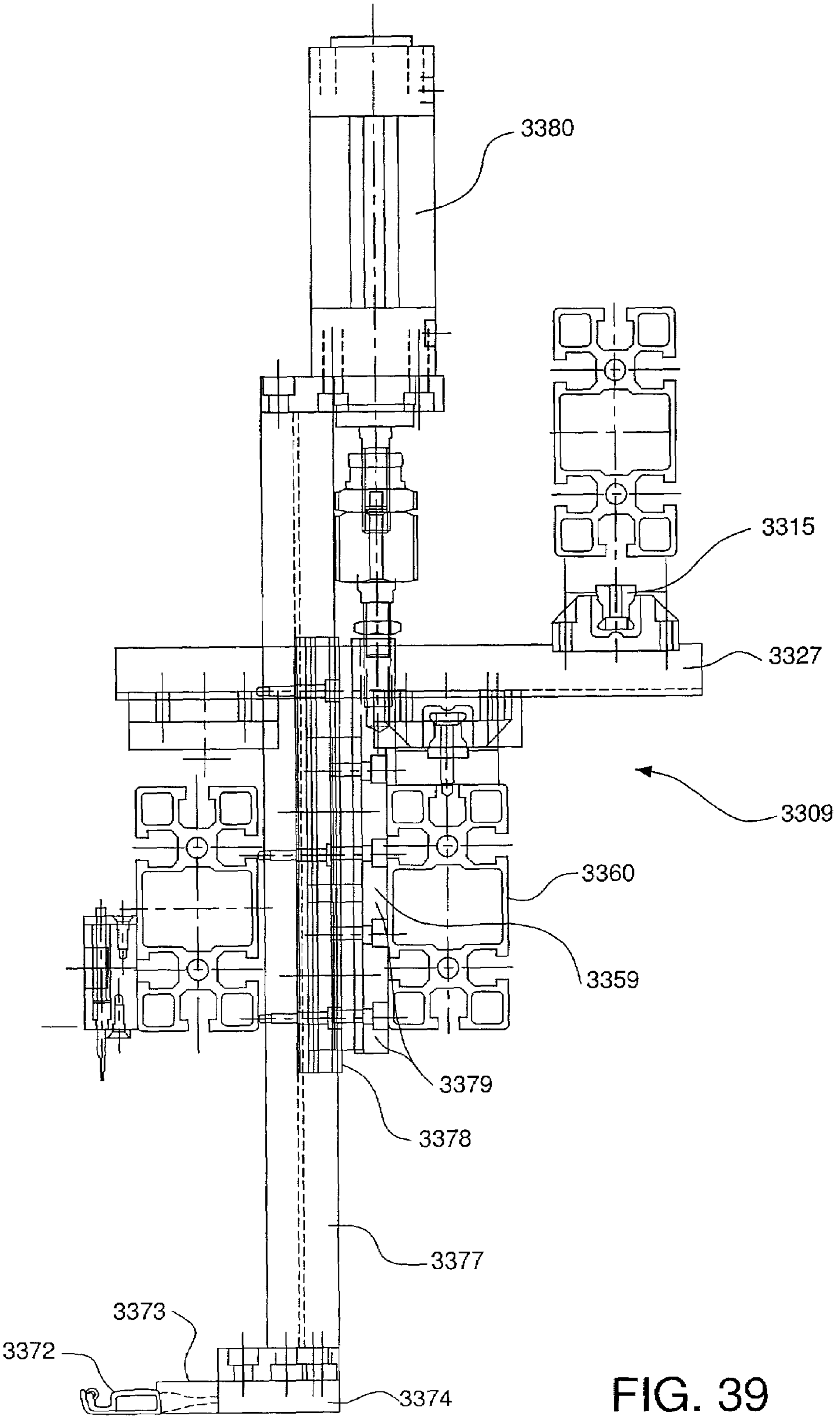

FIGS. 36–39 show details of the clamping/press mechanism. FIG. 36 shows the air manifolds and the pins and a cylinder 3352 that activates the pressing action. FIG. 37 shows the way in which the arrangement of the pins 63 in relationship to the screen bar 30 in relation to the clamping assembly. FIGS. 38 and 39 shows a special case where the clamp plates 3373, 3374 moves up and down under control of cylinder 3380.

Because the machine 3102 allows for side loading of the screen frames as well as front loading, the screen frames pass through the gap 3382 shown FIG. 34. For the screens to go through the gap, the clamp plates have to move out of the way. The two side clamp plates act as gates as well as the clamp bars, to keep the screen frame 30 in position. The clamping mechanism 3373 and 3374 on Arm 3307 and Arm 3309 can be raised and lowered by an actuating cylinder 3380 (as shown in FIG. 38). By raising the clamping mechanism 3373, 3374 out of the way, the frame can be loaded in from the side. Once the frame 30 is past the arm 3307, the clamping mechanism is lowered again. Arm 3306 and Arm 3308 can be stationary as shown in FIG. 37, and the moving clamp mechanisms on Arm 3307 and Arm 3309 are shown in FIGS. 38 and 39, respectively.

Optionally, if the frame is to be loaded from the top or bottom, then arms 3306 and 3308 can be configured to be movable up and down (in the direction parallel to the insertion devices 3363), and arms 3307 and 3309 would not require up and down movement (normal to the plane of the loaded frame). To insert the frame from the top or bottom, the clamping mechanisms 3373 and 3374 of arms 3308 and 3309 would be raised away from the backplate 3302, the frame is inserted through the top or bottom, and the arms 3306 and 3308 would return to their normal plane.

The slot 3303 is in the back plate 3302. Slot 3303 provides a mechanism to push the frames into the machine 3102 and out of the machine. Two rodless air cylinders with little fingers slide the screen frames into the machine and out of the machine. Once the frame 30 is in position, as shown in FIG. 38, the screen cloth is suspended or draped down. Preferably, the screen cloth 34 is automatically fed down to cover the area of the screen frame 30. After the screen cloth 34 is stopped in position, it is draped in that area. The press 3102 closes; the pins 3363 come down and push the screen cloth into the groove 32 in the screen bar 30.

FIG. 36 shows the press assembly 3102 and the cylinder that activates the press. The exemplary gap between the pins 3363 and the groove 32 of the screen bar 30 is about 10 centimeters (4 inches). Other gap sizes may be used. The exemplary gap of 10 centimeters allows enough room to get the screen frame 30 in and out, but is not so far so that excess time is required to close the press. So, just before the screen cloth is in position for the next assembly to be completed, the (previous) finished screen frame from the previous cycle is ejected out of the machine 3102.

In the example, the outside of the frame 30 is clamped and the pins 3363 are part of the clamping assemblies, as shown in FIGS. 36–39. Because the pins 3363 are physically attached to the clamp Arms 3306–3309 by a fixed distance, the pins are now in location when the frame 30 is clamped as shown in FIGS. 37–39. A modular, replaceable clamp bar 3373 is designed to suit the particular screen bar profile being used (The profile is the distance from the outside edge of the screen bar to the center of the spline groove 32).

Note that in apparatus 3102 the registration of the frame is performed from the outside of the screen bar as the frame is clamped, to position the pins for insertion. (In contrast, the apparatus described above with respect to FIGS. 20–30 uses registration with reference to the inside edges of the screen bar).

Figure 40:
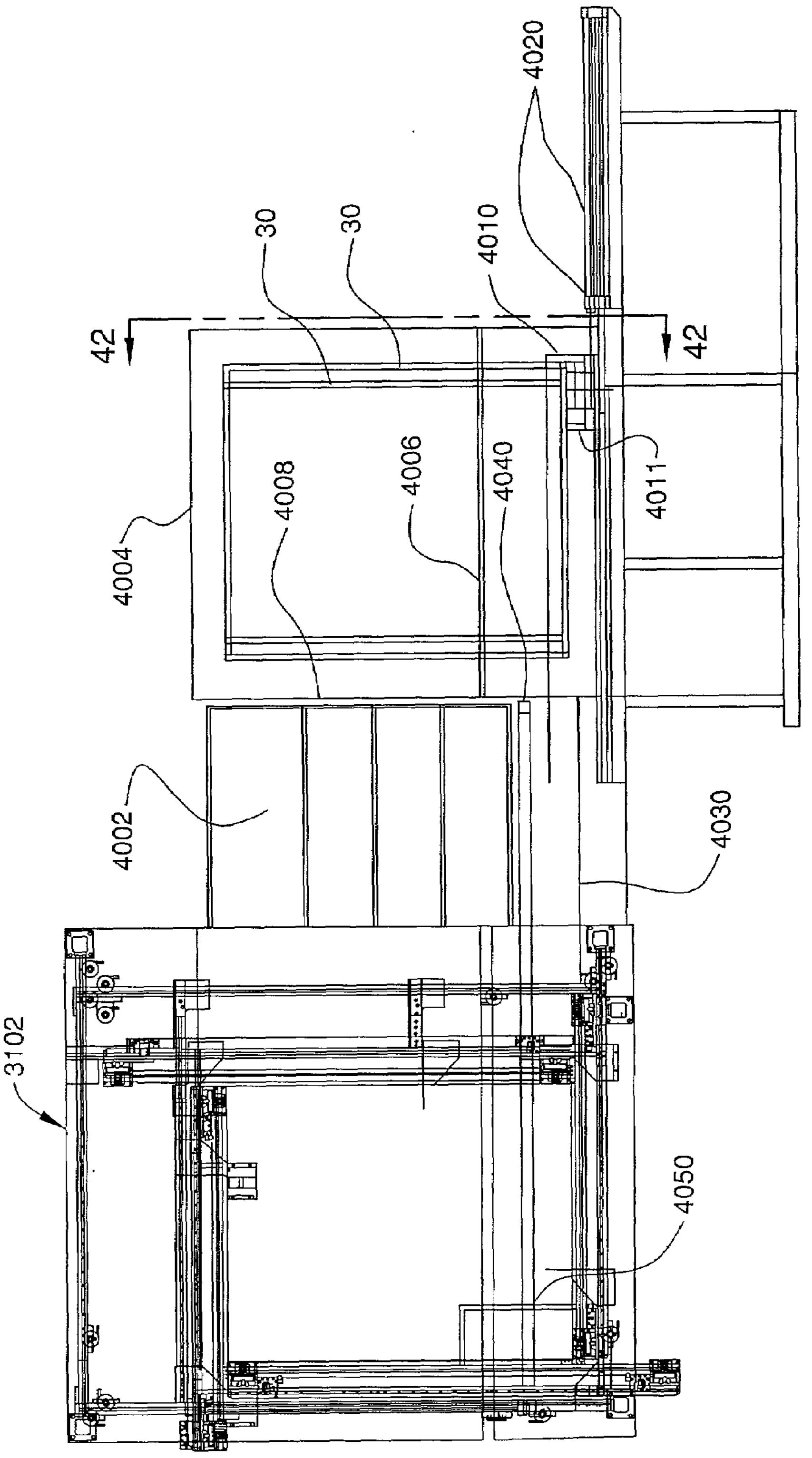
FIG. 40 is an elevation view of a variation of the apparatus shown in FIG. 31A.

FIG. 40 is an elevation view of an apparatus similar to that of FIG. 31A. The apparatus of FIG. 40 includes a smaller oven 4004 that is capable of holding two frames (one behind the other) simultaneously. FIG. 40 shows the transport mechanism in greater detail.

At the right side of FIG. 40 a pair of transfer (rodless) cylinders 4020 actuate a pair of carts 4010 and 4011. Each cart 4010 and 4011 holds a respective frame 30. By actuating cylinders 4020, the carts 4010, 4011 are moved from right to left to move the frame into the right end of the oven 4004, and outside the left end of the oven.

Figure 41:
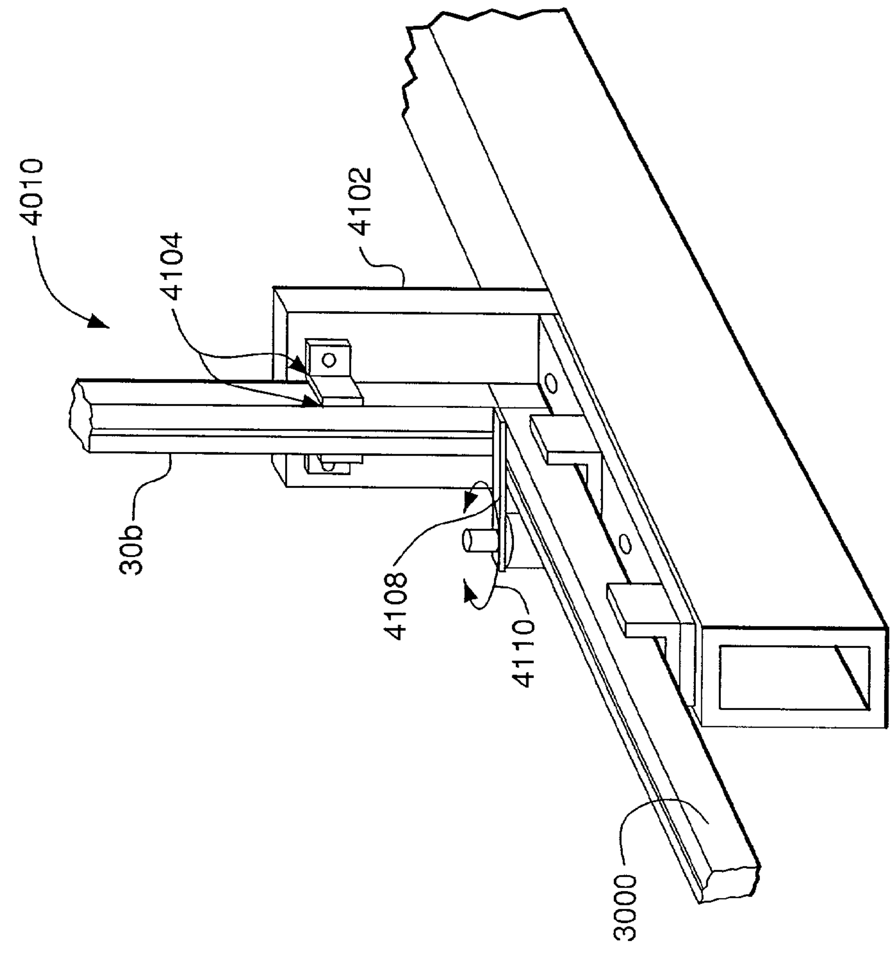
FIG. 41 is an isometric view of one of the carts shown in FIG. 40.

An exemplary cart 4010 is shown in FIG. 41. Cart 4010 has a generally L-shaped bracket 4102, for fitting around a corner of a frame 30. The cart 4010 has a plurality of insulated pads 4104. A spring-loaded finger 4108 rotates into the position shown in FIG. 41 to lock the frame 30 to the cart 4010.

The insulated pads 4104 avoid hot spots in the frame that might melt the glue. The insulated pads may be sized to provide a light interference fit, but should be sufficiently sized to avoid denting the frames. The three insulated pads 4104 clip the frame 30 while allowing any size screen without touching the corner keys (thus avoiding blemishing the corner keys). The frame can be bigger than the cart 4010.

In a small frame, the center of gravity of the frame is close to the left clip 4104 in FIG. 41. The frame sits and is supported by the clips 4104 without touching the spring loaded finger 4108. As the screen size increases and the center of gravity of the frame moves away from the cart 4010, the frame 30 tends to lift off of the right clip, and thus the finger 4108 stabilizes the frame by preventing the frame from lifting up out of the cart. The large frame rests against the finger and the bottom of the left clip. The clip 4104 on the vertical member of cart 4010 stabilizes the frame in the vertical orientation, and provides a means to push the frame forward.

An actuator 4110 may be provided to rotate the finger 4108 out of the way to load the frame onto or off of the cart 4010. Alternatively, the finger can be spring loaded to bias finger 4108 into the position shown, and the finger can be opened manually to insert or remove a frame. Alternatively, the finger can be configured so as to be mechanically triggered to close when a frame is placed in the position shown in FIG. 41. Alternatively, the finger 4108 may be a retractable finger, and may be actuated mechanically or pneumatically, instead of a passive spring-loaded device.

Figure 42:
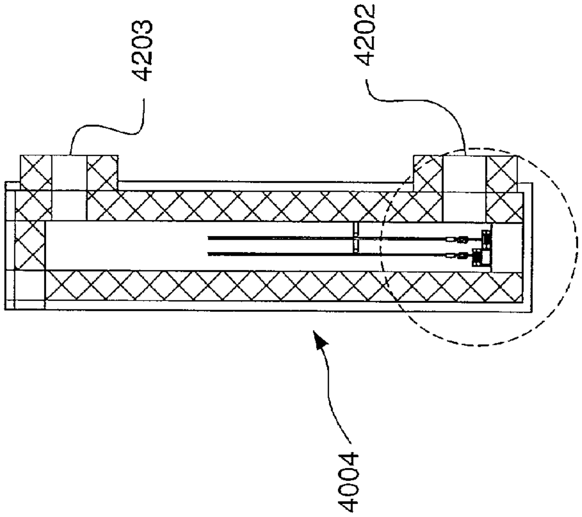
FIG. 42 is a right side elevation view of the oven shown in FIG. 40.

FIG. 42 is a side elevation view of the oven 4004 shown in FIG. 40, taken viewed along section line 42—42. The oven 4004 has an hot air feed duct 4202 into which the hot air is fed at a temperature between about 150 and about 300 degrees C., depending on the desired cycle time and the type of adhesive used. The hot air is forced up through the oven 4004, and exits through an outlet duct 4203. Air from outlet 4203 is fed through a heater and returned to the inlet duct 4202.

Figure 43:
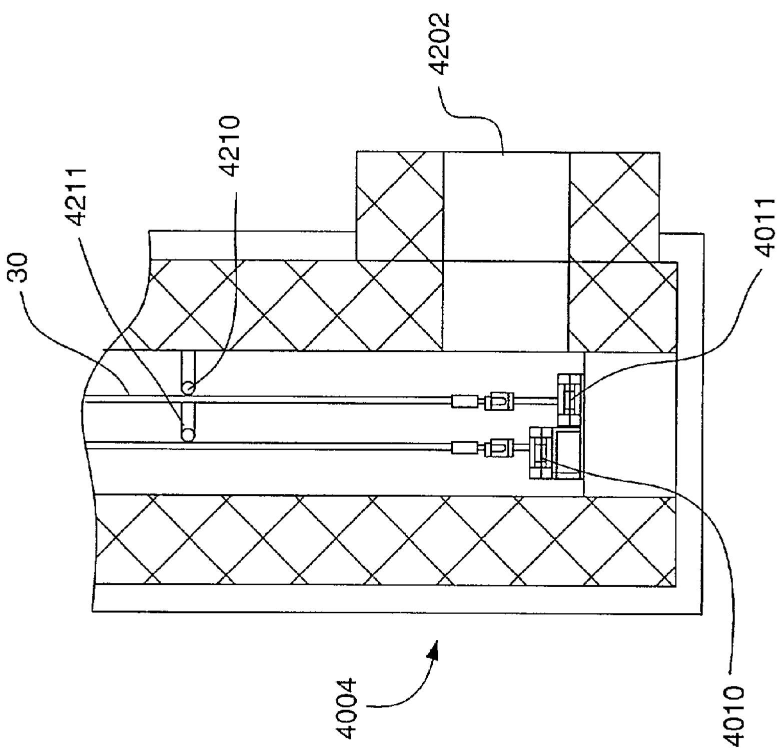
FIG. 43 is an enlarged detail of FIG. 42.

FIG. 43 is an enlarged detail of FIG. 42. As shown in FIG. 43, cart 4010 may be higher than cart 4011. This difference in the height of the carts 4010, 4011 is optional, and may be used if there is insufficient room for the two rodless cylinders 4020 to be positioned side-by-side at the same height. For example, if a wider oven 4004 is used, then the rodless cylinders 4020 may be placed further apart, and it would not be necessary to locate the carts 4010 at different heights. FIG. 43 also shows a pair of screen frame support rails 4210 and 4211. In the example, rail 4210 is in the same plane as the insertion apparatus 3102.

Referring again to FIG. 40, the heated frames are pushed out of the oven 4004, and are transferred to the back support frame 4002. A folding finger gate 4040 lets the frame pass through and prevents the frame from traveling backwards. Preferably, the folding finger is a passive device, as described below.

Figure 44:
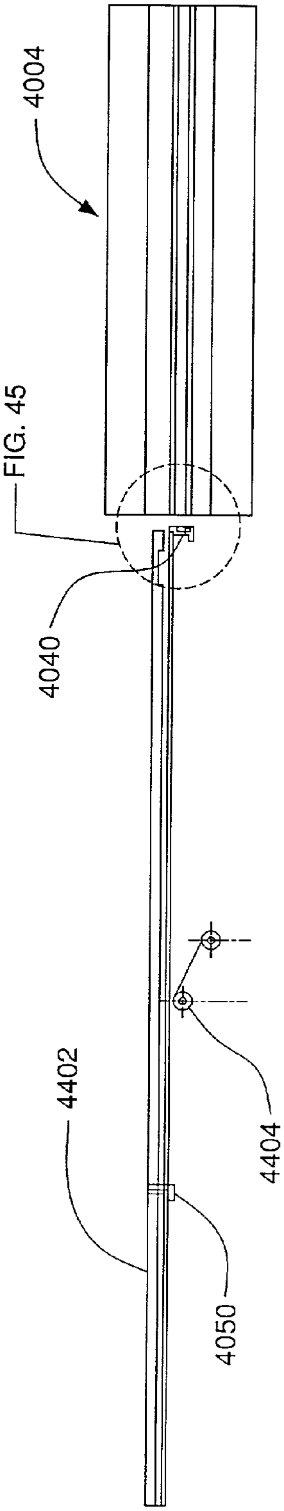
FIG. 44 is a top partial plan view of the apparatus of FIG. 40.
Figure 46:
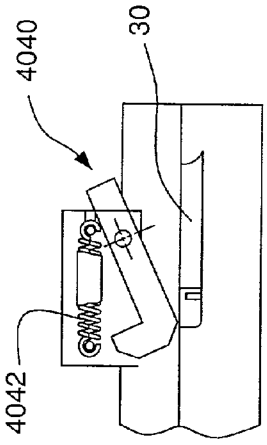
FIG. 46 shows the "folding finger' of FIG. 45 in an alternate position.
Figure 45:
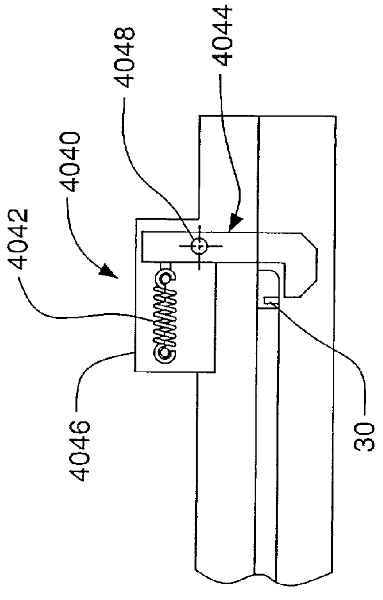
FIG. 45 is an enlarged detail of FIG. 44.

FIG. 44 shows the hand-off between the oven conveyor and the transfer conveyor. The screen frame 30 is pushed to the left by its respective cart 4010 (or 4011). A pair of guide rollers 4404 bring the frame 30 from an out-of-plane position to an in-plane position (These positions are shown in FIGS. 43 and 44). Alternatively, instead of rollers, a guide bar or plate may be used. When the frame 30 pushes against the folding finger 4040, the finger pivots clockwise about its axis 4048, as shown in FIG. 46. A spring 4042 biases the finger to the position shown in FIGS. 44 and 45. When the frame 30 passes to the left of the folding finger 4040, the spring 4042 pulls the finger back to its rest position, as shown in FIG. 45. When finger 4040 is in this position, the frame 30 cannot move backwards. A block 4044 prevents the spring from pulling the finger 4040 back past its rest position. Finger 4042 is mounted to the carriage 4046 of a rodless cylinder 4402 (shown in FIG. 44). Once the frame 30 is in the position shown in FIG. 45, the rodless cylinder 4402 moves the carriage 4046 (and thus the frame 30) into the clamping apparatus 3102.

A second folding finger assembly 4050 pushes the finished screen frame assembly out of the insertion apparatus 3102. The operation of the assembly 4050 is the same as described above with reference to assembly 4040.

Figure 48:
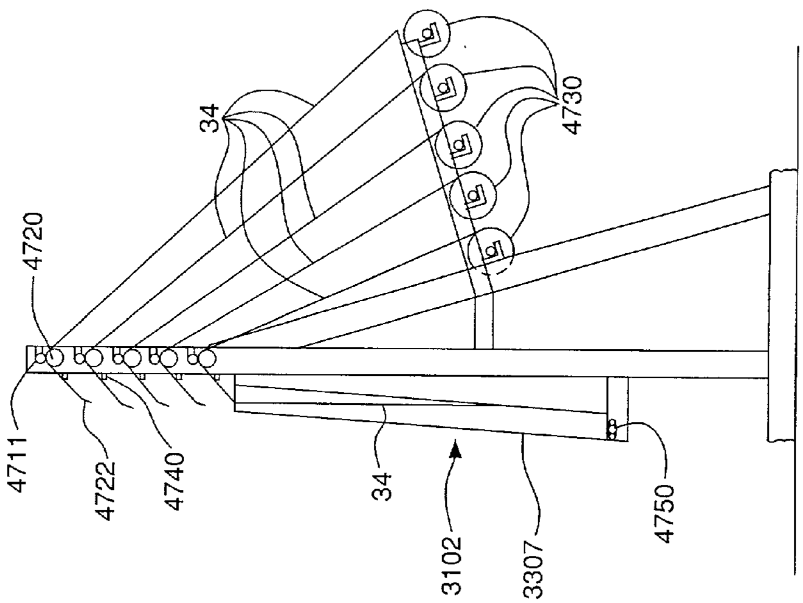
FIG. 48 is a side elevation view of the screen cloth feeding apparatus of FIG. 47.
Figure 47:
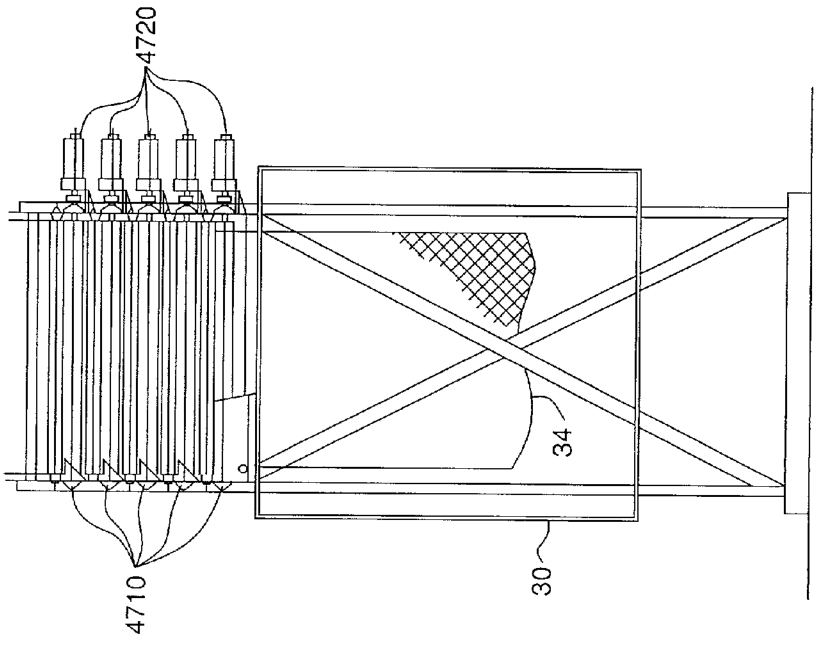
FIG. 47 is a rear elevation view of the apparatus of FIG. 33A, showing screen cloth feeding apparatus.

FIGS. 47 and 48 show an exemplary automatic screen cloth feed for the insertion apparatus 3102. FIG. 47 is a rear elevation view of the apparatus shown in FIG. 33A. FIG. 48 is a right side elevation view of the apparatus shown in FIG. 47. Details of the insertion apparatus are omitted from both FIGS. 47 and 48 for easier viewing of the cloth feeding apparatus.

The exemplary apparatus includes five different feeds for feeding any one of five different widths of screen cloth 34 at any given time. This allows rapid switching between screen assembly widths. Although is also possible to use a single cloth feed with the cloth that corresponds to the widest assembly made on the apparatus, using different cloth widths substantially reduces wasted cloth.

Each width of cloth is fed from a roller 4730. At the top of the assembly, a plurality of nip rollers 4710 and 4711 feed the cloth. Rollers 4710 are beneath each piece of cloth, and rollers 4711 are above each piece of cloth. A plurality of drive units 4720 (which may be reversible quarter horsepower motors) drive the rollers to feed the cloth. There is one lower sensor (such as a photoeye 4750) at the bottom of the clamping assembly 3102. When the cloth 34 is being fed out, the motor 4720 stops when the cloth reaches photoeye 4750.

Only one of the rolls 4730 of cloth 34 pays out at any given time. When the insertion apparatus is being reconfigured to change to a new size of screen frame, the previously used cloth is retracted, and the next cloth to be used is paid out. To retract the cloth from the last screen frame assembly, the motor 4720 corresponding to that cloth is operated in reverse. A plurality of sensors (such as photoeyes 4740) are positioned, one below each nip roller 4710. When the cloth 34 retracts so that the photoeye for that roll of cloth no longer detects the presence of cloth below roller 4710, then the motor 4720 for that roll of cloth is turned off.

One of ordinary skill in the art understands that additional aspects of the apparatus of FIGS. 31–48 may be configured using the teachings of the apparatus of FIGS. 20 to 30 and the description thereof provided above. In addition, various features of the apparatus in FIGS. 20 to 30 may be replaced by features of the apparatus of FIGS. 31–48.

Adhesive

Adhesive is applied in the groove 32 of the screen bar 30*a* or against or close to the base of the step 32' of the screen bar 30*a*'. In either case, the adhesive 36 is applied along the base 32*a* of the respective tensioning step 32. As is described below, the adhesive 36 may be applied as a film or bead.

In either the embodiment shown in FIG. 6 or that shown in FIG. 8, the adhesive 36 is secured to the screen bar 30*a* along the base 32*a* of the respective tensioning step 32. The term "secured" or the term "bonded" as used herein is intended to include the generally accepted terms for adhesion of one material to another, i.e., mechanical interlocking, the formation of direct chemical bonds across the interface of the materials and electrostatic attraction, as discussed in Engineered Materials Handbook, Vol. 3, "Fundamentals of Adhesives and Sealants Technology". ASM International Handbook Committee, page 40. By far, the dominating adhesion mechanism, especially in the absence of reactive groups, is the electrostatic attraction of the adhesive to the screen bar as the adherent and vice versa. These are primarily dispersion forces (London forces) and forces arising from the interaction of permanent dipoles. These forces provide much of the attraction between the adhesive and adherent and contribute significantly to the cohesive strength of the adhesive polymer. Mechanical interlocking is assisted by the roughness and porosity of the adherent, in this case, the screen bar. The formation of covalent chemical bonds requires that there be mutually reactive chemical groups tightly bound on the adherent surface and in the adhesive.

Preferably, the adhesive 36 is applied while the screen bar 30*a* or 30*a*' is being made. The screen bar substrate itself may be made from metal, plastic, composites, wood and the like. By way of example, the screen bar 30*a* or 30*a*' may be made by either roll-forming or extruding metal (or by extruding plastic) into a segment of screen bar 30*a* or; 30*a*' and forming groove 32 (or step 32') along one side of the screen bar segment 30*a* (or 30*a*').

Equivalent methods may be used for other materials. At this time, adhesive 36 or 36' is applied in the groove 32 of the segment of screen bar 30*a* (or along the base of the step 32' of the segment of screen bar 30*a*'.) However, if desired, the adhesive 36 may be applied in a separate ("off-line") operation subsequent to the manufacture of the segment of screen bar 30*a* or 30*a*'.

During roll-forming, for example, the adhesive may be applied to the flat strip, before it passes through the rollers of the roll former, or, preferably, at or near the exit end after the screen bar has been shaped. If the adhesive is applied to the flat strip, however, the adhesive must be allowed to cool before roll-forming, which takes time and space, and it is more difficult to position the film or bead of adhesive correctly. In the case of extruded screen bar, the adhesive can only be applied after the screen bar has been formed, or off-line.

In each of the above cases, adhesive may be applied to the screen bar using a standard hot melt adhesive applicator using a bulk melter and a constant displacement pump or the like. Alternatively, a screw-type extruder may be used for this application. Either a film or a bead of adhesive having a desired thickness can be applied. For both types of applications (bulk melter or extruder), the hot melt adhesive (in bulk, pellet or granular form) is heated above the melting point and pushed through a small orifice (nozzle) to stream into the groove 32 of the screen bar 30*a*–30*d* or along the base of the step 32' of the screen bar (or to its final location, if applied onto the flat strip before the strip is roll-formed), which is driven under the nozzle at a constant speed. The molten adhesive is allowed to cool to room temperature, and the finished screen bar with applied adhesive can then be stored. Typically, roll-forming lines run at a speed between 100 and 400 feet per minute and slightly less for aluminum extrusion. Off-line application typically runs at 100 to 300 feet per minute. By way of example, the reapplication of a 0.05" diameter bead of adhesive having a specific gravity of 1.02 (typical for polyamide) will need to be supplied at 8 pounds per hour to meet a 100 feet per minute line speed and 48 pounds per hour for a 300 feet per minute line speed.

Alternatively, the adhesive may be pre-extruded as a solid ribbon. The cooled solid ribbon of adhesive may be roll-formed into the screen bar during the roll-forming process. Near the end of the roll-forming process, when the screen bar material is close to its final shape, the ribbon of adhesive is introduced, and the material forming the screen bar may be bent around the ribbon of adhesive to retain the adhesive. The solid adhesive may also be pressed into the roll formed bar after the roll-forming is complete. Preferably, any roll-forming lubricants that may be present in the groove or tensioning step are removed before applying the ribbon of adhesive. Although applying the adhesive in a sold, pre-extruded form may add an extra step to the screen bar roll-forming process, it eliminates the need to heat the screen bar above 60° Celsius to obtain good adhesion between the screen bar material and the adhesive.

Preheating the screen bar just prior to application of the adhesive, to between about 40 and about 150° C., greatly improves the adhesion between the adhesive and the screen bar. Flame treatment of the surface of the screen bar also improves this adhesion. Therefore, when applying the adhesive, it is preferable to heat the screen bar at the location of adhesive application. Heating the side of the screen bar that the adhesive contacts significantly lowers the viscosity of the adhesive and allows it to flow easily at the heated interface. This provides a mechanical bond (interlocking) on a microscopic scale, in that the adhesive flows into any minute imperfections in the screen bar, as well as an electrostatic bond. It is preferable to heat the screen bar to a temperature in the range of about 40° C. to about 150° C., with about 60° C. to about 120° C. being preferred and about 60° C. to about 100° C. being most preferred. A propane flame or like heating element can be used to heat the screen bar in this manner. Corona treating, as is routinely used in the plastic and adhesive industry may also improve bond strength, depending upon the substrate.

Mechanical bonding also can be effected by perforating the bottom 32*a* of the groove 32 or the bottom 32*a*' of the screen bar 30*a*' adjacent to the step or lip 32*b*. When applied, the low viscosity adhesive flows through these openings to some extent and forms rivet-shaped beads or heads on the underside of the screen bar. When solidified, these beads mechanically lock the screen to the screen bar. These openings may be on the order of 1/32" (0.08 cm) round or square. This dimension may be varied as desired.

Further, adhesive bond can be lost if, for example, residual processing lubricants are not removed prior to applying the adhesive to the screen bar, if extreme and sudden temperature changes occur, if improper surface treatment or improper preheating of the screen bar is done, or if the adhesive is applied while too cold. For these reasons, both mechanical and electrostatic bonding are preferred. If, for example, the electrostatic bond is lost because of excess processing lubricants, the mechanical interlocking assures bonding. As discussed above, perforations in the screen bar adjacent to the step are the preferred mechanical interlock.

The adhesive is allowed to cool and set in the groove 32 of the screen bar 30*a* or along the step 32' of screen bar 30*a'*. Then, the segment of screen bar 30*a* or 30*a*', which includes the adhesive 36 or 36', can be stored for any desired time period, and used at a later date. Typically, the screen bar and adhesive assembly is sold in a standard lineal format typically 12 feet (3.6 meters) long. As discussed above, the lineals are cut to size and made into screen frames using corner keys or otherwise, in accordance with conventional practice.

Another aspect of the invention is the re-melting characteristic of the adhesive used. Generally speaking, a preferred adhesive (1) is applied easily, in liquid (e.g., melted (preferred) or solvated) form, (2) solidifies after application to the screen bar (for storage, shipment, assembly of the screen frame, etc.) and then (3) can be re-melted or reactivated (liquefied) during application of the screen to secure the screen to the screen frame.

The adhesive family known generally as "hot melt adhesives" have been found to have these attributes, since they can be applied in liquid form, solidify and then can be remelted or "re-activated" at the time of securing the screen (i.e., screen assembly).

Hot melt adhesives in a solvated, liquid form, can also be used. They are liquefied by the use of solvents such as toluene, MEK (methyl-ethyl-ketone), acetone, and the like. Once solvated, they are applied in liquid form and solidify upon solvent evaporation. They can then be re-melted in the same way the non-solvated forms are. The solvated forms, however, are less desirable, since the solvents add costs, and the evaporated solvents are typically toxic when inhaled.

The curable type of hot melt adhesives, known as "hot melt polyurethane adhesives" (i.e., PUR's or HMPUR'S) can also be used for this invention, if the adhesive is re-activated (at the time of securing the screen) before it cures. The window of time available, between application to the screen bar and cure, depends upon the adhesive formulation. For instance, Henkel macromelt adhesive A4676 is a hot melt polyurethane adhesive which has approximately four days before it is cured to the point where reactivating cannot occur, effectively. Also available, with similar s characteristics, is HL9527 available from European Fullers, Rangeview Road, Mississauga, Toronto, Ontario. Essentially, these adhesives react with the moisture in the air, causing permanent molecular cross-linking and thus become un-meltable (thermoset). The act of curing or cross-linking of the polyol and the isocyanate in these adhesives precludes the resultant polyurethane from remelting.

The A4676 adhesive, for example, has an acceptable application melt temperature of 110° C. and a green strength (tensile strength, before cure) of 4 to 5 pounds per linear inch of screen) which is more than adequate to secure the screen, once applied. The adhesive, upon curing, has a tensile strength of 2300 lb., a heat resistance temperature of 300° C. and a viscosity of 100 poise at 230° C. The advantage to this type of adhesive is the low application temperature and the relatively high heat resistance temperature, once cured. The disadvantage is the fact that the assembly must be completed shortly after the application of the adhesive to the screen bar. Thus, this type of adhesive has limited use. For the majority of applications, when the screen bar is stored for prolonged periods before screen assembly, the regular hot melt (non-curing type) adhesive must be used. For this reason, the regular hot melt type of adhesive is most preferred for practicing this invention.

The temperature during remelting of the adhesive is typically limited to below 400° F., preferably at 350° F., to prevent smoke (from PVC coated screen cloth). Hotter temperatures may be used, if any fumes exuded by the screen and/or adhesive are evacuated, trapped, and filtered or recycled.

The use of B-stage epoxy adhesive appears to be not nearly as practical for this invention. They could be made to work if formulated to be applied in a high enough viscosity state to allow handling, once applied to the screen bar; to have a high enough tack or green strength to secure the screen before cure; and to have a long enough shelf life, once applied to the screen bar, to allow screen assembly in time before natural crosslinking occurs. All of these conditions, however, make these adhesives difficult to work with in this environment. Another major drawback with these adhesives is the need for a long cure time at elevated temperatures. Typically, this requires the use of an oven. High intensity lasers have been used to greatly speed up the cure time, but may be impractical, from a cost perspective, for this invention.

As noted above, it is particularly desirable to reduce cycle time by extracting the insertion device (e.g., insertion pins) as soon as the adhesive in the vicinity of the pins solidifies. For a clean appearance, it is necessary to wait until the pins can be extracted without formation of strings of adhesive during extraction. The choice of adhesive can influence the cycle time. In particular, adhesives that tend to shear without forming strings are preferred based on this criterion. A preferred material is Henkel Macromelt 6071 adhesive, which has a heat resistance temperature of 70 C, and a melting temperature below 100 C.

An acceptable degree of bonding can occur without encapsulation of the strands of the screen-into the adhesive. Therefore, encapsulation is not essential to this invention. It is, however, preferred to encapsulate the strands of the screen using the adhesive, since this results in mechanical bonding as well as adhesive bonding. Further, encapsulation allows visual assurance that full melting and bonding have occurred.

For straight adhesion, without encapsulation, the adhesive can be applied as a film in a layer having a thickness between about 0.0005 to about 0.020 inches, and preferably, between about 0.003 to about 0.020 inches. The film option, if deemed acceptable by users, has the advantage of faster application speed and less cost. Whether a film or a bead of adhesive is used is really a matter of the degree of bond certainty that is desired by the particular user. When using a bead of adhesive, a layer having a thickness between about 0.020 to about 0.250 inches is preferred. When a bead is used, it is preferred to apply the adhesive in an amount to provide a layer having a thickness between about 0.030 to about 0.150 inches. This amount is sufficient to provide encapsulation.

An advantage of using a bead of adhesive in a groove (over a film of adhesive in a groove or along a bottom of a step or lip) is that the bead can be mechanically trapped by the walls of the groove, if the walls of the groove are tapered slightly to form a smaller spacing at the top (opening) than at the bottom.

In the exemplary embodiments of the invention, the primary mode of cooling at the time of screen assembly (as opposed to the time of application of the adhesive) to the screen bar occurs by conduction of heat into the aluminum substrate (screen bar) and secondarily, by convection/conduction into the surrounding air. Although it is also possible to allow cooling to occur naturally to minimize process complexity, forced cooling (by methods such as forced ambient or chilled air) is quicker. If forced air cooling is used, it may be either attached to the insertion tool (as in FIGS. 2–5) or in the form of a general fan or blower blowing air over the entire assembly or focused on the screen bar.

Forced cooling may be desired when hot ambient conditions exist or if the screen bar is preheated. Also, the screen bar must be cool enough to avoid remelting of the adhesive after the adhesive has cooled.

Because the preferred mechanism of cooling includes heat sinking into the screen bar, it is important to use a minimum amount of adhesive to avoid a thick barrier of low conducting adhesive that would interfere with heat flux from the hot adhesive to the screen bar.

For the adhesive to bond to the strands of the screen, it is necessary for the adhesive to cool below its melt point. For this reason, in this embodiment, it is preferred to utilize an adhesive (such as a crystalline adhesive) having a sharp melt point, so that the adhesive solidifies soon after cooling begins.

The adhesive also must provide adequate holding strength over the full range of service temperatures. Hot melt adhesives, particularly, polyester and polyamide adhesives have been shown to offer good flow and adhesive characteristics over the full temperature range experienced in service. Additionally, and when desired, these adhesives also provide good encapsulation (mechanical anchoring of the screen strands) characteristics.

Generally speaking, conventional thermoplastic pure polymer resins such as polyamide, polyester, polycarbonate and the like tend to have higher melt flow viscosities than is acceptable, resulting in lower screen holding strength than desired, because it is difficult to embed the strands of the screen in these adhesives. Straight polyamide (e.g., nylon) and polyester (PET) polymer resins (plastics) work only to a limited degree, since the viscosity and melt temperatures are higher with these pure resins. Also, these resins include none of the desirable additives, which lower viscosity and melt temperature and improve surface wetting (via surfactants). Although pure tensile holding strength may be achieved with high viscosity resins and adhesives, the lack of adequate holding strength puts a greater demand on the electrostatic or adhesive bonding component.

The polyester and polyamide families of adhesives have shown good performance at elevated service temperatures. Therefore, these adhesives are preferred. Nevertheless, this invention is not limited to these adhesives. Rather, any suitable hot melt or equivalent adhesive or thermoplastic resin having the required heat resistance temperature, bond strength and viscosity characteristics can be used.

Most manufacturers follow ANSI and CGSB standards for load requirements. Experiments show that in order to pass the CAN/CGSB 79.1 type II standard, a retention strength of approximately 9 pounds per inch width of screen is required when the load is applied in the plane of the screen (i.e., tensile loading). This value was obtained from tests conducted at room temperature. This value was measured using a 1 inch (2.5 cm) long screen bar sample with a piece of screen 1 inch by 2 inches (2.5 cm×5.1 cm) attached. A tab attached to the screen bar and coplanar with the screen was inserted into one jaw of an Instron tensile testing machine while the screen was inserted into the other jaw. Samples were then loaded to the break point, which was recorded.

Existing spline retention technology which meets this load requirement of 9 pounds at room temperature was measured to drop to approximately 4 pounds per inch at 60° C. At −40° C., there was not a significant change in retention strength compared to room temperature measurements. The strength of hot melt adhesives also decreases at elevated temperatures, but may increase at slightly lower temperatures. In experiments, a strength of 30 to 35 pounds per inch was obtained at room temperature conditions using the Henkel 6206 adhesive. At 60° C., the strength was measured to be 20 pounds per inch. The present invention thus gives over three times higher retention strength over current spline technology over the range of service temperatures. This was unexpected!

In choosing a hot melt adhesive or thermoplastic resin to meet the requirements of hot weather conditions, one should consider various temperature values specified by the manufacturers of these adhesives or resins. Specific values include melt and glass transition temperatures as measured using differential scanning calorimetry (DSC ASTM test #E 698), heat resistance temperature using ASTM test method #D 2293 and softening point, usually determined using the ball and ring test, ASTM #E 28. Generally, the ball and ring temperature is approximately 8 to 10° C. greater than the melt temperature for polyester and polyamide adhesives.

The most important temperature value relating to selection of materials for this invention is the heat resistance temperature, since this value indicates the temperature at which movement under load occurs. This is referred to as "creep". Typically, a 500 gram load is used on a 1 inch by 1 inch (2.5 cm×2.5 cm) lap seam (as opposed to a butted seam). The heat resistance temperature is an indication of when an adhesive begins to rupture under loaded conditions.

In short, the theoretical minimum heat resistance temperature allowable is the design ambient temperature. Nevertheless, practically speaking, it is generally necessary to have a heat distortion temperature to perform in the ambient conditions expected. In most areas (excluding tropical climates), this temperature is considered to be about 35 to about 45° C. Although it is most preferred to have adequate strength to hold screen tension up to 85° C. for shipping in closed containers (as per MIL-STD A10), a reasonable upper ambient limit (desert) temperature is considered to be about 50° C., where full performance strength is required. With the sun directly hitting dark colored screen bars, an additional 20° C. can be reached. Thus, a preferred minimum heat resistance temperature is about 70° C. for service, and about 85° C. for shipping. In temperate climates, it is generally acceptable to have a heat resistance temperature of about 55° C. This compensates for a 35° C. upper limit on ambient temperatures and a 20° C. differential for sunshine on dark colors. In tropical climates, these values are 45° C. plus a 20° C. differential, which yields a minimum of about 65° C.

Because the upper limit for ethylene vinyl acetate (EVA) type adhesives is generally considered to be about 75° C., this type of adhesive is acceptable from a temperature standpoint. However, EVA hot melt adhesives are not preferred because plasticizer migration from the screen may occur at elevated ambient temperatures resulting in loss in structural integrity, i.e., tensile strength.

In the adhesive industry, a 15 to 20° C. margin of safety is generally recommended between the heat resistance temperature of the adhesive used and the expected service temperature. Thus, an 85° C. service temperature expectation would suggest that the adhesive have a heat resistance temperature of about 100 to about 105° C. Adhesives in the polyamide or polyester family of hot melts meet this criterion. It is, however, more preferred to have an adhesive with a heat resistance temperature of about 120° C. This gives a 35° C. margin of safety over the 85° C. shipping temperature and 50° C. above the 70° C. dark color desert conditions under direct sunlight. Again, polyamide and polyester hot melt adhesives meet these values.

Thus, the adhesive should have a heat resistance temperature of not less than about 35° C. A heat resistance temperature between about 55° C. and about 180° C. is preferred, with between about 85° C. and about 150° C. being more preferred and between about 100° C. and about 130° C. being most preferred. Thermoplastic (hot melt) adhesives or resins are acceptable. These adhesives allow replacement of the screen by using a hot tool to first liquefy and allow removal of the old screen, and then replacement in a manner discussed herein. If desired, replacement screen also could be attached using conventional spline techniques, when using screen bar that has a spline groove. For this reason, a groove is preferred over a simple step.

The melting point value specified by the adhesive manufacturers is also important. This value is the temperature at which the adhesive begins to liquefy and flow under shear stress.

Although heating the adhesive by convection is preferred, a heated tensioning tool may be used. Because the preferred tensioning tool includes a plurality of pins that remain in the adhesive till the adhesive re-solidifies, the use of heated pins is expected to increase the cooling time. Nevertheless, if a heated insertion tool is used, it is important to use an adhesive having a low enough melt temperature (e.g., about 100° to about 225° C. (maximum)) to allow a heated tool temperature within an operating range, which limits smoke production. Smoke can be generated from either the adhesive or the coating on the screen. This range is about 200° C. to about 500° C. (with about 200° C. to about 400° C. being preferred, about 200° C. to about 300° C. being more preferred and about 250° C. to about 300° C. being most preferred) with minimum smoke production. The corresponding maximum ball and ring temperatures of the adhesive are about 210° C. (acceptable), about 150° C. (preferred) and about 120° C. (most preferred). Hot melt adhesives selected from the group consisting of polyester, polyamide, polyolefin, polypropylene, polyurethane, butyl and ethylene vinyl acetate (EVA) give satisfactory bond strength at s room temperature (about 20° C. and below). However, only the polyester and polyamide adhesive families seem to perform particularly well at elevated temperatures. Although the EVA's may generally work well, they are not preferred due to excessive plasticizer migration, which may occur at elevated ambient temperatures. This causes loss of bond strength.

Table I shows polyamide and Table 2 shows polyester hot melt adhesives that meet the high temperature requirements and melt flow characteristics. In these tables, the Macromelt adhesives are available from Henkel, Elgin, Ill., whereas the Bostik adhesives are available from Bostik, Middleton, Mass. and the letter "a" indicates "acceptable" while the letter "p" indicates "preferred".

TABLE 1

| Polyamide Adhesive | Ball and Ring Temp. ° C. | Heat Resistance Temp. ° C. | Viscosity/ (temp.) Poise/(° C.) | Tensile Strength psi |
|---|---|---|---|---|
| Macromelt 6000-a | 200 | 115 | 4/(200) | 1900 |
| Macromelt 6202-p | 150 | 110 | 50/(210) | 450 |
| Macromelt 6206-a | 180 | 145 | 40/(210) | 1100 |
| Macromelt 6211-a | 145 | 125 | 25/(210) | 370 |
| Macromelt 6212-a | 110 | 80 | 35/(200) | 500 |
| Macromelt 6071-a | 95 | 70 | 10/(160) | 210 |
| Bostik 7239-p | 150 | 115 | 35/(200) | 385 |
| Bostik 4252-p | 150 | 110 | 22/(205) | 580 |
| Bostik 6240-a | 185 | 145 | 16/(230) | N/A |

TABLE 2

| Polyester Adhesive | Ball and Ring Temp. ° C. | Heat Resistance Temp. ° C. | Viscosity/ (temp.) Poise/(° C.) | Tensile Strength psi |
|---|---|---|---|---|
| Bostik 4101-p | 120 | 95 | 145(200) | 3400 |
| Bostik 4103-p | 135 | 110 | 425(225) | 2290 |
| Bostik 4156-a | 160 | 137 | 23(215) | 2700 |
| Bostik 4175-a | 200 | N/A | 900(225) | N/A |
| Bostik 4178-a | 145 | 120 | 1000(215) | 3000 |
| Bostik 5182-a | 150 | N/A | 900(215) | N/A |
| Bostik 7116-p | 150 | N/A | 340(200) | N/A |
| Bostik 7199-a | 190 | 170 | 200(215) | 700 |

Another property that may be important, and one that separates thermoplastic (hot melt) adhesive from thermoplastic resins (plastics) is surface wetting. In this respect, melt viscosity is one of the most important properties of a hot-melt adhesive. In general, for a given adhesive, as the temperature increases, its viscosity decreases. Therefore, for a given hot-melt adhesive formulation, the temperature of the adhesive during application controls the viscosity, which greatly influences the extent of surface wetting. The bond formation temperature is a minimum below which surface wetting is inadequate. A hot-melt adhesive is applied at a running temperature, at which the viscosity is sufficient to wet surfaces. See the *Engineered Materials Handbook,* Vol. 3, "Adhesives and Sealants", ASM International Handbook Committee, page 80.

Preferably, the adhesive not only melts and flows, but also has a wetting action to spread easily over the surface of the strands of the screen to secure and/or encapsulate them. Adhesive manufacturers add waxes and plasticizers as surfactants to promote surface wetting. The amounts of these additives remain proprietary to the adhesive manufacturers. Loads applied to the screen must be carried by the adhesive. The adhesives listed in Tables 1 and 2 give acceptable bond and tensile strength to meet the load requirements of the installation. Preferably, the tensile strength of the adhesive is over 200 psi, but many adhesives having a lower tensile strength can still effectively carry the loads. Strand encapsulation enhances bond strength between the screen and the adhesive and mechanical interlocking between the adhesive and the screen is preferred to ensure full bond potential. Perforations in the screen bar, discussed above, is the preferred method of mechanical interlocking.

There was an initial concern that polyamide adhesives and EVA would soften over time while in contact with plasticized PVC. screen, due to the potential plasticizer migration. (Polyester adhesives do not have the same susceptibility to plasticizer migration and thus, softening characteristics.) This concern with polyamide adhesives and EVA, however, has not been demonstrated in practice. It is believed that the amount of plasticizer available for migration is very low. For this reason, polyamides are, along with polyester adhesives, preferred.

Good weathering characteristics are advantageous, because many screen assemblies are exposed to full sunlight and extreme whether conditions. Industry standards generally demand mechanical properties to be, maintained over a ten year period. However, twenty years is preferred.

To enhance weatherability, it is generally known to add to the adhesive carbon black for blocking ultraviolet (UV) light, as well as light absorbers and light stabilizers. Also, adding enough carbon black to make the adhesive opaque is sufficient to block UV light. Generally, 0.5 to 2% by weight of the adhesive is adequate to block UV light, and 1 to 1.5% by weight is sufficient to make the adhesive opaque. Diminishing returns are experienced above 2%, and mechanical properties also can be adversely affected. Carbon black is preferred from a cost and performance standpoint. Alternatively, instead of adding carbon black to the adhesive to block UV from the sun, $TiO_2$ may be used. This would achieve a white color.

Benzotriazole is a suggested additive to act as a UV absorber for both polyamide and polyester adhesives. An example is Tinuvin 234, available from Ciba-Geigy, which is a 100% active chemical. This chemical may be added to the adhesive in an amount of 0.05% to 0.3%, with 0.1% be a typically specified amount, by weight.

Products which act as "hindered amine light stabilizers" (HALS) may also be added to the adhesive, in an amount between 0.05 to 0.3% by weight. 0.1% is a typically specified amount. Tinuvin 622, available from Ciba-Geigy, is a 100% HALS and is recommended for polyamide and polyester adhesives.

It is believed that using the accepted adhesives in a foamed form (with 20%–70% lower density) has an advantage of giving a larger bead size, for example, for a given mass per unit length—thus, lowering cost. A larger diameter bead increases the bonding area, which improves the bond strength. Also, the insertion speed is theoretically increased, as less mass is heated and melted from a given bead size. A Nordson model FM190 hot-melt dispensing unit is designed to apply foamed adhesives in bead form. Nitrogen is generally used as the foaming agent in such foamed adhesives.

The screen bars of this invention are designed to meet both the Canadian and U.S. type II standards for load resistance and pull out strength. (ANSI-SMA SMT 31- and CAN-CGSB-79.1-M91). In Canada, the load resistance test for a type II screen requires that a 75 lb. weight, or 37 lb. for a type I screen distributed over a one foot square diameter, be placed in the center of a three foot by three foot pre-clamped screen. The Canadian pull out test resembles a tensile test in which a one inch section of screening and screen bar are subjected to tensile loading in, for example, an Instron tensile testing machine. To satisfy this pull out test, screen samples must demonstrate at least 9 lb./inch resistance to tensile loads. If the spline or glue joint separates under a 9 lb. load, the screen fails the pull out test for type II screens.

The screen bars of this invention were designed to meet the customary screen dimensions as follows:

| BayForm B516 | BayForm B38 |
|---|---|
| D-.17 inches<br>T-.020 inches | D-.235 inches<br>T-.023 inches |

The above dimensions, shown in FIG. 6, are typical in the screen industry, whereby "D" represents the height of the tensioning step, "T" represents the thickness of the bar material, which is typically aluminum, and E represents Young's modulus of the screen bar material ($10.3\times10^6$ psi for aluminum, $30\times10^6$ for steel). It is known through experience that a B516 aluminum screen bar generally fails the 75 lb. load test if its thickness (T) falls below 0.018 inches. Similarly, an aluminum screen bar manufactured to the B38 standard generally is known to fail the 75 lb. load test if its thickness (T) falls below 0.020 inches. When the gluing methods of the present invention are employed, however, instead of the prior art's spline technique, a thickness "T" of less than 0.018 inches for the B516 bar, and a thickness "T" of less than 0.020 inches for a B38 bar was sufficient to meet the 75 lb. load test. Moreover, the present gluing technique was tested in accordance with the Canadian 79.1 type II standard pull out test parameters. Under this test, a B38 type screen bar must meet at least 9 lbs. per inch in tensile load before the spline pulls out, or the screen separates. Using spline technology, a B38 bar thickness "T" was reduced from 0.023 inches to 0.018 inches for a standard spline product, and this product resulted in a tensile load of 6 lbs./inch tensile force test result, thus failing the test. When a B38 style bar having a thickness of only 0.016 inches and a glued joint pursuant to the teachings of this invention was similarly tested, it had a tensile force of 25 lbs., passing the test by a factor of safety of almost 3.0 (or of almost 6.0 for a type I screen).

Accordingly, the screen bars of this invention can be made thinner and stronger than prior art screen bars using splines. According to solid mechanics analysis, the conventional spline screen bar cross-sectional ratio "D(in.)/$T^2$(in.$^2$)E (psi)" should be no greater than $41.3\times10^{-6}$ to meet the 75 lb. test. Using the present invention, the inventor contemplates achieving a ratio greater than $41.3\times10^{-6}$ to meet the CGSB-CAN 79.1 type II specification, and even $48.5\times10^{-6}$ or greater, with ratios as high as $65\times10^{-6}$ without failing the pull out test. Below in Table 3, examples of pull out test results for various thicknesses and tensions step heights employing a spline (Sets 1, 2 and 3) and the adhesive method of this invention (Sets 4, 5 and 6) are provided, easily demonstrating that the improved method of this invention increases the performance of screens subjected to a tensile load.

A screen and frame when so joined by a method according to the invention can pass a 37 lb. load test in accordance with break load at a thickness "T" at least about 10% less than the thickness "T" of a passing spline-retained screen and frame of like material undergoing said load test. For example, in Table 3, Set 2 specifies a spline type screen that failed the test, using 0.019 in. thick material. Set 5 specifies a screen according to the invention that passes the test with only 0.016 in. thick material. Because 0.016 is less than 0.019 (a failing spline thickness) by at least 10%, and a passing spline frame would require thickness greater than 0.019, an assembly according to the invention can easily be at least 10% thinner than a passing spline-retained screen frame of like material.

A screen and frame when joined according to the invention has a break load test value of at least 50% greater than a spline retained screen of like thickness "T" and like tensioning step height "D". For example, in Table 3, Set 3 specifies a failing 0.016 spline with a 0.23 in. step height. The largest pull out load in sample set 3 is 5.769 lb. Set 5 specifies a passing frame screen assembly according to the invention, having the same thickness and the same tensioning step height. The minimum break load in sample set 5 is 18.22 lb., which is more than three times the pull out load of the spline type assembly of set 3.

TABLE 3

PULL OUT/BREAK LOAD TEST ANALYSIS

| Sample code | Pull Out load / Break load |
|---|---|
| Set 1: T = 0.018 in., D = 0.200 in. with spline, $D/T^2E = 59.9 \times 10^{-6}$ | |
| **Sample code** | **Pull Out load** |
| FM1 | 5.922 |
| FM2 | 6.276 |
| FM3 | 7.713 |
| FM4 | 8.056 |
| FM5 | 7.683 |
| FM6 | 6.824 |
| Set 2: T = 0.019 in., D = 0.200 in., with spline, $D/T^2E = 54 \times 10^{-6}$ | |
| **Sample code** | **Pull Out load** |
| FP1 | 8.236 |
| FP2 | 7.731 |
| FP3 | 6.156 |
| FP4 | 8.851 |
| FP5 | 7.570 |
| FP6 | 5.503 |
| Set 3: T = 0.016 in., D = 0.230 in., spline, $D/T^2E = 87.2 \times 10^{-6}$ | |
| **Sample code** | **Pull Out load** |
| 016P | −15.769 |
| 016P | −25.603 |
| 016P | −35.557 |
| 016P | −44.416 |
| 016P | −55.103 |
| 016P | −63.850 |
| Set 4: T = 0.0235 in., D = .230 in., Bostik 4156 polyester adhesive, $D/T^2E = 40.4 \times 10^{-6}$ | |
| **Sample code** | **Break load** |
| IB4145-1 | 30.94 |
| IB4145-2 | 24.21 |
| IB4145-3 | 29.66 |
| IB4145-4 | 26.01 |
| IB4145-5 | 26.78 |
| IB4145-6 | 24.91 |
| B516 = D = 0.17, T = 0.020 | |
| B38 = D = 0.230, T = 0.0235 | |
| Set 5: T = 0.016 in., D = 0.230 in., 6206 Henkel adhesive, $D/T^2E = 87.2 \times 10^{-6}$ | |
| **Sample code** | **Break load** |
| 31.64 | |
| 19.83 | |
| 18.22 | |
| 20.52 | |
| 22.62 | |
| 24.93 | |

TABLE 3-continued

| PULL OUT/BREAK LOAD TEST ANALYSIS | |
|---|---|
| Set 6: T = .0235 in., D = 0.230 in., with Henkel 6206 with adhesive, $D/T^2E = 40.4 \times 10^{-6}$ | |
| Sample code | Break load |
| 28.15 | |
| 30.56 | |
| 28.08 | |
| 27.14 | |
| 25.38 | |
| 30.19 | |

Although hot melt adhesives and thermoplastic resins are discussed above, the inventor contemplates that pressure sensitive adhesives and like bonding agents that provide acceptable results also could be used, if desired.

Tape

Although the exemplary assembly described above uses an adhesive that is applied as a film or as a strip, an adhesive tape may be used.

Figure 13A:
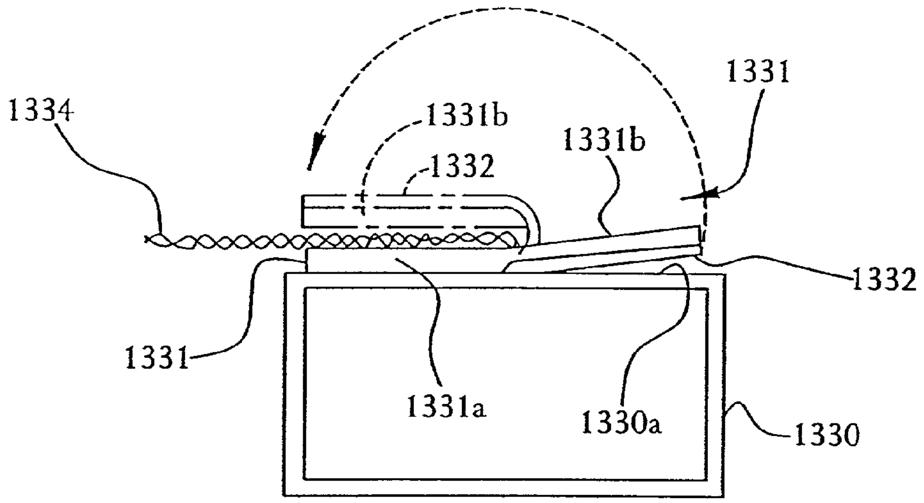
FIGS. 13A and 13B are cross sectional views showing a further exemplary embodiment of the invention, using an adhesive tape.

According to an embodiment shown in FIG. 13A, a tape 1331 is laid on the mounting surface 1330*a* of the frame 1330, with an adhesive surface of the tape facing away from the frame. Tape 1331 has adhesive on both sides. The tape may have: (1) a fixed portion 1331*a* that is fixedly attached to the mounting surface 1331*a;* and (2) an extended flap 1331*b* that is not adhered to the mounting surface of the frame. In FIG. 13A, a piece of non-adhesive tape 1332 is inserted between the flap 1331*b* and the mounting surface 1330*a*. The bottom surface of flap 1331*b* adheres to the non-adhesive tape 1332. This prevents the bottom surface of flap 1331*b* from adhering to the mounting surface 1330*a*. The flap 1331*b* is free to be folded over the edge of the screen fabric 1334, as shown in phantom in FIG. 13A. Thus, the screen fabric 1334 is adhered between two layers of tape 1331*a* and 1331*b*.

Figure 13B:
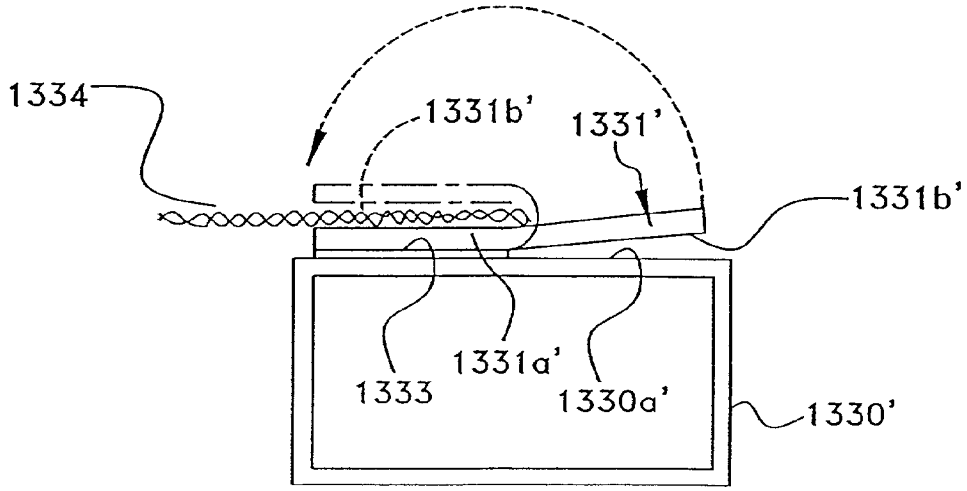

FIG. 13B shows a variation of the embodiment of FIG. 13A. A tape 1331' having only a single adhesive surface may be used. The tape 1331 is applied to the mounting surface 1330*a*' of the screen bar segment 1330', with the adhesive surface of the tape facing up, away from the mounting surface of the screen bar segment. A separate adhesive layer 1333 is used on the bottom of one half 1331*a*' of the tape, to fix that half of the tape to the mounting surface 1330*a*'. The resulting screen bar segment and tape combination is similar to the example of FIG. 13A, in that one half 1331*a*' of the tape 1331' is fixedly mounted to the mounting surface 1330*a*' of the screen bar segment 1330', and the other half 1331*b'* of the tape 1331 is a movable flap; the flap 1331*b*' can be folded over to capture the screen material 1334' between two halves of the tape strip 1331' (as shown in phantom in FIG. 13B).

Figure 15A:
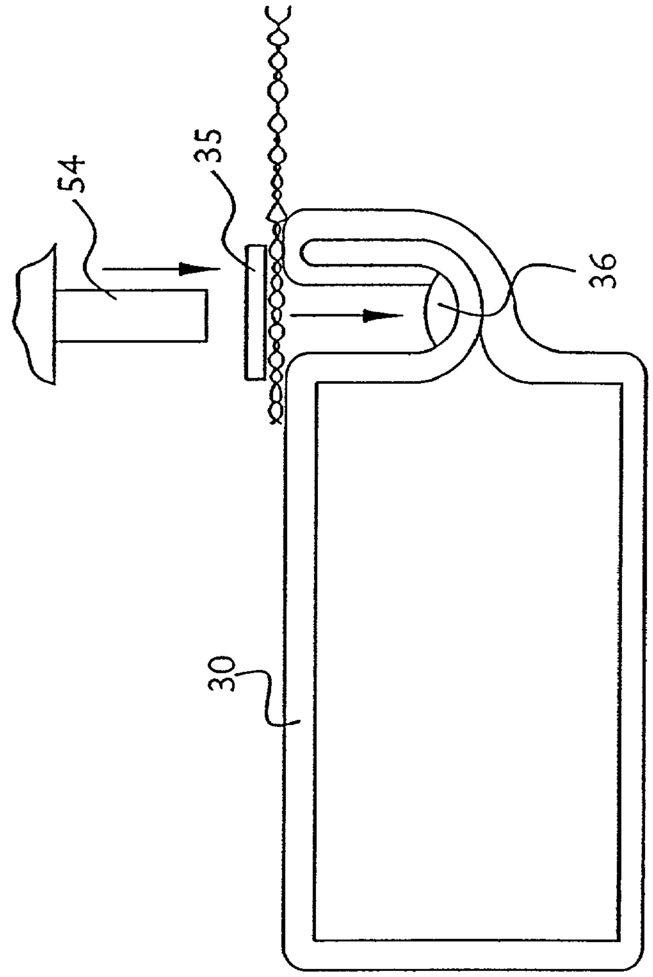
FIGS. 15A and 15B show a variation of the exemplary method using a shielding tape between the pins and the adhesive.
Figure 15B:
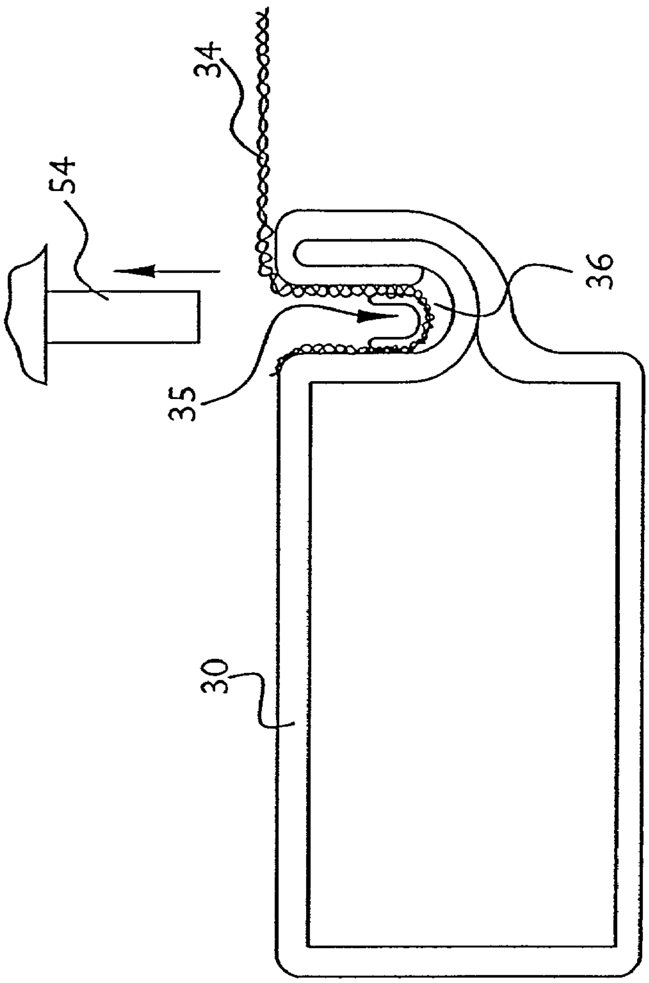

Alternatively, as shown in FIG. 15A, a non-adhesive plastic film or tape 35 may be interposed between the adhesive 36 and the pins 54 or other inserting tool (e.g., roller) during the insertion process. The tape 35 should be capable of withstanding high temperatures. The tape 35 may be, for example, cloth or polymeric tape. The tape 35 may be dispensed after the adhesive is melted, but before driving the pins 54 into the adhesive 36. In this case, the apparatus may be substantially as described above with reference to FIGS. 2–5. When the pins 54 insert the screen fabric 34 into the groove 32, the film or tape 35 shields the pins from contact with the adhesive. The film or tape 35 may be left in the groove after assembly, as shown in FIG. 15B. In a further variation of this method, other techniques may be used for melting the adhesive with the tape or film 35 in place, such as by microwaves, or by heating the frame to indirectly heat the adhesive.

Other Inserting Apparatus

Although the exemplary inserting apparatus is described above as a plurality of pins, other inserting apparatus may be used. It may be desirable to use one or more rollers instead of a plurality of pins. Insertion methods using a roller are described in greater detail in the parent application Ser. No. 08/997,737, which is incorporated by reference herein.

Figure 14A:
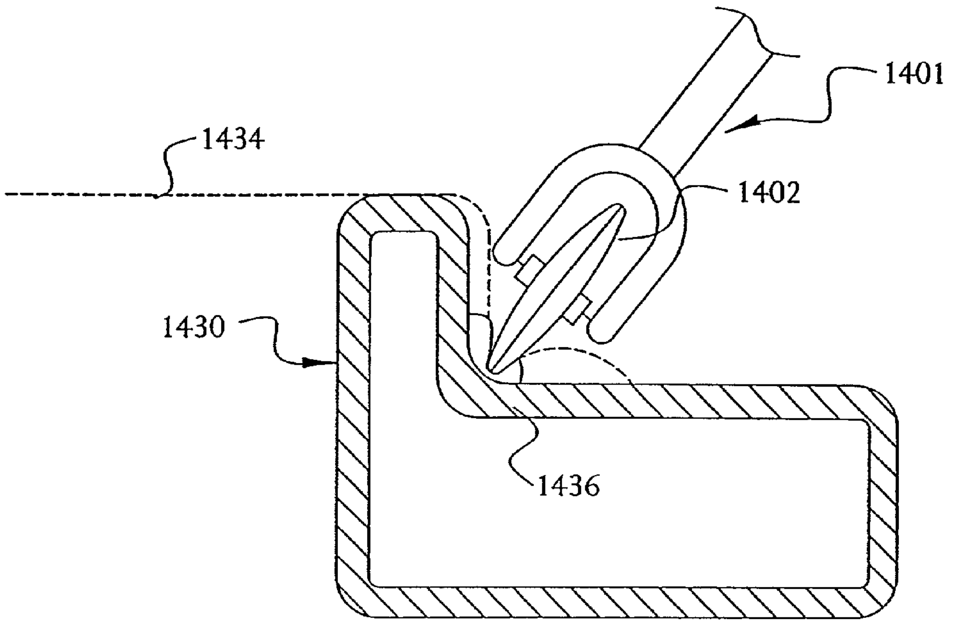
FIG. 14A shows a method of attaching a screen to a frame using a roller type inserting apparatus.

A roller can be manually or automatically actuated to travel along the length of a side of the frame. An example is shown in FIG. 14A. One, two or more sides of the screen may be inserted into the adhesive simultaneously. To simultaneously insert more than one side of the screen, a plurality of rollers are actuated by a plurality of actuators (not shown).

The roller may be heated to melt the adhesive. To avoid continuous increase in the roller temperature while the roller passes through the heated adhesive in successive assemblies, it may be desirable to cool the roller(s) in between sides.

As in the case of pins, a release coating, such as TFE may be used on the roller to prevent the adhesive from sticking to the roller. Alternatively, the roller wheel may have a permanent TFE coating. If the roller doesn't contact the adhesive, no release coating is required.

A cleaning device may be used at the end of each machine cycle to remove glue build-up from the roller. FIGS. 14B and 14C. show an example of a device 1403 having a groove 1404 shaped like the inserting edge 1402 of the roller. The device 1403 is placed adjacent to the roller 1402. The roller 1402 is then passed through the device 1403, so the adhesive is squeezed and scraped off of the roller 1402.

Another device for removing the adhesive from the roller is shown in FIG. 14D. Tool 1405 is in the form of a sharpened hollow cylinder. This cleaning tool 1405 may be used for an inserting wheel that has an open side. The cleaning tool 1405 has a circular cutting or scraping edge 1406 very slightly larger in diameter than the roller 1402'. Tool 1405 can fit over the roller 1402' in the axial direction, scraping the adhesive off in the process.

One skilled in the art can readily provide other tools for cleaning the adhesive off of the inserting roller 1402.

The roller may optionally be mounted to an apparatus (not shown) for dispensing adhesive, so that the roller trails behind the ribbon of adhesive by a predetermined distance; if the apparatus moves along the groove or tensioning step at a constant speed, then the roller inserts the screen material in at a predetermined time after the adhesive is dispensed in the groove or tensioning step. Alternatively, the apparatus may be stationary, and the frame may be mounted on an X-Y table, so that the same relative motion is provided between the frame and the roller.

In a further variation of this apparatus, a nozzle may be mounted behind the roller. The nozzle may provide heated gas if a thermosetting adhesive is used, or the nozzle may apply cooled gas if a pre-heated thermoplastic adhesive is used. As the apparatus moves relative to the groove or tensioning step, a ribbon of adhesive is applied, then the roller follows, and finally a jet of heated or cooled gas is applied to the adhesive.

In still another variation, the inserting apparatus may be a pin-roller (not shown) including a plurality of pins attached to a roller, and extending outwardly from the surface of the roller, in a radial direction. The roller may include a bearing assembly to provide smooth rolling action. Preferably, the pins are evenly spaced. The pins are spaced apart from each other so that the outer tips of any two successive pins are about 1.25 cm (0.5 inch) apart. The pins may be any of the types described above. Preferably, the pins are coated so that the adhesive does not stick to the pins. A release coating, such as TFE, may be applied to the wetted surfaces. The pin-roller may be about the same width as the diameter of the plurality of pins.

The pin-roller combination allows use of an application technique very similar to that described above with respect to a smooth roller, yet yields results similar to those achieved using a plurality of pins. For example, the screen frame may be preheated (to melt the adhesive therein) and blocked with pre-loading blocks. The screen cloth is placed on the frame, and the pin-roller is rolled through the groove of the frame to insert the screen. This may be done manually, or by machine. Alternatively, local heating may be used. A nozzle may trail behind the pin-roller. The nozzle may dispense a cool gas or fluid, which may be air, carbon dioxide, water, mist, etc. The cool gas or fluid cools the adhesive until the adhesive re-solidifies, completing the bonding operation. Alternatively, the frame may be permitted to cool by natural convection, or by forced convection from a large fan. Other cooling methods known to those skilled in the art may also be used.

Another exemplary roller type insertion device may have a corrugated or fluted edge (not shown). When the corrugated or fluted roller passes through the groove 32 of a screen bar segment, the insertion device makes an impression in the general form of a sine wave. Alternatively, a plain roller (of a type shown in FIG. 14A), may be used. Similarly, a corrugated blade may be used.

Still another exemplary method according to the invention includes a continuous feed process for inserting the screen fabric into one or more grooves of the frame. According to this embodiment, a frame is formed from four (or more) screen bar segments, each of which has a respective groove. Each groove in each screen bar segment extends across the entire length of the screen bar frame, from edge to edge, including both the length of the screen bar segment and the corner key. The grooves on each pair of adjacent screen bar segments continue onto, and intersect in, the corner key (not shown). For example, a four-sided frame should have a set of grooves in the general shape of a tic-tac-toe board, or a pound sign (#) with orthogonal sides.

A frame having grooves that extend from edge to edge can be continuously fed by a conveyor into an apparatus having a pair of insertion devices (preferably rollers, pin-rollers or corrugated rollers as described above) spaced apart from each other. By this method, the two rollers (or pin-rollers or corrugated rollers) simultaneously fit into the two parallel grooves on two opposite sides of the frame. One of the insertion devices may be fixed, and the other movable (in the direction perpendicular to the groove), to accommodate differently sized frames. The two insertion devices can each have a heat source just ahead of the insertion device, to melt the adhesive just before insertion. Optionally, a nozzle may blow ambient air on the adhesive just behind the insertion device to speed up the cooling. Once the screen cloth 34 on the first two sides is inserted, the frame is rotated by 90 degrees, and the remaining two sides of the screen cloth 34 are inserted in the same manner.

Alternatively, instead of feeding the frame through a stationary insertion apparatus, the frame may be held still, and two (longitudinally) movable insertion devices (preferably, rollers, pin-rollers or corrugated rollers) may be passed through the grooves simultaneously. Further, although the exemplary frames described above include the grooves or tensioning steps on the face of the frame, the grooves may be located on the side edges and ends of the frame.

In a variation of this exemplary process, the frame may be loaded onto a conveyor, which transports the frame through an oven. The frame is pre-heated in the oven. The heated frame exits the oven on the conveyor and moves to a press having insertion devices similar to those described above. The conveyor stops when the frame is positioned at the insertion devices. Two movable arms and two stationary arms straighten the frame for tensioning. The screen cloth is placed in position over the frame (with the edges over the grooves), preferably using a gantry or pick-and-place type robot. Other types of positioning apparatus may be used. The screen material may optionally be pre-cut to a final installed size before placing the screen on the frame. At least one, but preferably four, insertion devices (one on each side of the frame) are simultaneously inserted in the grooves, inserting the screen cloth into the grooves, simultaneously pushing the screen into fixative contact with the adhesive on each side member of the first frame. Ambient air may then be blown over the frame to reduce the cycle time. Using this variation of the exemplary method, the entire assembly process can be automated.

Having the groove extend all the way to both edges of the frame may be advantageous for the above described batch type insertion process, as well as the continuous process described immediately above. With the groove extending all of the way to the edge, there is no need to retract the bayonet pins (shown in FIG. 17) at the corners of the frame during the batch insertion process; the insertion device can be applied over the corners in the same way as in the middle of the frame.

With at least two movable arms and two fixed arms (each fixed arm being located opposite a respective movable arm), it is easy to form a second screen assembly having a second frame, wherein the second frame has a different size from the first frame. More generally, any number of differently sized frames may be made with the same apparatus, using the same conveyor, with size changes between any two consecutive frames. The adjustment may either be controlled by the operator entering arm positions. However, it is preferred to use a more automated process, in which a process controller identifies all of the screen sizes to be produced and the positions of the arms needed to form the appropriately sized screen for each assembly.

When using an oven to pre-heat the frame, particular attention must be given to the frame corners. Conventional frames are typically assembled using corner keys. The corner key material and adhesive must be selected so that the adhesive melts at a temperature below the temperature at which the corner key melts or creeps significantly. Comer keys made of a high temperature plastic (e.g., nylon) may be used, but may be substantially more expensive than polypropylene corner keys. Another alternative is to use an oven having an average temperature below 212 degrees may be used, with additional heat sources directed at the adhesive (but not on the corner keys). For example, an oven having, with infrared radiation focused on the adhesive (but not on the corner keys) may be used. Another alternative is to have a narrow slot in the ceiling of the oven, directing heated air on the frame or adhesive, but not the corner keys.

Still another alternative is to form the frame from a single piece of screen bar stock with folded mitered corners, in which case at most one corner key (which may be a high temperature plastic) is used. In particular, the inventor has discovered that a more stabile frame is formed if the mitered corners are cut to between 44.0 and 44.5 degrees, instead of 45 degrees. An exemplary mitered frame using a metal internal corner key achieved good results. It is believed that the smaller miter angles place the mitered corners in compression, for greater rigidity and stability.

Other Screen Bar Configurations

Although the exemplary embodiments described above include a groove or tensioning step, other screen bar configurations may be used. For example, the screen bar may be flat. Alternatively, the screen bar may have a ridge.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for securing ventilation cloth to a screen frame, comprising the steps of:

(a) orienting a screen frame in an approximately vertical position, the screen frame having a plurality of segments, each segment having a mounting surface on a face thereof, at least one of said segments having adhesive on the mounting surface thereof;

(b) hanging a ventilation cloth across the mounting surface of said one segment;

(c) clamping all the segments simultaneously with a plurality of separately positionable clamping arms;

(d) inserting the ventilation cloth in the adhesive across a length of said one of the segments.

2. The method of claim 1, wherein step (c) includes melting the adhesive.

3. The method of claim 1, wherein:

each of the segments has adhesive on the mounting surface thereof;

step (b) includes hanging the ventilation cloth across the mounting surface each segment simultaneously;

step (c) includes melting the adhesive on all of the segments; and step (d) includes simultaneously inserting the ventilation cloth in the adhesive substantially across an entire length of each of the segments.

4. The method of claim 1, wherein step (a) includes orienting the frame in a position between 0 and 30 degrees from vertical.

5. The method of claim 1, wherein step (d) includes simultaneously pushing the screen into the adhesive substantially across said one side with an elongated insertion member having a length substantially as long as a length of the screen bar segment.

6. The method of claim 1, further comprising the step of clamping the screen frame on four sides simultaneously, before step (b).

7. The method of claim 6, wherein the frame is pre-bowed outward before the clamping step, and the clamping step includes compressing the frame inward from the outside on all four sides, so that the ventilation cloth is tensioned when the clamping is discontinued.

8. The method of claim 5, further comprising, before step (b), the step of loading the frame into a side of an apparatus in which the insertion is performed.

9. A method for securing a ventilation cloth to a screen bar segment, comprising the steps of:

(a) providing a screen bar segment having a mounting surface on a face thereof, the segment having adhesive on the mounting surface;

(b) spreading the ventilation cloth across the mounting surface of the screen bar segment;

(c) melting the adhesive;

(d) inserting the ventilation cloth into the adhesive with an elongated straight insertion member, wherein the insertion member is a blade having a length substantially as long as a length of the screen bar segment.

10. The method of claim 9, wherein step (d) is performed by moving the insertion member in a single motion normal to the plane of the ventilation cloth.

11. The method of claim 9, further comprising:

applying a release coating to the plurality of elongated insertion member before step (d).

12. The method of claim 9, wherein the screen bar segment is included in a screen frame having at least three segments, the method further comprising orienting the screen frame in an approximately vertical position before step (b).

13. The method of claim 12, wherein each of the segments has adhesive on the mounting surface thereof;

step (b) includes hanging the ventilation cloth across the mounting surface each segment simultaneously;

step (c) includes melting the adhesive on all of the segments; and step (d) includes inserting the ventilation cloth in the adhesive substantially across the length of each of the segments simultaneously.

14. A method for securing a ventilation cloth to a screen bar segment, comprising the steps of:

(a) providing a screen bar segment having a mounting surface on a face thereof, the segment having adhesive on the mounting surface;

(b) spreading the ventilation cloth across the mounting surface of the screen bar segment;

(c) melting the adhesive;

(d) inserting the ventilation cloth into the adhesive with an elongated straight insertion member, the insertion member having a continuous contacting surface, the insertion member having a length substantially as long as a length of the screen bar segment.

* * * * *